US011996625B2

(12) United States Patent
You et al.

(10) Patent No.: US 11,996,625 B2
(45) Date of Patent: May 28, 2024

(54) MULTI-ANTENNA SYSTEM AND ELECTRONIC DEVICE

(71) Applicant: HUAWEI TECHNOLOGIES CO., LTD., Shenzhen (CN)

(72) Inventors: Jiaqing You, Shanghai (CN); Hanyang Wang, Reading (GB); Xianbin Zhu, Shanghai (CN); Yan Wang, Shenzhen (CN); Laiwei Shen, Shanghai (CN); Liang Xue, Shanghai (CN); Qiuliang Xu, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 131 days.

(21) Appl. No.: 17/641,198

(22) PCT Filed: Sep. 18, 2020

(86) PCT No.: PCT/CN2020/116291
§ 371 (c)(1),
(2) Date: Mar. 8, 2022

(87) PCT Pub. No.: WO2021/052483
PCT Pub. Date: Mar. 25, 2021

(65) Prior Publication Data

US 2022/0344807 A1 Oct. 27, 2022

(30) Foreign Application Priority Data

Sep. 18, 2019 (CN) ......................... 201910883759.1

(51) Int. Cl.
*H01Q 1/24* (2006.01)
*H01Q 3/24* (2006.01)
(Continued)

(52) U.S. Cl.
CPC ............... *H01Q 3/24* (2013.01); *H01Q 5/314* (2015.01); *H01Q 9/42* (2013.01);
(Continued)

(58) Field of Classification Search
CPC ............ H01Q 1/243; H01Q 1/48; H01Q 9/42; H01Q 5/328; H01Q 21/28; H01Q 5/35;
(Continued)

(56) References Cited

U.S. PATENT DOCUMENTS 8,750,798 B2 * 6/2014 Rao ........................ H01Q 1/243
343/702
9,413,058 B1 * 8/2016 Kuo ....................... H01Q 5/335
(Continued)

FOREIGN PATENT DOCUMENTS

CN 105305101 A 2/2016
CN 107124212 A 9/2017
(Continued)

*Primary Examiner* — Linh V Nguyen
(74) *Attorney, Agent, or Firm* — Maier & Maier, PLLC

(57) ABSTRACT

A multi-antenna system and an electronic device comprising the same. An intelligent multi-antenna solution in which antennas are laid out at the top, the side, and the bottom of an electronic device is used, so that three antenna groups including a top antenna group, a middle antenna group, and a bottom antenna group are respectively formed, and antenna performance in a plurality of scenarios such as a free-space scenario, a portrait-mode holding scenario, and a landscape-mode holding scenario is considered, to improve antenna radiation efficiency.

10 Claims, 37 Drawing Sheets

(51) Int. Cl.
*H01Q 5/314* (2015.01)
*H01Q 9/42* (2006.01)
*H01Q 21/00* (2006.01)
*H01Q 21/28* (2006.01)
*H01Q 1/22* (2006.01)

(52) U.S. Cl.
CPC ......... *H01Q 21/0006* (2013.01); *H01Q 21/28* (2013.01); *H01Q 1/2291* (2013.01); *H01Q 1/243* (2013.01)

(58) Field of Classification Search
CPC .......... H01Q 5/378; H01Q 5/335; H01Q 1/24; H01Q 1/245; H01Q 1/521; H01Q 5/371; H01Q 7/00; H01Q 9/0421; H01Q 1/1207; H01Q 1/242; H01Q 1/38; H01Q 1/42; H01Q 1/50; H01Q 13/106; H01Q 21/0006; H01Q 21/30; H01Q 3/00; H01Q 3/24; H01Q 3/247; H01Q 5/314; H01Q 5/364; H01Q 5/40
USPC ........................................... 343/700 MS, 702
See application file for complete search history.

(56) References Cited

U.S. PATENT DOCUMENTS

| | | | | |
|---|---|---|---|---|
| 9,935,359 | B2 * | 4/2018 | Kim | H01Q 1/38 |
| 9,985,353 | B1 * | 5/2018 | Pajona | H01Q 1/48 |
| 2017/0310805 | A1 | 10/2017 | Dai et al. | |
| 2017/0373712 | A1 | 12/2017 | Kim et al. | |
| 2018/0069301 | A1 | 3/2018 | Choi et al. | |
| 2018/0358698 | A1 | 12/2018 | Wang et al. | |
| 2019/0067797 | A1 * | 2/2019 | Jung | H04M 1/026 |
| 2019/0181553 | A1 | 6/2019 | Lee et al. | |
| 2019/0260126 | A1 | 8/2019 | Ayala et al. | |
| 2020/0076057 | A1 * | 3/2020 | Leutheuser | H05K 5/0247 |
| 2020/0076059 | A1 * | 3/2020 | Hsiao | H01Q 1/1207 |
| 2020/0321988 | A1 * | 10/2020 | Kim | H04M 1/02 |
| 2021/0126349 | A1 * | 4/2021 | Zhou | H01Q 1/36 |
| 2021/0151886 | A1 * | 5/2021 | Wang | H01Q 9/42 |
| 2021/0167487 | A1 * | 6/2021 | Varma | H01Q 21/28 |
| 2021/0318720 | A1 * | 10/2021 | Lin | H01Q 1/243 |
| 2021/0320392 | A1 * | 10/2021 | Hsu | H01Q 1/243 |

FOREIGN PATENT DOCUMENTS

| | | | |
|---|---|---|---|
| CN | 107453056 | A | 12/2017 |
| CN | 107911126 | A | 4/2018 |
| CN | 108055410 | A | 5/2018 |
| CN | 108134199 | A | 6/2018 |
| CN | 108281753 | A | 7/2018 |
| CN | 108429833 | A | 8/2018 |
| CN | 108494957 | A | 9/2018 |
| CN | 108963425 | A | 12/2018 |
| CN | 109088973 | A | 12/2018 |
| CN | 109167601 | A | 1/2019 |
| CN | 208539942 | U | 2/2019 |
| CN | 109449595 | A | 3/2019 |
| CN | 109616765 | A | 4/2019 |
| CN | 208738425 | U | 4/2019 |
| CN | 109743119 | A | 5/2019 |
| CN | 209056587 | U | 7/2019 |
| CN | 110165373 | A | 8/2019 |
| WO | 2017185565 | A1 | 11/2017 |
| WO | 2018082334 | A1 | 5/2018 |

* cited by examiner

MULTI-ANTENNA SYSTEM AND ELECTRONIC DEVICE

This application is a National Stage of International Patent Application No. PCT/CN2020/116291, filed on Sep. 18, 2020, which claims priority to Chinese Patent Application No. 201910883759.1, filed on Sep. 18, 2019, both of which are hereby incorporated by reference in their entireties.

FIELD

The field of antenna technologies may include a multi-antenna system used in an electronic device.

BACKGROUND

To bring a more comfortable visual experience to users, the bezel-less screen industry design (ID) has become a design trend of portable electronic devices such as mobile phones. The bezel-less screen means a large screen-to-body ratio (usually over 90%). The bezel width of the bezel-less screen is greatly reduced, and internal components of a mobile phone such as a front-facing camera, a receiver, a fingerprint reader, and an antenna need to be rearranged. Especially for an antenna design, a clearance area is reduced and antenna space is further compressed, and the size, bandwidth, and efficiency of the antenna are correlated and affect each other. If the antenna size (space) is reduced, an efficiency-bandwidth product (efficiency-bandwidth product) of the antenna is definitely reduced. Therefore, the bezel-less screen ID poses great challenges to the antenna design of the mobile phone.

In addition, with development of the mobile internet, use scenarios start to increase, such as a call scenario, a landscape/portrait-mode game scenario, a landscape-mode audio/video scenario, and a portrait-mode internet access scenario. In different use scenarios, a gesture with which a user holds an electronic device such as a mobile phone changes greatly. Radiation efficiency of an antenna is easily interfered by nearby human tissues, for example, is interfered because the electronic device is held by the user or is close to the head. Therefore, an antenna system with good performance in a plurality of use scenarios is urgently required.

SUMMARY

Embodiments provide an electronic device. An intelligent multi-antenna solution in which antennas are laid out at the top, the side, and the bottom of the electronic device is used, so that three antenna groups including a top antenna group, a middle antenna group, and a bottom antenna group are respectively formed, and antenna performance in a plurality of scenarios such as a free-space scenario, a portrait-mode holding scenario (for example, a voice call scenario), and a landscape-mode holding scenario (for example, a game play scenario) is considered, to improve antenna radiation efficiency.

According to a first aspect, an electronic device may include a multi-antenna system. A housing of the electronic device has a peripheral conductive structure. The peripheral conductive structure may be made of a conductive material such as metal. The peripheral conductive structure may extend around peripheries of the electronic device and a display screen. The peripheral conductive structure may surround four sides of the display screen to help fasten the display screen. The peripheral conductive structure may include an upper frame, a lower frame, and a side frame. The upper frame may have at least one top gap, the lower frame may have at least one bottom gap, and the side frame may have at least one side gap.

The multi-antenna system may include a top antenna, a bottom antenna, a side antenna, and a first antenna switching switch.

The top antenna may include the upper frame, the top gap, and a top feed point, and the top feed point is disposed on the upper frame. The bottom antenna may include the lower frame, the bottom gap, and a bottom feed point, and the bottom feed point is disposed on the lower frame. The side antenna may include the side frame, the side gap, and a side feed point, and the side feed point is disposed on the side frame.

The top antenna, the bottom antenna, and the side antenna are connected to the first antenna switching switch, and the first antenna switching switch is configured to select one of the top antenna, the bottom antenna, and the side antenna as a main antenna for cellular mobile communication.

It may be learned that, in the antenna design solution provided in the first aspect, an intelligent multi-antenna solution in which antennas are laid out at the top, the side, and the bottom of the electronic device is used, so that three antenna groups including a top antenna group, a middle antenna group, and a bottom antenna group are respectively formed, and antenna performance in a plurality of scenarios such as a free-space scenario, a portrait-mode holding scenario, and a landscape-mode holding scenario is considered, to improve antenna radiation efficiency.

According to the first aspect, the upper frame may be disposed at the top of the electronic device, and the lower frame may be disposed at the bottom of the electronic device. A first side frame and a second side frame may be respectively disposed on two sides of the electronic device. The upper frame may include one horizontal part and two vertical parts. A length of the vertical part does not exceed a first length, for example, 20 millimeters. Similarly, the lower frame may also include one horizontal part and two vertical parts. A length of the vertical part does not exceed a second length. The second length may be the same as the first length, and both may be, for example, 20 millimeters. The second length may be different from the first length.

With reference to the first aspect, in some embodiments, the first antenna switching switch may be configured to select an antenna with optimal signal quality from the top antenna, the bottom antenna, and the side antenna as the main antenna for cellular mobile communication.

With reference to the first aspect, in some embodiments, the first antenna switching switch may be further configured to select one of the top antenna, the bottom antenna, and the side antenna as a diversity antenna for cellular mobile communication.

With reference to the first aspect, in some embodiments, the first antenna switching switch may be further configured to select an antenna with suboptimal signal quality from the top antenna, the bottom antenna, and the side antenna as the diversity antenna for cellular mobile communication.

With reference to the first aspect, in some embodiments, the top gap may include a first top gap and a second top gap, the first top gap may be disposed on a first side of the horizontal part of the upper frame, and the second top gap may be disposed on a second side of the horizontal part of the upper frame. The top feed point may include a first top feed point and a second top feed point, the first top feed point may be disposed on the first side of the upper frame, and the second top feed point may be disposed on the second side of the upper frame. The top antenna may include a first top antenna and a second top antenna, the first top antenna may include a first part of the upper frame, the first top feed point, and the first top gap. The second top antenna may include a second part of the upper frame, the first top feed point, and the second top gap. The first part may be located on the first side, and the second part may be located on the second side.

With reference to the first aspect, in some embodiments, the side frame may include a first side frame and a second side frame, the first side frame may be located on a first side of the electronic device, and the second side frame may be located on a second side of the electronic device. The side gap may include a first side gap disposed on the first side frame and a second side gap disposed on the second side frame. The side feed point may include a first side feed point disposed on the first side frame and a second side feed point disposed on the second side frame. The side antenna may include a first side antenna and a second side antenna. The first side antenna may include the first side frame, the first side feed point, and the first side gap. The second side antenna may include the second side frame, the second side feed point, and the second side gap.

With reference to the first aspect, in some embodiments, in the free-space scenario, the bottom antenna and the second top antenna may be respectively used as the main antenna and the diversity antenna for cellular mobile communication by default. The first antenna switching switch may be connected to the bottom antenna, the second top antenna, the first side antenna, and the second side antenna. The first antenna switching switch may be configured to select the main antenna from the bottom antenna, the second top antenna, the first side antenna, and the second side antenna based on signal receiving/sending quality.

With reference to the first aspect, in some embodiments, to improve isolation between adjacent antennas, a ground point (which may be referred to as a first ground point) may be disposed between adjacent antennas in the multi-antenna system. A ground point (which may be referred to as a second ground point) may be disposed on a peripheral conductive structure between the bottom feed point of the bottom antenna and the second side feed point of the second side antenna. A ground point (which may be referred to as a third ground point) may be disposed on a peripheral conductive structure between the second side feed point of the second side antenna and the second top feed point of the second top antenna. A ground point (which may be referred to as a fourth ground point) may be disposed on a peripheral conductive structure between the first top feed point of the first top antenna and the second top feed point of the second top antenna. A ground point (which may be referred to as a fifth ground point) may be disposed on a peripheral conductive structure between the first top feed point of the first top antenna and the first side feed point of the first side antenna.

With reference to the first aspect, in some embodiments, the peripheral conductive structure may be connected to a tuning switch on one or two sides of each of the top gap, the bottom gap, and the side gap, to perform the following operations on peripheral conductive segments on the two sides of the gap: tuning a frequency band and improving antenna performance by using a combined state of switches.

With reference to the first aspect, in some embodiments, Wi-Fi antenna of the electronic device may be implemented by using the top antenna by default. For example, the first top antenna may be used as a Wi-Fi 2.4G Core0 antenna, and the second top antenna may be used as a Wi-Fi 2.4G Core1 antenna. The Core0 antenna and the Core1 antenna form Wi-Fi dual antennas, and the dual antennas may be used to receive and send signals.

With reference to the first aspect, in some embodiments, in a Wi-Fi scenario, when signal quality of the top antenna is poor, the Wi-Fi antenna may be further switched from the top antenna to the middle antenna. In other words, the Wi-Fi antenna may be switched between the top antenna and the middle antenna, to improve performance similar to an antenna for cellular mobile communication. A specific implementation of such antenna switching may be as follows: The multi-antenna system may further include a second antenna switching switch and a third antenna switching switch. The second antenna switching switch is connected to the second side antenna and the second top antenna, and the second antenna switching switch is configured to select an antenna with better signal quality from the second side antenna and the second top antenna as the wireless fidelity Wi-Fi antenna. The third antenna switching switch is connected to the first side antenna and the first top antenna, and the third antenna switching switch is configured to select an antenna with better signal quality from the first side antenna and the first top antenna as the wireless fidelity Wi-Fi antenna.

With reference to the first aspect, in some embodiments, the multi-antenna system may be implemented as a 4× cellular mobile antenna, and four receive antennas used to receive a signal are distributed at three positions including the top, the middle, and the bottom of the electronic device. This can adapt to various scenarios in which a user holds the electronic device and ensures signal receiving performance of the electronic device.

Manner 1: The bottom antenna may be used as the main antenna, and the second top antenna may be used as the diversity antenna. The first top antenna and the second side antenna may be used as the Wi-Fi antenna. The main antenna and the diversity antenna for cellular mobile communication may be switched among the bottom antenna, the second top antenna, the second side antenna, and the first side antenna. The Wi-Fi 2.4G Core0 antenna may be switched between the first top antenna and the first side antenna. The Wi-Fi 2.4G Core1 antenna may be switched between the second side antenna and the second top antenna. In addition to the bottom antenna used as the main antenna and the second top antenna used as the diversity antenna, the first top antenna and the second side antenna may be further used for cellular mobile communication, to form four receive antennas and support a 4×4 MIMO architecture.

Manner 2: The bottom antenna may be used as the main antenna, and the second top antenna may be used as the diversity antenna. The first top antenna and the second side antenna may be used as the Wi-Fi antenna. The main antenna and the diversity antenna for cellular mobile communication may be switched among the bottom antenna, the second top antenna, the second side antenna, and the first side antenna. The Wi-Fi 2.4G Core0 antenna may be switched between the first top antenna and the first side antenna. The Wi-Fi 2.4G Core1 antenna may be switched between the second side antenna and the second top antenna. In addition to the bottom antenna used as the main antenna and the second top antenna used as the diversity antenna, the second side antenna and the first side antenna may be further used for cellular mobile communication, to form four receive antennas and support a 4×4 MIMO architecture.

As shown in FIG. 8C, the bottom antenna may be used as the main antenna, and the second top antenna may be used as the diversity antenna. The first top antenna and the second side antenna may be used as the Wi-Fi antenna. The main antenna and the diversity antenna for cellular mobile communication may be switched among the bottom antenna, the second top antenna, the second side antenna, and the first side antenna. The Wi-Fi 2.4G Core0 antenna may be switched between the first top antenna and the first side antenna. The Wi-Fi 2.4G Core1 antenna may be switched between the second side antenna and the second top antenna. In addition to the bottom antenna used as the main antenna and the second top antenna used as the diversity antenna, the first top antenna and the second side antenna may be further used for cellular mobile communication, to form four receive antennas and support a 4×4 MIMO architecture.

As shown in FIG. 8D, the bottom antenna may be used as the main antenna, and the second side antenna may be used as the diversity antenna. The first top antenna and the second top antenna may be used as the Wi-Fi antenna. The main antenna and the diversity antenna for cellular mobile communication may be switched among the bottom antenna, the second top antenna, the second side antenna, and the first side antenna. The Wi-Fi 2.4G Core0 antenna may be switched between the first top antenna and the first side antenna. The Wi-Fi 2.4G Core1 antenna may be switched between the second side antenna and the second top antenna. In addition to the bottom antenna used as the main antenna and the second side antenna used as the diversity antenna, the second top antenna and the first top antenna may be further used for cellular mobile communication, to form four receive antennas and support a 4×4 MIMO architecture.

According to a second aspect, an electronic device may include a multi-antenna system. A housing of the electronic device has a peripheral conductive structure. The peripheral conductive structure may be made of a conductive material such as metal. The peripheral conductive structure may extend around peripheries of the electronic device and a display screen. The peripheral conductive structure may surround four sides of the display screen to help fasten the display screen. The peripheral conductive structure may include an upper frame, a lower frame, and a first side frame. The upper frame may have at least one top gap, the lower frame may have at least one bottom gap, and the first side frame may have at least one first side gap.

The multi-antenna system may include a first antenna, a second antenna, a first antenna switching switch, and a plurality of tuning switches. Details are as follows:

The first antenna may include the lower frame, the bottom gap, a first feed point, the first side frame, and the first side gap. The first feed point is disposed on a peripheral conductive structure between the bottom gap and the first side gap. The second antenna may include the upper frame, the top gap, and a second feed point. The second feed point is disposed on the upper frame.

The first antenna switching switch may be connected to the first antenna and the second antenna, and the first antenna switching switch is configured to select an antenna with better signal quality from the first antenna and the second antenna.

The plurality of tuning switches may include at least one first tuning switch connected to the lower frame and at least one second tuning switch connected to the first side frame. The first tuning switch may be disposed on one or two sides of the bottom gap. The second tuning switch may be disposed on one or two sides of the first side gap. The first tuning switch may be configured to be selectively opened or closed. The second tuning switch may be configured to be selectively opened or closed.

It may be learned that, in the antenna design solution provided in the second aspect, intelligent switching between the first antenna and the second antenna may be implemented by using the first antenna switching switch connected to the first antenna and the second antenna. In addition, the first antenna has two radiation modes, and the radiation mode of the first antenna may be switched by adjusting a combined state of the first tuning switch and the second tuning switch. In this way, this can adapt to more application scenarios, and improve antenna radiation efficiency.

According to the second aspect, the upper frame may be disposed at the top of the electronic device, and the lower frame may be disposed at the bottom of the electronic device. The first side frame and a second side frame may be respectively disposed on two sides of the electronic device. The upper frame may include one horizontal part and two vertical parts. A length of the vertical part does not exceed a first length, for example, 20 millimeters. Similarly, the lower frame may also include one horizontal part and two vertical parts. A length of the vertical part does not exceed a second length. The second length may be the same as the first length, and both may be, for example, 20 millimeters. The second length may be different from the first length.

With reference to the second aspect, in some embodiments, the first antenna switching switch may be configured to select an antenna with optimal signal quality from the first antenna and the second antenna. The selected antenna with optimal signal quality may be used as a main antenna.

With reference to the second aspect, in some embodiments, when the first tuning switch is in an open state and the second tuning switch is in a close state, the lower frame is fully excited, and may be used as a radiator to generate radiation. In this case, the radiation mode of the first antenna is a horizontal mode, the first antenna would not be affected with the first side gap being held, and holding radiation efficiency is good. The first tuning switch may be further configured to switch a radiation frequency band of the lower frame in the horizontal mode, for example, perform switching between low-frequency bands such as LTE B5, LTE B8, and LTE B28.

With reference to the second aspect, in some embodiments, when the second tuning switch is in an open state and the first tuning switch is in a close state, the first side frame is fully excited, and may be used as a radiator to generate radiation. In this case, the radiation mode of the first antenna is a vertical mode, and free-space radiation efficiency is good. The second tuning switch may be further configured to switch a radiation frequency band of the first side frame in the vertical mode, for example, perform switching between low-frequency bands such as LTE B5, LTE B8, and LTE B28.

With reference to the second aspect, in some embodiments, the second side frame may have at least one second side gap. The multi-antenna system may further include a third antenna. The third antenna includes the second side frame. The second side gap, and a third feed point. The third feed point is disposed on the second side frame. The first antenna switching switch may be further connected to the third antenna and is configured to select an antenna with optimal signal quality from the first antenna, the second antenna, and the third antenna.

According to a third aspect, an electronic device may include a multi-antenna system. A housing of the electronic device has a peripheral conductive structure. The peripheral conductive structure may be made of a conductive material such as metal. The peripheral conductive structure may extend around peripheries of the electronic device and a display screen. The peripheral conductive structure may surround four sides of the display screen to help fasten the display screen. The peripheral conductive structure may include an upper frame, a lower frame, a first side frame, and a second side frame. The upper frame may have at least one top gap, the lower frame may have at least one bottom gap, the first side frame may have at least one first side gap, and the second side frame may have at least one second side gap.

The multi-antenna system may include a first antenna, a second antenna, a first antenna switching switch, and a plurality of tuning switches. Details are as follows:

The first antenna may include the lower frame, the bottom gap, a first feed point, the first side frame, and the first side gap. The first feed point is disposed on a peripheral conductive structure between the bottom gap and the first side gap. The second antenna may include the upper frame, the top gap, a second feed point, the second side frame, and the second side gap. The second feed point is disposed on a peripheral conductive structure between the top gap and the second side gap.

The first antenna switching switch may be connected to the first antenna and the second antenna, and the first antenna switching switch is configured to select an antenna with better signal quality from the first antenna and the second antenna.

The plurality of tuning switches may include at least one first tuning switch connected to the lower frame, at least one second tuning switch connected to the first side frame, at least one third tuning switch connected to the upper frame, and at least one fourth tuning switch connected to the second side frame. The first tuning switch may be disposed on one or two sides of the bottom gap, the second tuning switch may be disposed on one or two sides of the first side gap, the third tuning switch may be disposed on one or two sides of the top gap, and the fourth tuning switch may be disposed on one or two sides of the second side gap. The first tuning switch may be configured to be selectively opened or closed, the second tuning switch may be configured to be selectively opened or closed, the third tuning switch may be configured to be selectively opened or closed, and the fourth tuning switch may be configured to be selectively opened or closed.

It may be learned that, compared with the antenna solution in the second aspect, in the antenna solution provided in the third aspect, the second antenna is further extended from the upper frame 11-5 at the top to the side frame 11-1, and may radiate an electromagnetic wave by using the top gap 21-2 and the side gap 25. Therefore, there are two radiation modes. In this way, the radiation mode of the second antenna may be further switched by adjusting a combined state of the third tuning switch and the fourth tuning switch. This can adapt to more application scenarios and improve antenna radiation efficiency.

According to a fourth aspect, an antenna switching method may be applied to an electronic device. The electronic device may have a housing, a display screen, a first SAR sensor, a second SAR sensor, and a motion sensor. The housing may have a peripheral conductive structure, and the peripheral conductive structure may include an upper frame, a lower frame, and a side frame. The upper frame has a top gap, the lower frame has a bottom gap, and the side frame has a side gap. The first SAR sensor is disposed at the top of the electronic device, and the second SAR sensor is disposed at the bottom of the electronic device. The electronic device further has a top antenna group distributed at the top of the electronic device, a bottom antenna group distributed at the bottom of the electronic device, and a middle antenna group distributed in the middle of the electronic device.

The antenna switching method may include the following: If the display screen is in a screen-off state, the electronic device selects the bottom antenna group as a first antenna group. If the display screen is in a screen-on state, the electronic device determines a current scenario by using the first SAR sensor, the second SAR sensor, and the motion sensor, and selects the first antenna group from the top antenna group, the bottom antenna group, and the middle antenna group based on the current scenario. Then, the electronic device may perform antenna switching in the first antenna group based on signal quality.

The current scenario includes any one of the following: a scenario in which a user holds the bottom of the electronic device in a portrait mode, a scenario in which the user holds the top of the electronic device in the portrait mode, a scenario in which the user holds the middle of the electronic device in the portrait mode, a scenario in which the user holds the bottom of the electronic device in a landscape mode, a scenario in which the user holds the top of the electronic device in the landscape mode, a scenario in which the user holds the top and the bottom of the electronic device in the landscape mode, and a scenario in which the user holds the middle of the electronic device in the landscape mode.

With reference to the fourth aspect, in some embodiments, that the electronic device performs antenna switching in the first antenna group based on signal quality may include the following: The electronic device selects an antenna with optimal signal quality from the first antenna group.

With reference to the fourth aspect, in some embodiments, the electronic device may select the top antenna group as the optimal antenna group if the current scenario is determined to be the scenario in which the bottom of the electronic device is held by the user in the portrait mode. The electronic device may select the bottom antenna group as the optimal antenna group if the current scenario is determined to be the scenario in which the top of the electronic device is held by the user in the portrait mode. The electronic device may select the bottom antenna group as the optimal antenna group if the current scenario is determined to be the scenario in which the middle of the electronic device is held by the user in the portrait mode.

With reference to the fourth aspect, in some embodiments, the electronic device may select the top antenna group as the optimal antenna group if the current scenario is determined to be the scenario in which the bottom of the electronic device is held by the user in the landscape mode. The electronic device may select the bottom antenna group as the optimal antenna group if the current scenario is determined to be the scenario in which the top of the electronic device is held by the user in the landscape mode. The electronic device may select the middle antenna group as the optimal antenna group if the current scenario is determined to be the scenario in which both the top and the bottom of the electronic device are held by the user in the landscape mode (for example, landscape-mode holding 3). The electronic device may select the bottom antenna group as the optimal antenna group if the current scenario is determined to be the scenario in which the middle of the electronic device is held by the user in the landscape mode.

According to the first aspect, the second aspect, the third aspect, and the fourth aspect, the upper frame may be disposed at the top of the electronic device, and the lower frame may be disposed at the bottom of the electronic device. The first side frame and the second side frame may be respectively disposed on the two sides of the electronic device. The upper frame may include one horizontal part and two vertical parts. The length of the vertical part does not exceed the first length, for example, 20 millimeters. Similarly, the lower frame may also include one horizontal part and two vertical parts. The length of the vertical part does not exceed the second length. The second length may be the same as the first length, and both may be, for example, 20 millimeters. The second length may be different from the first length.

BRIEF DESCRIPTION OF DRAWINGS

To describe solutions in embodiments more clearly, the following describes the accompanying drawings in the embodiments.

DETAILED DESCRIPTION OF THE EMBODIMENTS

The following describes embodiments with reference to the accompanying drawings.

The solutions provided may be applicable to an electronic device that uses one or more of the following communications technologies: a Bluetooth (BT) communications technology, a global positioning system (GPS) communications technology, a wireless fidelity (Wi-Fi) communications technology, a global system for mobile communications (GSM) communications technology, a wideband code division multiple access (WCDMA) communications technology, a long term evolution (LTE) communications technology, a 5G communications technology, a sub6G communications technology, and other future communications technologies. The electronic device may be a mobile phone, a tablet computer, a personal digital assistant (PDA), or the like.

Figure 1:
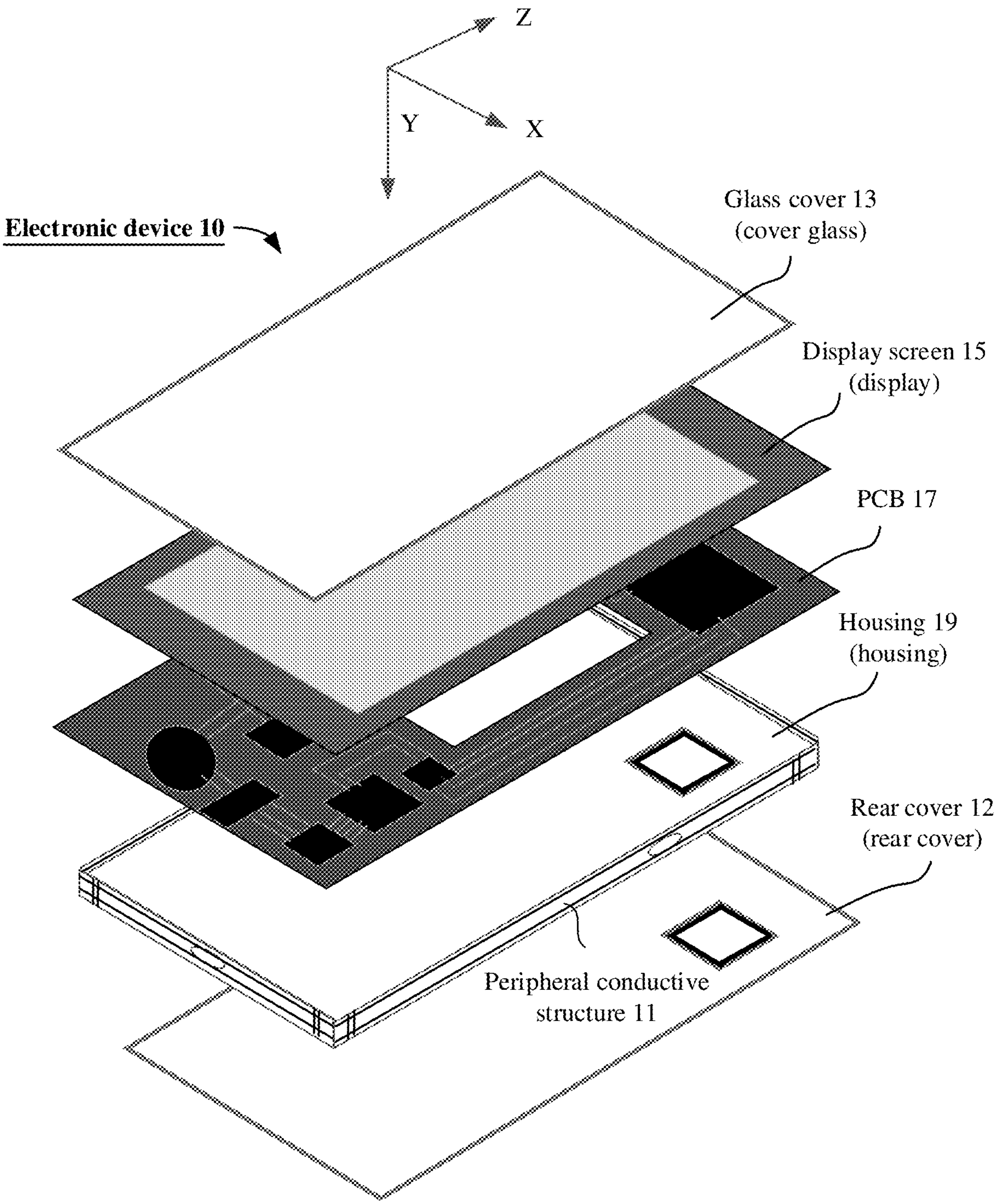
FIG. 1 is a schematic diagram of a structure of an electronic device on which an antenna design solution is based.

FIG. 1 shows an example of an internal environment of an electronic device on which an antenna may be based. As shown in FIG. 1, the electronic device 10 may include a glass cover 13, a display screen 15, a printed circuit board PCB 17, a housing 19, and a rear cover 12.

The glass cover 13 may be disposed against the display screen 15 and may be used to protect the display screen 15 against dust. The display screen 15 of the electronic device 10 may be a large-sized display screen, and a screen-to-body ratio may reach more than 90%.

The printed circuit board PCB 17 may be an FR-4 dielectric board or may be a Rogers dielectric board, may be a dielectric board mixing Rogers and FR-4, or the like. Herein, FR-4 is a grade designation for a flame-retardant material, and the Rogers dielectric board is a high frequency board. A metal layer may be disposed on a side of the printed circuit board PCB 17 that is close to the housing 19, and the metal layer may be formed by etching metal on a surface of the PCB 17. The metal layer may be used to ground an electronic element born on the printed circuit board PCB 17, to prevent a user from getting an electric shock or prevent the device from being damaged.

The housing 19 is used to support the entire device. The housing 19 may include a peripheral conductive structure 11, and the structure 11 may be made of a conductive material such as metal. The structure 11 may extend around peripheries of the electronic device 10 and the display screen 15. The structure 11 may surround four sides of the display screen 15 to help fasten the display screen 15. In an implementation, the structure 11 made of the metal material may be directly used as a metal frame of the electronic device 10 to form a metal frame appearance, and this is applicable to a metal ID. In another implementation, a non-metal frame such as a plastic frame may be disposed on an outer surface of the structure 11 to form a non-metal frame appearance, and this is applicable to a non-metal ID.

Figure 2A:
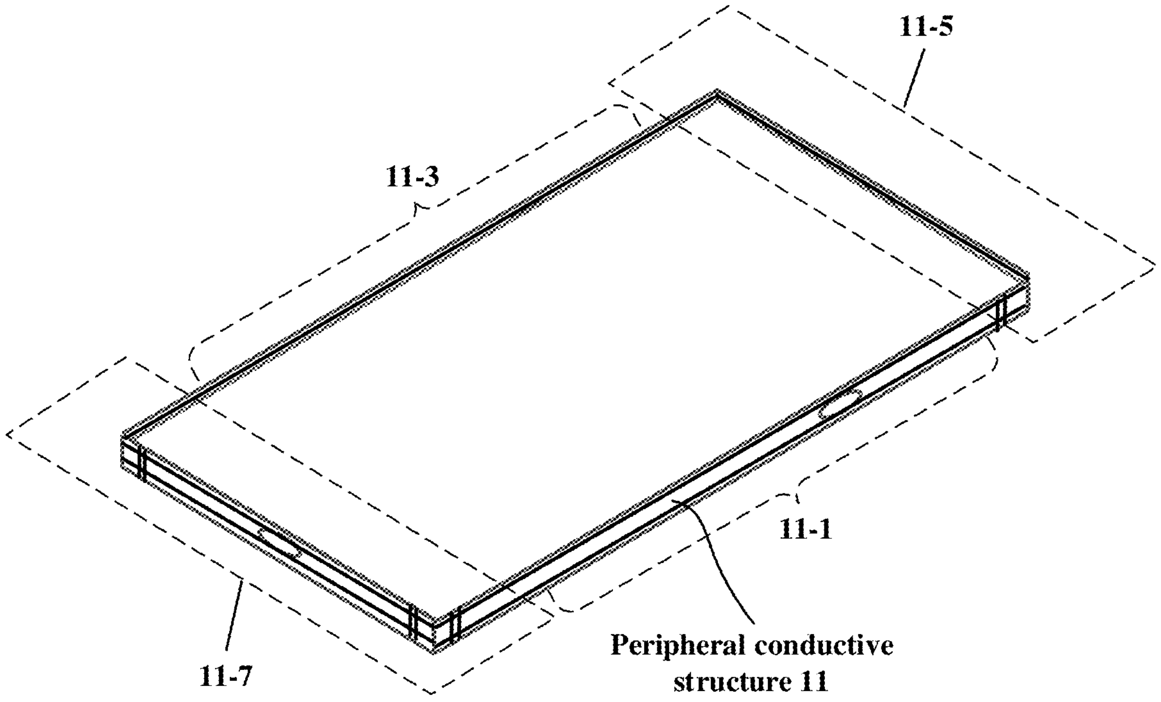
FIG. 2A and FIG. 2B are schematic diagrams of a structure of a peripheral conductive structure.

As shown in FIG. 2A, the peripheral conductive structure 11 may be divided into four parts. Based on different position of the parts in the electronic device, the four parts may be named an upper frame 11-5, a lower frame 11-7, a side frame 11-3, and a side frame 11-1. The upper frame 11-5 may be disposed at the top of the electronic device 10, and the lower frame 11-7 may be disposed at the bottom of the electronic device 10. The side frames 11-3 and 11-1 may be respectively disposed on two sides of the electronic device 10. Components such as a front-facing camera (not shown), an earpiece (not shown), and an optical proximity sensor (not shown) may be disposed at the top of the electronic device 10. A USB charging interface (not shown), a microphone (not shown), and the like may be disposed at the bottom of the electronic device 10. A volume adjustment button (not shown) and a power button (not shown) may be disposed at the lateral sides of the electronic device 10.

Figure 2B:
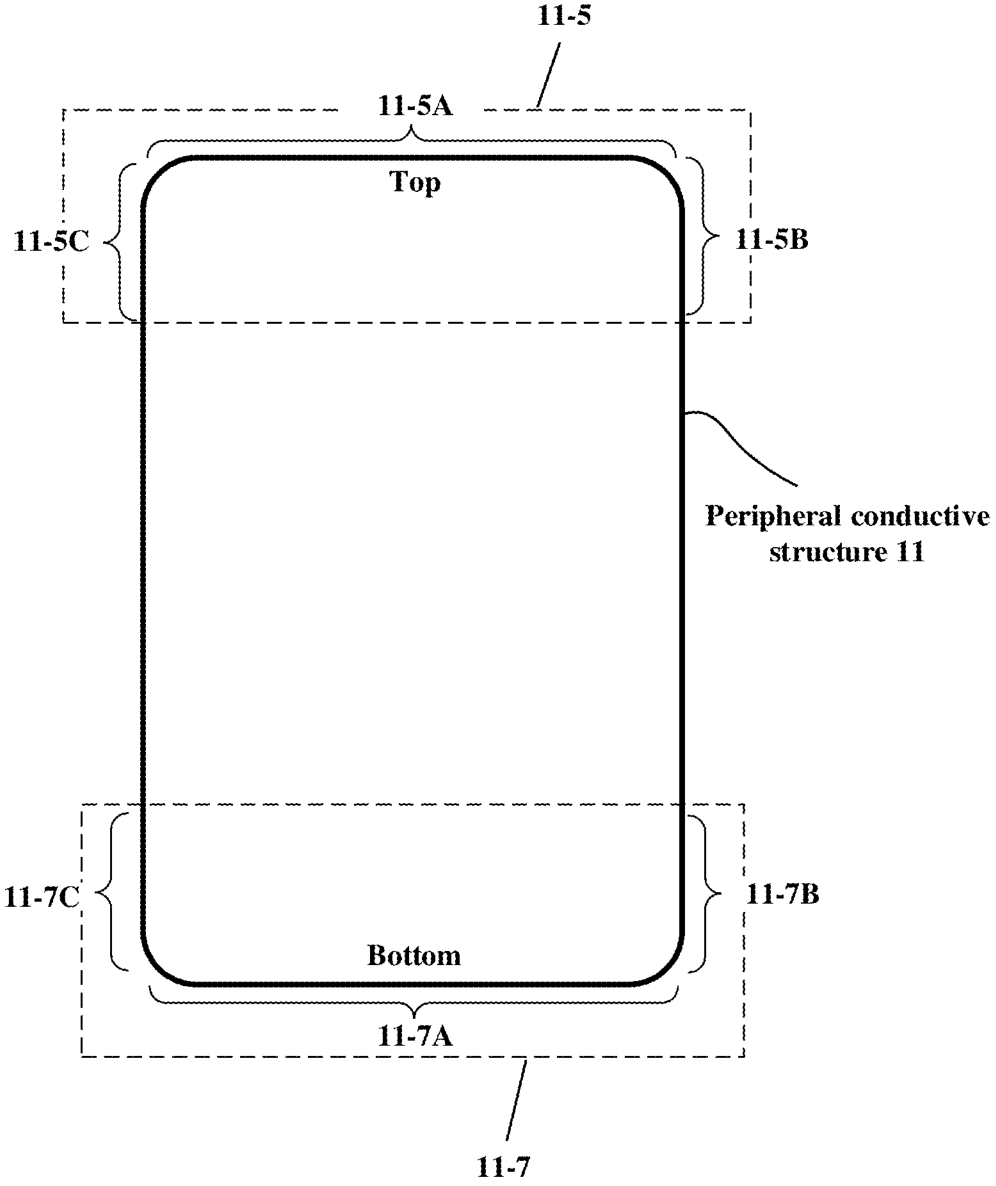

As shown in FIG. 2B, the upper frame 11-5 may include one horizontal part 11-5A and two vertical parts 11-5B and 11-5C. A length of the vertical part does not exceed a first length, for example, 20 millimeters. Similarly, the lower frame 11-7 may also include one horizontal part 11-7A and two vertical parts 11-7B and 11-7C. A length of the vertical part does not exceed a second length. The second length may be the same as the first length, and both may be, for example, 20 millimeters. The second length may be different from the first length.

The rear cover 12 is a rear cover made of a non-conductive material, for example, a non-metal rear cover such as a glass rear cover or a plastic rear cover.

FIG. 1 shows only an example of some components included in the electronic device 10. Actual shapes, actual sizes, and actual construction of these components are not limited in FIG. 1.

An antenna of the electronic device 10 may be implemented by using the structure 11, to resolve a problem that an antenna clearance area is reduced due to a bezel-less screen ID. The structure 11 may have a gap, and an electromagnetic wave is radiated through the gap. The gap may be filled with a material such as a polymer, glass, and a ceramic, or a combination of these materials.

FIG. 3A to FIG. 3D show several conventional technologies for implementing the antenna of the electronic device by using the structure 11.

Figure 3A:
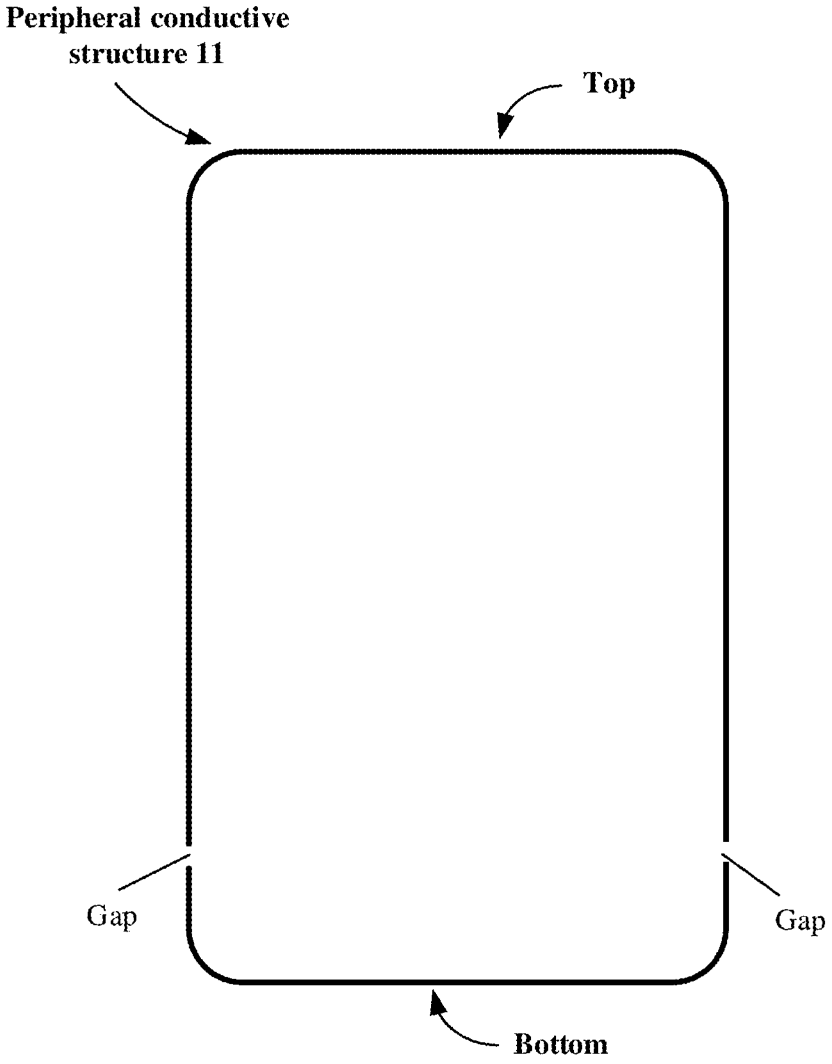
FIG. 3A to FIG. 3D are schematic diagrams of several conventional technologies in which an antenna is designed by using a peripheral conductive structure.

Conventional technology 1: For example, as shown in FIG. 3A, the peripheral conductive structure 11 has gaps at positions that are on sides of the electronic device 10 and that are close to the bottom. Because the gaps are disposed on the two sides, an antenna provided in the conventional technology 1 has good free-space efficiency. However, in a scenario in which the user makes a call by holding the electronic device 10 in a portrait mode, a hand of the user very easily holds or covers the gap. Consequently, the antenna is blocked, and an antenna signal is extremely weak or even there is no signal.

Figure 3B:
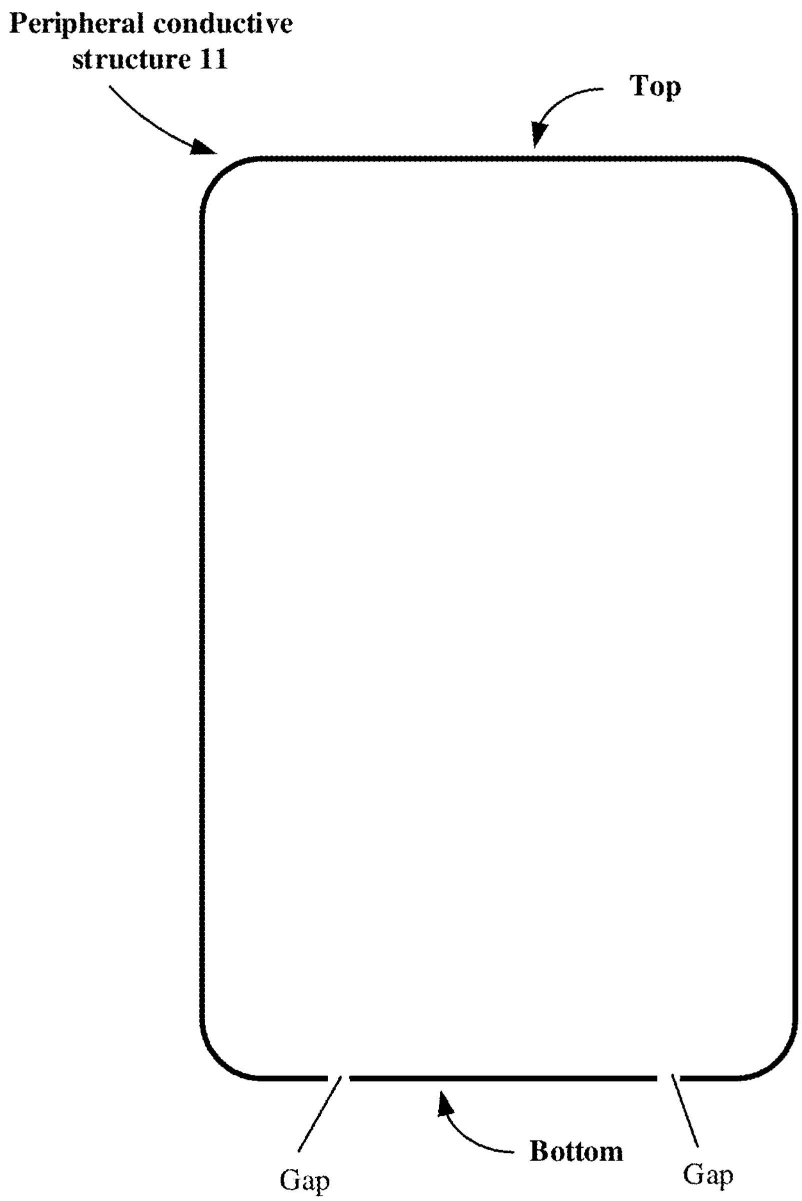
Figure 3C:
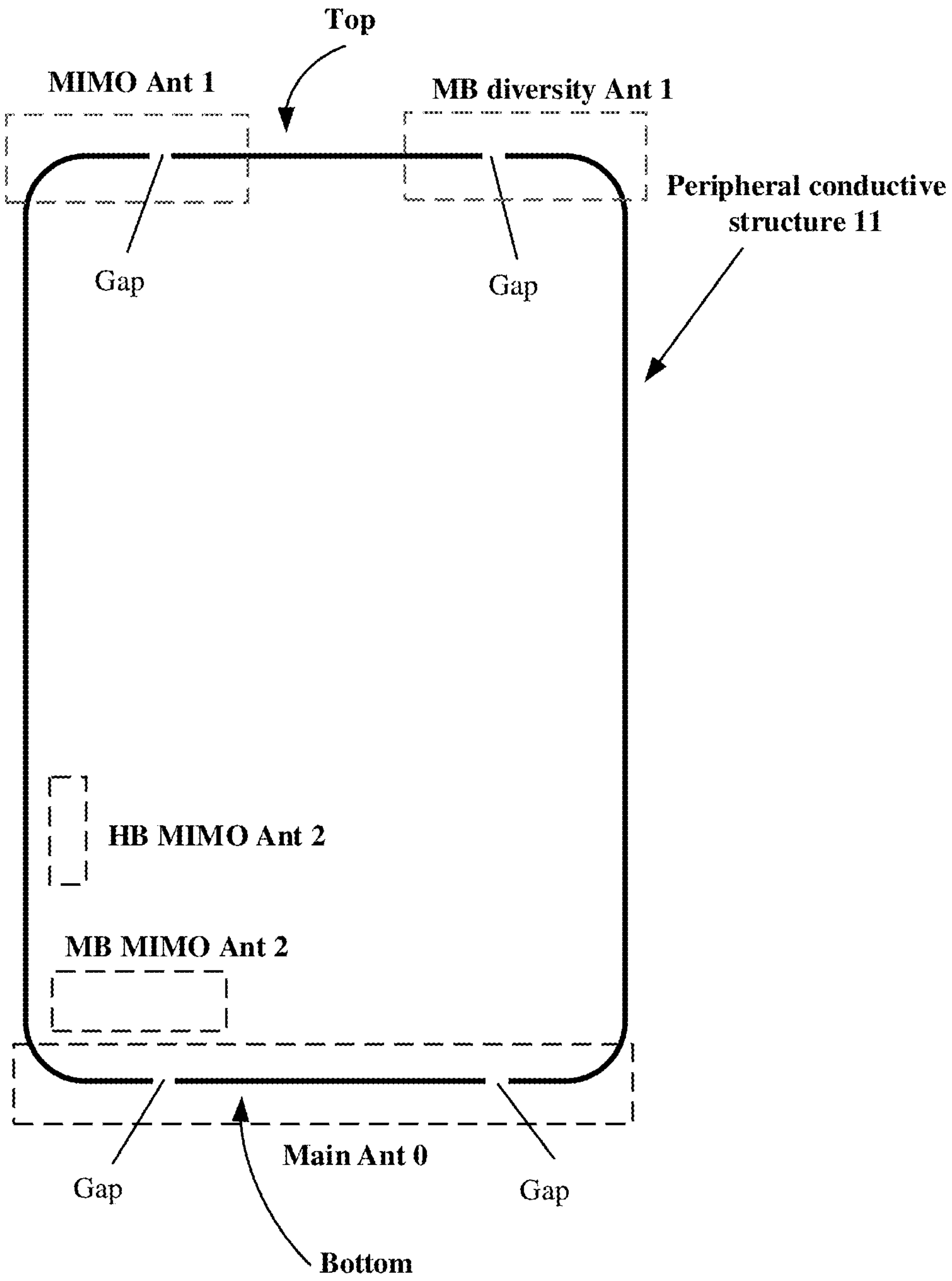
Figure 3D:
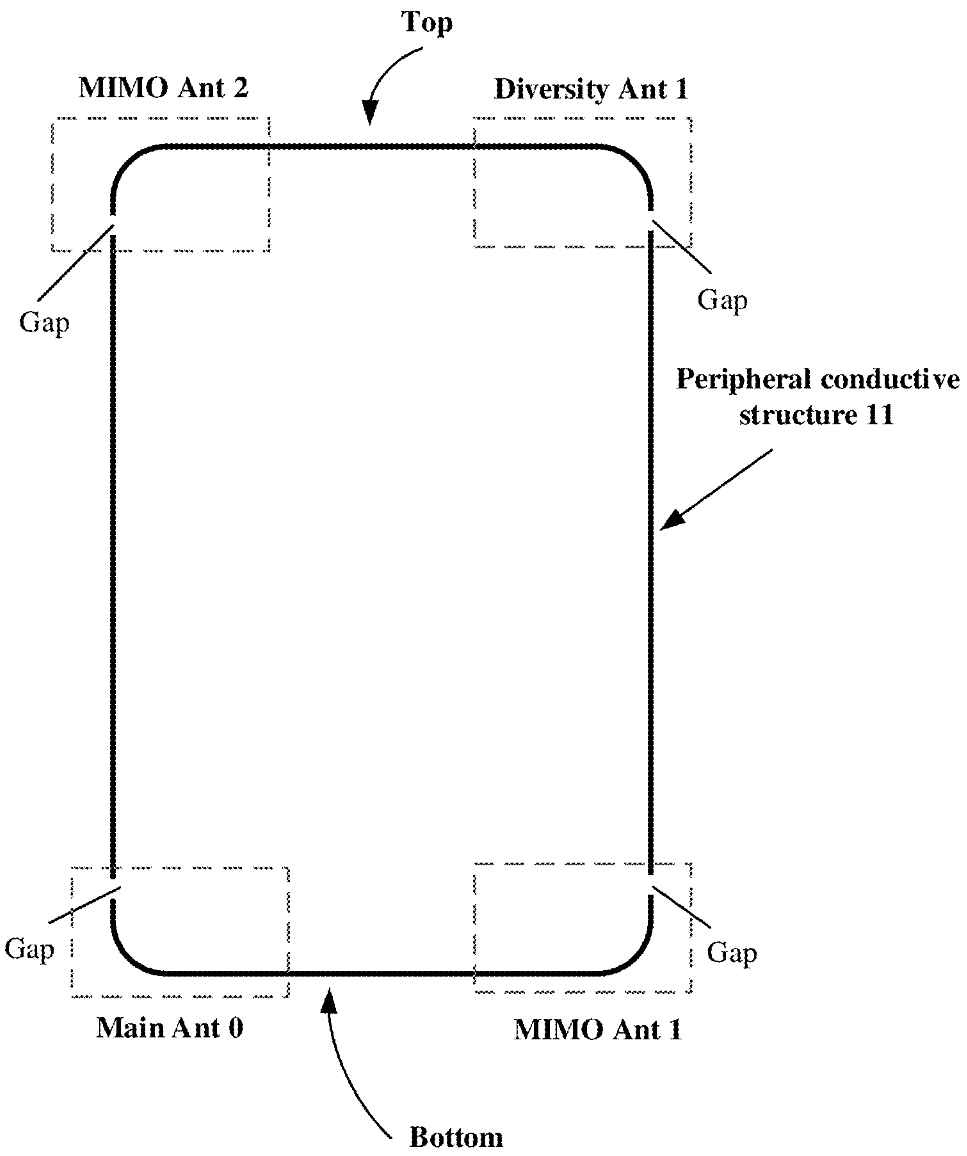

Conventional technology 2: For example, as shown in FIG. 3B, the peripheral conductive structure 11 has gaps at positions that are at the bottom but close to the two sides of the electronic device 10. In an antenna design provided in the conventional technology 2, an antenna radiator is small, and antenna efficiency is not high. Therefore, antenna performance needs to be improved by increasing antenna clearance. This conflicts with the fact of reducing the antenna clearance area in the antenna design in the bezel-less screen ID. In addition, in a scenario in which the user makes a call by holding the electronic device 10 in the portrait mode, a hand of the user is close to the gap, or in an extreme case, the hand of the user may exactly hold or cover the gap. Consequently, the antenna is completely blocked, and an antenna signal is extremely weak or even there is no signal.

Conventional technology 3: For example, in a 4×4 MIMO antenna design shown in FIG. 3C, the peripheral conductive structure 11 has gaps at positions at the bottom and the top but close to the two sides of the electronic device 10, and four antennas include a MIMO Ant 1, a diversity Ant 1, a MIMO Ant 2, and a main Ant 0. The MIMO Ant 2 is disposed on an internal support. Because an internal antenna clearance area is small, an antenna height is small, for example, within 1.5 millimeters. Consequently, antenna radiation efficiency is very low. In addition, in a scenario in which the user makes a call by holding the electronic device 10, due to impact caused by hold of the electronic device 10 by the user, antenna performance of the MIMO Ant 2 is further deteriorated.

Conventional technology 4: For example, in a 4×4 MIMO antenna design shown in FIG. 3D, the peripheral conductive structure 11 has gaps at positions on the two sides but close to the top and the bottom of the electronic device 10, four antennas are all implemented by using the structure 11, and the four antennas include a MIMO Ant 1, a diversity Ant 1, a MIMO Ant 2, and a main Ant 0. A transmit antenna switch (TAS) technology may be used for switching between the main Ant 0 and the diversity Ant 1. In this way, in a scenario in which the user makes a call by holding the electronic device 10, the TAS technology is used to switch the main antenna upward to the top antenna Ant 1 and switch the diversity antenna downward to the bottom antenna Ant 0. This can ensure antenna performance of the main antenna. However, after the diversity antenna is switched downward to the bottom antenna, radiation efficiency is significantly reduced.

The conventional technology 3 and conventional technology 4 described above may be referred to as "top-bottom antenna layout". In such antenna layout, the bottom antenna is usually a main antenna, and the top antenna is usually a diversity antenna. Herein, "top" means being close to the top of the electronic device, and "bottom" means being close to the bottom of the electronic device. Impact caused by hold of the electronic device by the user in a call scenario may be eliminated by combining such antenna layout and an intelligent top-bottom antenna switching technology. The intelligent top-bottom antenna switching technology means that an antenna with optimal signal is selected from a bottom antenna and a top antenna as a main antenna based on signal strength of the bottom antenna and the top antenna. In a scenario in which the user makes a call by holding the electronic device 10, the intelligent top-bottom antenna switching technology is used to switch the main antenna upward to the top antenna and switch the diversity antenna downward to the bottom antenna. This can ensure antenna performance of the main antenna. However, after the diversity antenna is switched downward to the bottom antenna, radiation efficiency is significantly reduced.

In addition, as mobile games become increasingly popular, a time for the user to play games by holding the electronic device in a landscape mode is increasingly long. In a scenario in which the user plays games by holding the electronic device in the landscape mode, in the "top-bottom antenna layout" described in the foregoing conventional technologies, both the top antenna and the bottom antenna are easily affected by holding of the electronic device by the user, and an antenna signal is extremely weak. This severely affects game experience of the user, especially in a game with a high delay requirement.

Based on analysis of the foregoing conventional technologies, the antenna design in the bezel-less screen ID is continuously improved in the conventional technologies, to reduce impact on antenna performance caused by hold of the electronic device by the user, and improve antenna performance in some scenarios (for example, in the scenario in which the user makes a call by holding the electronic device 10 in the portrait mode). However, the conventional technologies cannot resolve antenna performance problems in more scenarios.

In an intelligent multi-antenna solution, antennas may be laid out at the top, the side, and the bottom of an electronic device 10, to respectively form three antenna groups including a top antenna group, a middle antenna group, and a bottom antenna group, to implement high antenna performance in a plurality of scenarios such as a free-space scenario, a portrait-mode holding scenario, and a landscape-mode holding scenario is considered, and improve antenna radiation efficiency.

Figure 4:
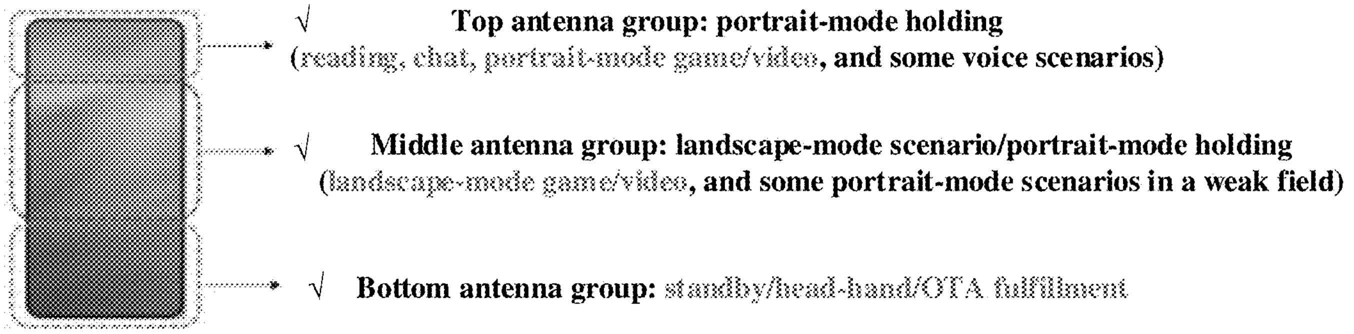
FIG. 4 is a schematic diagram of layout of three antenna groups in an electronic device and respective application scenarios of the three antenna groups.

FIG. 4 shows an example of layout of three antenna groups in an electronic device and respective scenarios of the three antenna groups. As shown in FIG. 4, the three antenna groups include a top antenna group, a middle antenna group, and a bottom antenna group. The top antenna group may be distributed at the top of the electronic device 10 and may be implemented by using an upper frame 11-5 of a structure 11. The middle antenna group may be distributed in the middle of the electronic device 10 and may be implemented by using side frames 11-3 and 11-1 of the structure 11. The bottom antenna group may be distributed at the bottom of the electronic device 10 and may be implemented by using a lower frame 11-7 of the structure 11. The top antenna group may be used as a radiation antenna in a portrait-mode holding scenario. The middle antenna group may be used as a radiation antenna in a landscape-mode holding scenario. The bottom antenna group may be used as a radiation antenna in a free-space scenario.

Figure 5A:
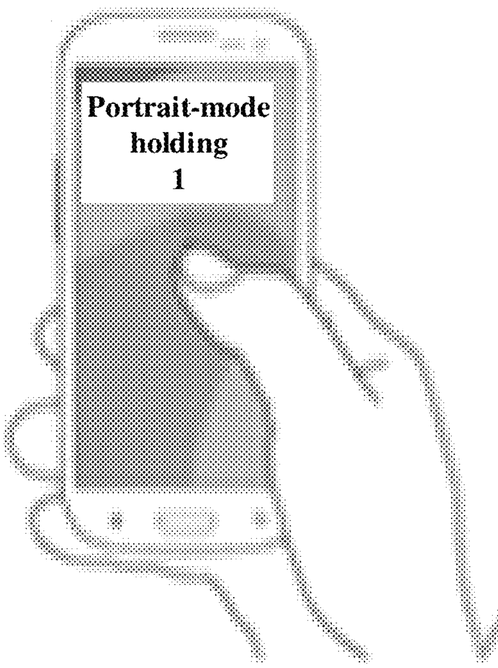
FIG. 5(A) to FIG. 5(D) are schematic diagrams of several typical portrait-mode holding scenarios in an antenna design solution.
Figure 5B:
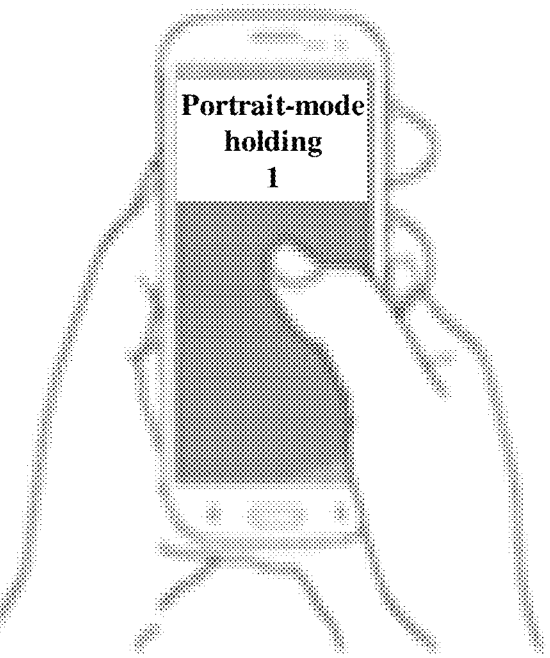
Figure 5C:
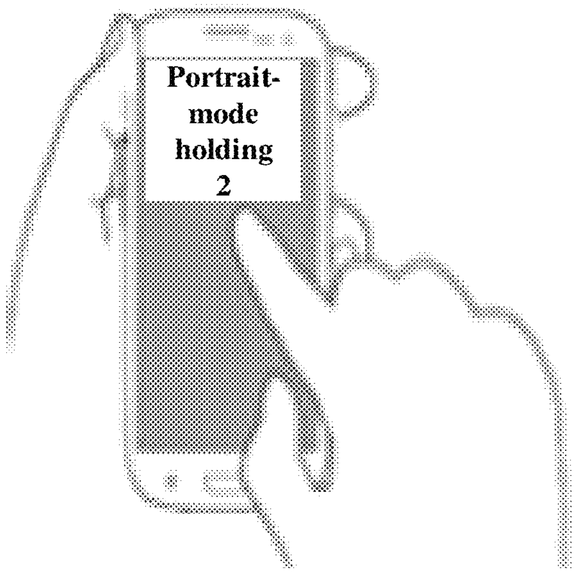
Figure 5D:
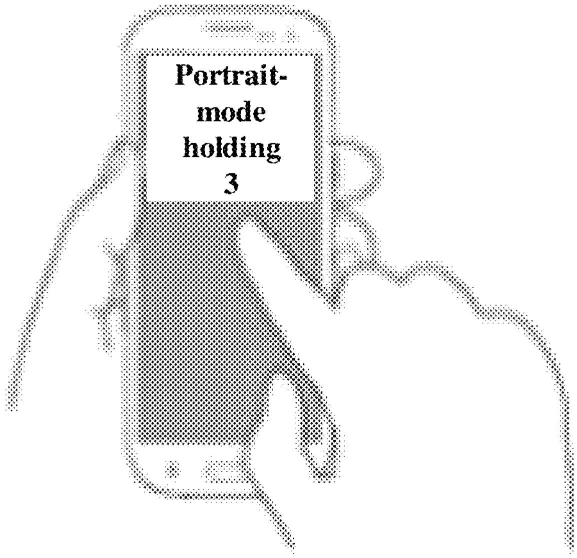
Figure 6A:
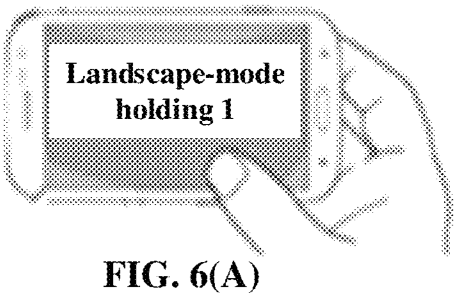
FIG. 6(A) to FIG. 6(D) are schematic diagrams of several typical landscape-mode holding scenarios in an antenna design solution.
Figure 6B:
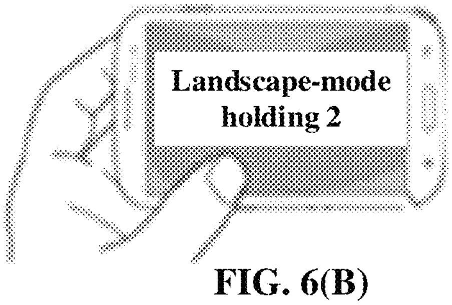
Figure 6C:
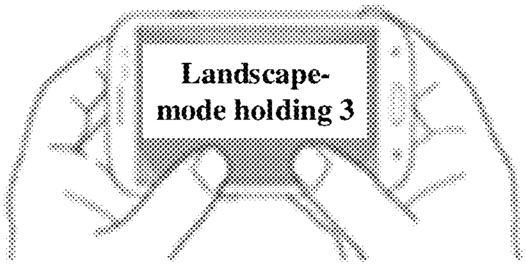
Figure 6D:
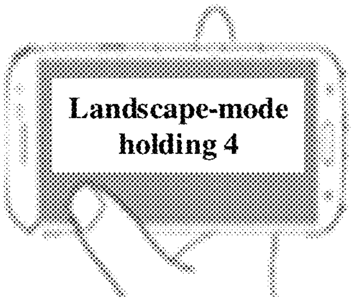

The free-space scenario may be a scenario in which the electronic device 10 is not held by a user. The portrait-mode holding scenario may be a scenario in which the user holds the electronic device in a portrait mode, and may include but is not limited to a scenario in which the user is reading by holding the electronic device in the portrait mode, the user plays games by holding the electronic device in the portrait mode, the user is on a call by holding the electronic device in the portrait mode, and the like. The landscape-mode holding scenario may be a scenario in which the user holds the electronic device in a landscape mode, and may include but is not limited to a scenario in which the user plays games by holding the electronic device in the landscape mode, a scenario in which the user watches a television program by holding the electronic device in the landscape mode, and the like. Several holding gestures in the portrait-mode holding scenario may be shown in FIG. 5(A) to FIG. 5(B). FIG. 5(A), FIG. 5(C), and FIG. 5(D) respectively show gestures with which the user holds the bottom, the top, or the middle of the electronic device by using one hand in the portrait mode, and FIG. 5(B) shows a gesture with which the user holds the middle and the bottom of the electronic device by using two hands in the portrait mode. Several holding gestures in the landscape-mode holding scenario may be shown in FIG. 6(A) to FIG. 6(D). FIG. 6(A) and FIG. 6(B) show gestures with which the user holds the top or the bottom of the electronic device by using one hand in the landscape mode, FIG. 6(C) shows a gesture with which the user holds the top and the bottom of the electronic device by using two hands in the landscape mode, and FIG. 6(D) shows a gesture with which the user holds the middle of the electronic device by using one hand in the landscape mode.

In an antenna solution, a gap may be disposed on the structure 11 at each of the top, the side, and the bottom of the electronic device 10. The gaps divide the structure 11 into a plurality of peripheral conductive segments, and the plurality of peripheral conductive segments may be used to form the three antenna groups shown in FIG. 4 as an example. The following describes in detail the multi-antenna system provided in the embodiments.

Embodiment 1

Figure 7A:
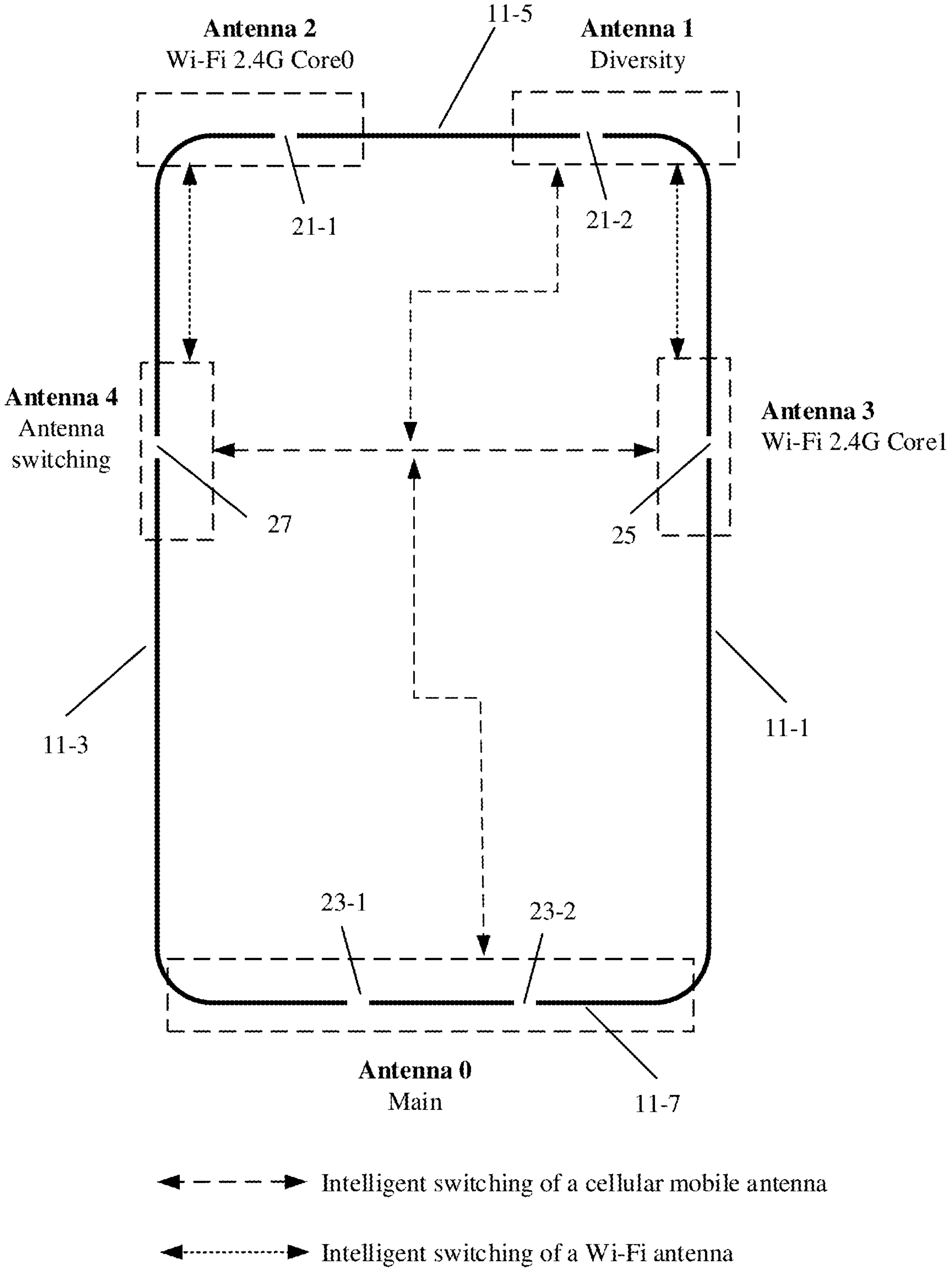
FIG. 7A is a schematic diagram of a structure of an intermediate/high-frequency multi-antenna system.
Figure 7B:
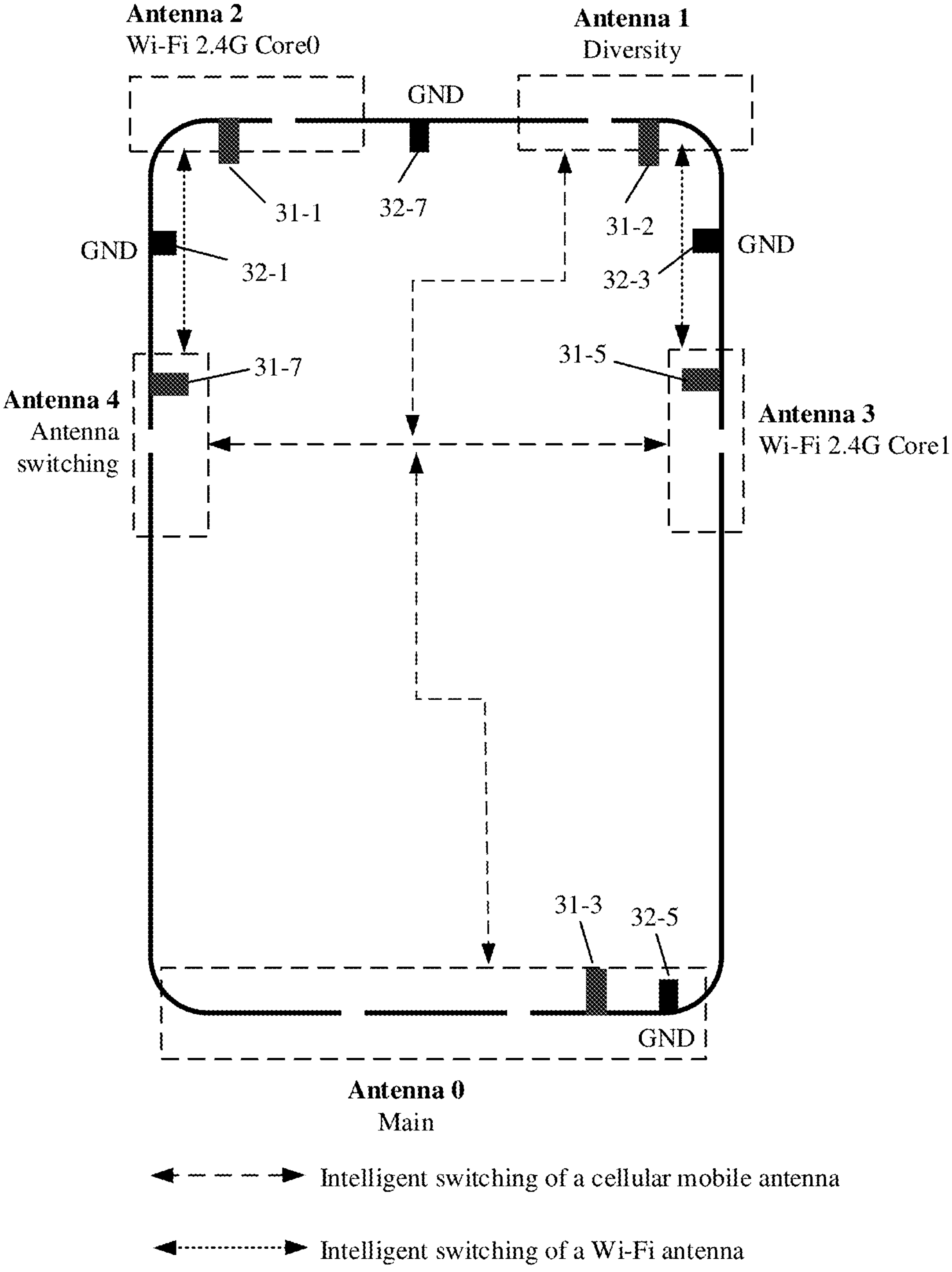
FIG. 7B is a schematic diagram of feeding and grounding of the multi-antenna system in FIG. 7A.

As shown in FIG. 7A and FIG. 7B, a multi-antenna system provided in Embodiment 1 may include an antenna 0, an antenna 1, an antenna 2, an antenna 3, and an antenna 4. The plurality of antennas may be formed by a peripheral conductive structure 11 (briefly referred to as the structure 11 below) having a plurality of gaps. An upper frame 11-5 of the structure 11 may have two top gaps 21-1 and 21-2. The top gaps 21-1 and 21-2 may be respectively disposed on left and right sides of a horizontal part of the upper frame 11-5. A lower frame 11-7 of the structure 11 may have two bottom gaps 23-1 and 23-2. The bottom gaps 23-1 and 23-2 may be respectively disposed on left and right sides of a horizontal part of the lower frame 11-7. A left side frame 11-3 and a right side frame 11-1 of the structure 11 may respectively have one side gap 27 and one side gap 25. The side gaps 27 and 25 may be respectively disposed on upper sides of the side frames 11-3 and 11-1. The plurality of gaps divide the structure 11 into a plurality of peripheral conductive segments.

The following describes the multi-antenna system in Embodiment 1 in terms of an antenna structure, antenna isolation, antenna tuning, and antenna switching.

1. Antenna Structure

The antenna 0 may include the lower frame 11-7 of the structure 11, the bottom gaps, and a bottom feed point 31-3. The feed point 31-3 may be disposed on the lower frame 11-7. The feed point 31-3 may be connected to feeding of the antenna 0 to excite the antenna 0 to generate radiation. Because the antenna 0 is disposed at the bottom of the structure 11, the antenna 0 may also be referred to as a bottom antenna and may radiate an electromagnetic wave by using the bottom gaps such as the gaps 23-1 and 23-2. As shown in FIG. 7B, the feed point 31-3 may be disposed on a right side of the bottom gap 23-2. This imposes no limitation. The feed point 31-3 may be disposed on a left side of the bottom gap 23-2 and a right side of the bottom gap 23-1, namely, between the two gaps. The feed point 31-3 may be disposed on a left side of the bottom gap 23-1.

The antenna 1 may include the upper frame 11-5, the top gap 21-2, and a top feed point 31-2. The feed point 31-2 may be disposed on the upper frame 11-5. The feed point 31-2 may be connected to feeding of the antenna 1 to excite the antenna 1 to generate radiation. Because the antenna 1 is disposed at the top of the structure 11, the antenna 1 may also be referred to as a top antenna and may radiate an electromagnetic wave by using the top gap 21-2. As shown in FIG. 7B, the feed point 31-2 may be disposed on a right side of the top gap 21-2. This imposes no limitation. The feed point 31-2 may be disposed on a peripheral conductive segment on a left side of the top gap 21-2. For example, the antenna 1 includes a left part of the upper frame 11-5. The left part may be referred to as a first part of the upper frame 11-5.

The antenna 2 may include the upper frame 11-5, the top gap 21-1, and a top feed point 31-1. The feed point 31-1 may be disposed on the upper frame 11-5. The feed point 31-1 may be connected to feeding of the antenna 2 to excite the antenna 2 to generate radiation. Because the antenna 2 is disposed at the top of the structure 11, the antenna 2 may also be referred to as a top antenna and may radiate an electromagnetic wave by using the top gap 21-1. As shown in FIG. 7B, the feed point 31-1 may be disposed on a left side of the top gap 21-1. This imposes no limitation. The feed point 31-1 may be disposed on a right side of the top gap 21-1. For example, the antenna 2 includes a right part of the upper frame 11-5. The right part may be referred to as a second part of the upper frame 11-5.

The antenna 3 may include the right side frame 11-1, the side gap 25, and a side feed point 31-5. The feed point 31-5 may be disposed on the side frame 11-1. The feed point 31-5 may be connected to feeding of the antenna 3 to excite the antenna 3 to generate radiation. Because the antenna 3 is disposed on two sides of the structure 11, and the two sides are located in the middle of the electronic device 10, the antenna 3 may also be referred to as a middle antenna and may radiate an electromagnetic wave by using the side gap 25. As shown in FIG. 7B, the feed point 31-5 may be disposed on an upper side of the gap 25. This imposes no limitation. The feed point 31-5 may be disposed on a lower side of the gap 25.

The antenna 4 may include the left side frame 11-3, the side gap 27, and a side feed point 31-7. The side gap 27 may be disposed on the upper side of the side frame 11-3. The feed point 31-7 may be disposed on the side frame 11-3. The feed point 31-7 may be connected to feeding of the antenna 4 to excite the antenna 4 to generate radiation. Because the antenna 4 is disposed on the two sides of the structure 11, and the two sides are located in the middle of the electronic device 10, the antenna 4 may also be referred to as a middle antenna and may radiate an electromagnetic wave by using the side gap 27. As shown in FIG. 7B, the feed point 31-7 may be disposed on an upper side of the gap 27. This imposes no limitation. The feed point 31-7 may be disposed on a lower side of the gap 27.

In the foregoing content, the left side and the right side are only used to describe a relative position relationship between elements such as a frame, a gap, and a feed point, and are not used to limit a position of each element in an actual entire device model. In the foregoing content, the upper side is a side closer to the top frame 11-5, and is relative to the lower side, and the lower side is a side closer to the bottom frame 11-7. In the foregoing content, the left side is a side closer to the left side frame 11-3, and is relative to the right side, and the right side is a side closer to the right side frame 11-1. The left side may be referred to as a first side, and the right side may be referred to as a second side.

The middle antenna such as the antenna 3 and the antenna 4 may be disposed at a middle or upper position on the side frame. The side gap is also correspondingly disposed at the middle or upper position on the side frame. This imposes no limitation. The middle antenna may be adjusted within a range of 20 millimeters upward or downward the middle of the side frame.

In Embodiment 1, the antenna 0 may be referred to as the bottom antenna, the antenna 2 and the antenna 1 may be respectively referred to as a first top antenna and a second top antenna, and the antenna 4 and the antenna 3 may be respectively referred to as a first side antenna and a second side antenna. The top feed point 31-1 and the top feed point 31-2 may be respectively referred to as a first top feed point and a second top feed point. The top gap 21-1 and the top gap 21-2 may be respectively referred to as a first top gap and a second top gap. The side frame 11-3 and the side frame 11-1 may be respectively referred to as a first side frame and a second side frame. The side feed point 31-7 and the side feed point 31-5 may be respectively referred to as a first side feed point and a second side feed point. The side gap 27 and the side gap 25 may be respectively referred to as a first side gap and a second side gap.

2. Antenna Isolation

To improve isolation between adjacent antennas, a ground point may be disposed between the adjacent antennas in the multi-antenna system. As shown in FIG. 7B, a ground point 32-5 may be disposed on the structure 11 between the feed point 31-3 of the antenna 0 and the feed point 31-5 of the antenna 3. A ground point 32-3 may be disposed on the structure 11 between the feed point 31-5 of the antenna 3 and the feed point 31-2 of the antenna 1. A ground point 32-7 may be disposed on the structure 11 between the feed point 31-2 of the antenna 1 and the feed point 31-1 of the antenna 2. A ground point 32-1 may be disposed on the structure 11 between the feed point 31-1 of the antenna 2 and the feed point 31-7 of the antenna 4.

These ground points may be grounded by connecting a conductor such as a metal spring to the ground, or by connecting a tuning switch to the ground through frequency selection. These ground points may also be used to ground the respective antennas.

3. Antenna Tuning

Figure 7C:
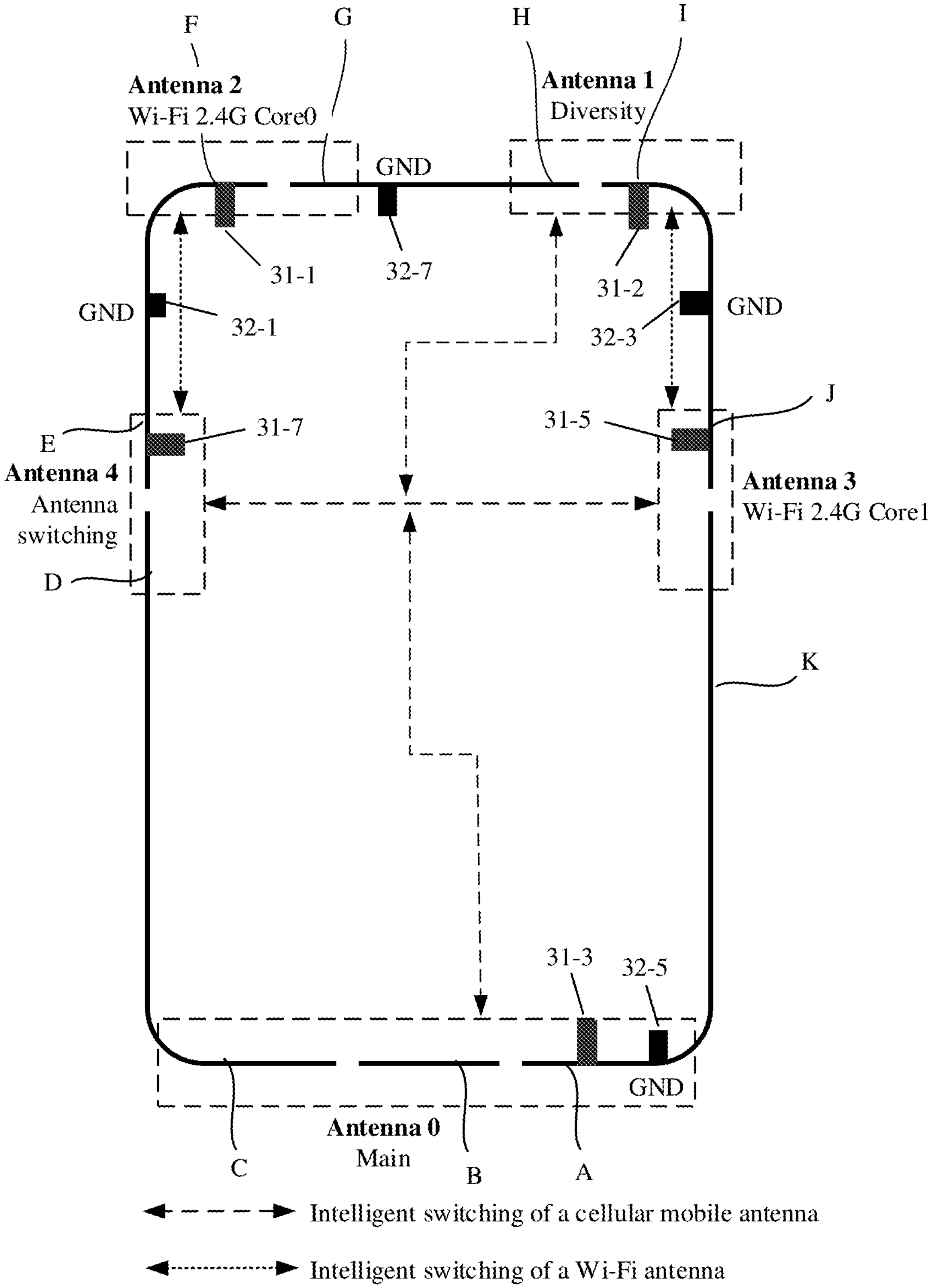
FIG. 7C is a schematic diagram of a position at which a tuning switch may be disposed in the multi-antenna system in FIG. 7A.

FIG. 7C shows an example of a position at which a tuning switch may be disposed in the multi-antenna system in Embodiment 1. As shown in FIG. 7C, the structure 11 may be connected to a tuning switch at one or more of positions A to K, namely, on one or two sides of a gap, to perform the following operations on peripheral conductive segments on the two sides of the gap:

(1) Tune a Frequency Band

For example, a tuning switch at the position A (namely, on the right side of the gap 23-2) may be configured to adjust an operating frequency band of a peripheral conductive segment between the bottom gap 23-2 and the ground point 32-5. For another example, a tuning switch at the position B (namely, on the left side of the gap 23-2 or the right side of the gap 23-1) may be configured to adjust an operating frequency band of a peripheral conductive segment between the bottom gap 23-2 and the bottom gap 23-1. For another example, a tuning switch at the position K (namely, on the lower side of the gap 25) may be configured to adjust an operating frequency band of a peripheral conductive segment between the side gap 25 and the ground point 32-5.

(2) Improve Antenna Performance by Using a Combined State of Switches

For example, in a scenario in which the bottom of the electronic device 10 is held by the user, tuning switches at the positions K and D may be set to a close state, for example, switched to a 0-ohm ground state, and tuning switches at the positions E and J may be set to an open state. In this way, radiation of peripheral conductive segments on the upper sides of the side gaps 27 and 25 may be enhanced, and radiation of peripheral conductive segments on the lower sides of the side gaps 27 and 25 may be attenuated, so that antenna performance of the antenna 3 and the antenna 4 is improved, and impact caused by hold of the electronic device by the user can be avoided.

For example, in a scenario in which the top of the electronic device 10 is held by the user, tuning switches at the positions E and J may be set to a close state, for example, switched to a 0-ohm ground state, and tuning switches at the positions K and D may be set to an open state. In this way, radiation of peripheral conductive segments on the lower sides of the side gaps 27 and 25 may be enhanced, and radiation of peripheral conductive segments on the upper sides of the side gaps 27 and 25 may be attenuated, so that antenna performance of the antenna 3 and the antenna 4 is improved, and impact caused by hold of the electronic device by the user can be avoided.

4. Switching Between Entity Antennas

In a free-space scenario, the antenna 0 and the antenna 1 may be respectively used as a main antenna and a diversity antenna for cellular mobile communication.

The main antenna is generally responsible for sending and receiving radio frequency signals. The diversity antenna for cellular mobile communication generally receives only a radio frequency signal but sends no radio frequency signal. When a signal from a base station is transmitted to an antenna of the electronic device through downlink, the electronic device selects a channel of signal with better signal quality in signals received through ports of the two antennas and performs demodulation.

The antenna 0, the antenna 1, the antenna 3, and the antenna 4 all may be connected to an antenna switching switch (not shown). The antenna switching switch may be referred to as a first antenna switching switch. The first antenna switching switch may be configured to select an antenna with optimal signal quality from the antenna 0, the antenna 1, the antenna 3, and the antenna 4. The selected antenna with optimal signal quality may be used as the main antenna. The antenna switching switch may be further configured to select an antenna with suboptimal signal quality from the antenna 0, the antenna 1, the antenna 3, and the antenna 4 as the diversity antenna. In other words, the main antenna and the diversity antenna for cellular mobile communication may be switched among the top antenna, the middle antenna, and the bottom antenna, to adapt to various scenarios and ensure antenna performance during cellular mobile communication.

For example, in a scenario in which the bottom of the electronic device is held by the user, for example, in the scenarios shown in FIG. 5(A) and FIG. 6(A), signal quality of the bottom antenna is deteriorated due to the hold of the user, but signal quality of the top antenna and the middle antenna is good. In this case, the main antenna may be switched to the top antenna or the middle antenna, and the diversity antenna may also be switched to the top antenna or the middle antenna. This can ensure antenna performance of both the main antenna and the diversity antenna and avoids the following problem: Performance of the diversity antenna is deteriorated because the main antenna is switched upward and the diversity antenna is switched downward in the conventional "top-bottom antenna layout".

For example, in a scenario in which the top of the electronic device is held by the user, for example, in the scenarios shown in FIG. 5(C) and FIG. 6(B), signal quality of the top antenna is deteriorated due to the hold of the user, but signal quality of the bottom antenna and the middle antenna is good. In this case, the bottom antenna may be used as the main antenna, to achieve good antenna performance; and the diversity antenna may be switched to the middle antenna, to ensure antenna performance of the diversity antenna.

For example, in a scenario in which both the top and the bottom of the electronic device are held by the user, for example, in the scenario shown in FIG. 6(C), signal quality of both the top antenna and the bottom antenna is deteriorated due to the hold of the user, but signal quality of the middle antenna is good. In this case, both the main antenna and the diversity antenna may be switched to the middle antenna, so that both the main antenna and the diversity antenna have good antenna performance.

For example, in a scenario in which the middle of the electronic device is held by the user, for example, in the scenarios shown in FIG. 5(D) and FIG. 6(D), signal quality of the middle antenna is deteriorated due to the hold of the user, but signal quality of the top antenna and the bottom antenna is good. In this case, the bottom antenna may be used as the main antenna, and the top antenna may be used as the diversity antenna.

The foregoing several examples impose no limitation. The multi-antenna system provided in Embodiment 1 is applicable to another holding scenario, to achieve good antenna performance and improve cellular mobile communication quality.

5. Antenna Multiplexing

A Wi-Fi antenna of the electronic device 10 may be implemented by using the top antenna by default. For example, the antenna 2 may be used as a Wi-Fi 2.4G Core0 antenna, and the antenna 1 may be used as a Wi-Fi 2.4G Core1 antenna. The Core0 antenna and the Core1 antenna form Wi-Fi dual antennas, and the dual antennas may be used to receive and send signals.

In a Wi-Fi scenario, when signal quality of the top antenna is poor, the Wi-Fi antenna may be further switched from the top antenna to the middle antenna. In other words, the Wi-Fi antenna may be switched between the top antenna and the middle antenna, to improve antenna performance like cellular mobile communication. A specific implementation of such antenna switching may be as follows:

The antenna 1 and the antenna 3 may be connected to a second antenna switching switch (not shown). The second antenna switching switch may be configured to select an antenna with better signal quality from the antenna 1 and the antenna 3 as the Wi-Fi antenna. The antenna 2 and the antenna 4 may be connected to a third antenna switching switch. The third antenna switching switch may be configured to select an antenna with better signal quality from the antenna 2 and the antenna 4 as the Wi-Fi antenna.

When the Wi-Fi antenna and the cellular mobile antenna are switched to a same antenna, for example, when both the Wi-Fi 2.4G Core0 antenna and the cellular mobile antenna (such as the main antenna and the diversity antenna) are switched to the antenna 4, multiplexing may be implemented by using a frequency divider (a combiner) or in a time division multiplexing manner.

The Wi-Fi scenario is a scenario in which the electronic device enables Wi-Fi to perform communication (such as make a video call or browse a web page) by using Wi-Fi. The electronic device may determine whether Wi-Fi is enabled or whether an application or function (such as a video call or video playing) is enabled, to determine whether the electronic device is in the Wi-Fi scenario.

6. 4×4 MIMO Cellular Mobile Antenna

The multi-antenna system in Embodiment 1 may include a 4×4 MIMO cellular mobile antenna. FIG. 8A to FIG. 8D show several implementations of the 4×4 MIMO cellular mobile antenna. MIMO means multiple-input multiple-output.

Figure 8A:
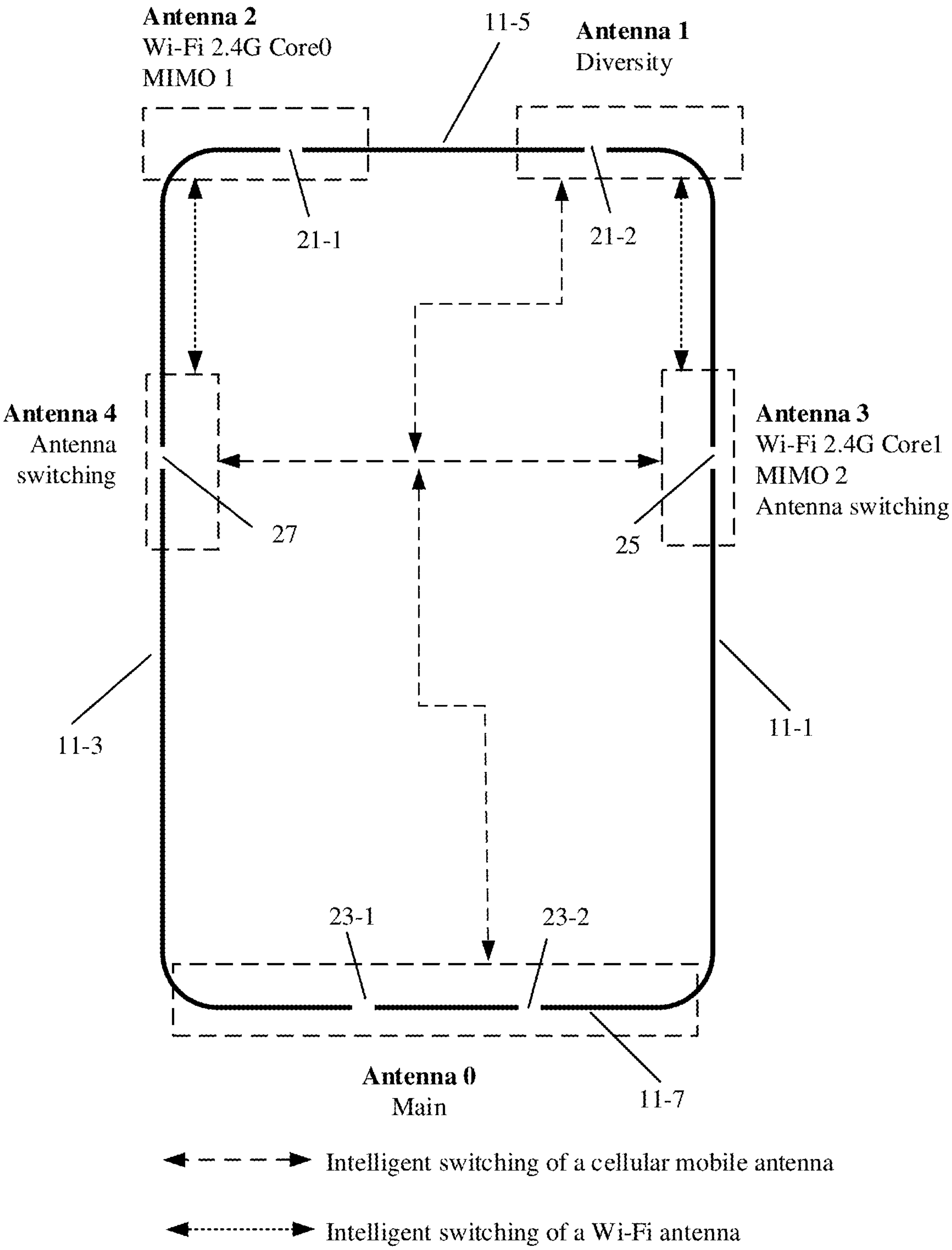
FIG. 8A to FIG. 8D are schematic diagrams of several implementations of a 4×4 MIMO cellular mobile antenna.

As shown in FIG. 8A, the antenna 0 may be used as the main antenna, and the antenna 1 may be used as the diversity antenna. The antenna 2 and the antenna 3 may be used as the Wi-Fi antenna. The main antenna and the diversity antenna for cellular mobile communication may be switched among the antenna 0, the antenna 1, the antenna 3, and the antenna 4. The Wi-Fi 2.4G Core0 antenna may be switched between the antenna 2 and the antenna 4. The Wi-Fi 2.4G Core1 antenna may be switched between the antenna 3 and the antenna 1. In addition to the antenna 0 used as the main antenna and the antenna 1 used as the diversity antenna, the antenna 2 and the antenna 3 may be further used for cellular mobile communication, to form four receive antennas and support a 4×4 MIMO architecture.

Figure 8B:
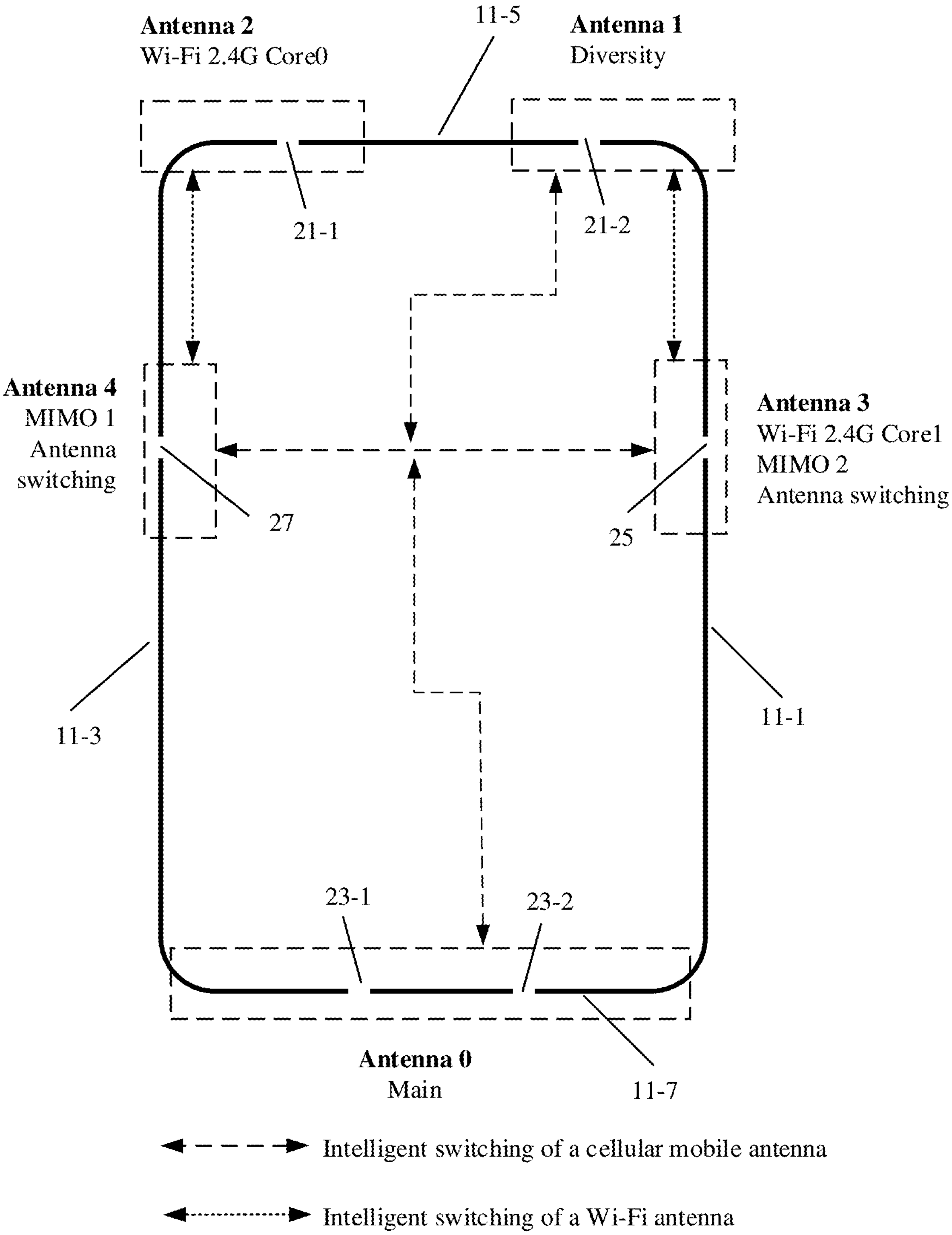

As shown in FIG. 8B, the antenna 0 may be used as the main antenna, and the antenna 1 may be used as the diversity antenna. The antenna 2 and the antenna 3 may be used as the Wi-Fi antenna. The main antenna and the diversity antenna for cellular mobile communication may be switched among the antenna 0, the antenna 1, the antenna 3, and the antenna 4. The Wi-Fi 2.4G Core0 antenna may be switched between the antenna 2 and the antenna 4. The Wi-Fi 2.4G Core1 antenna may be switched between the antenna 3 and the antenna 1. In addition to the antenna 0 used as the main antenna and the antenna 1 used as the diversity antenna, the antenna 3 and the antenna 4 may be further used for cellular mobile communication, to form four receive antennas and support a 4×4 MIMO architecture.

Figure 8C:
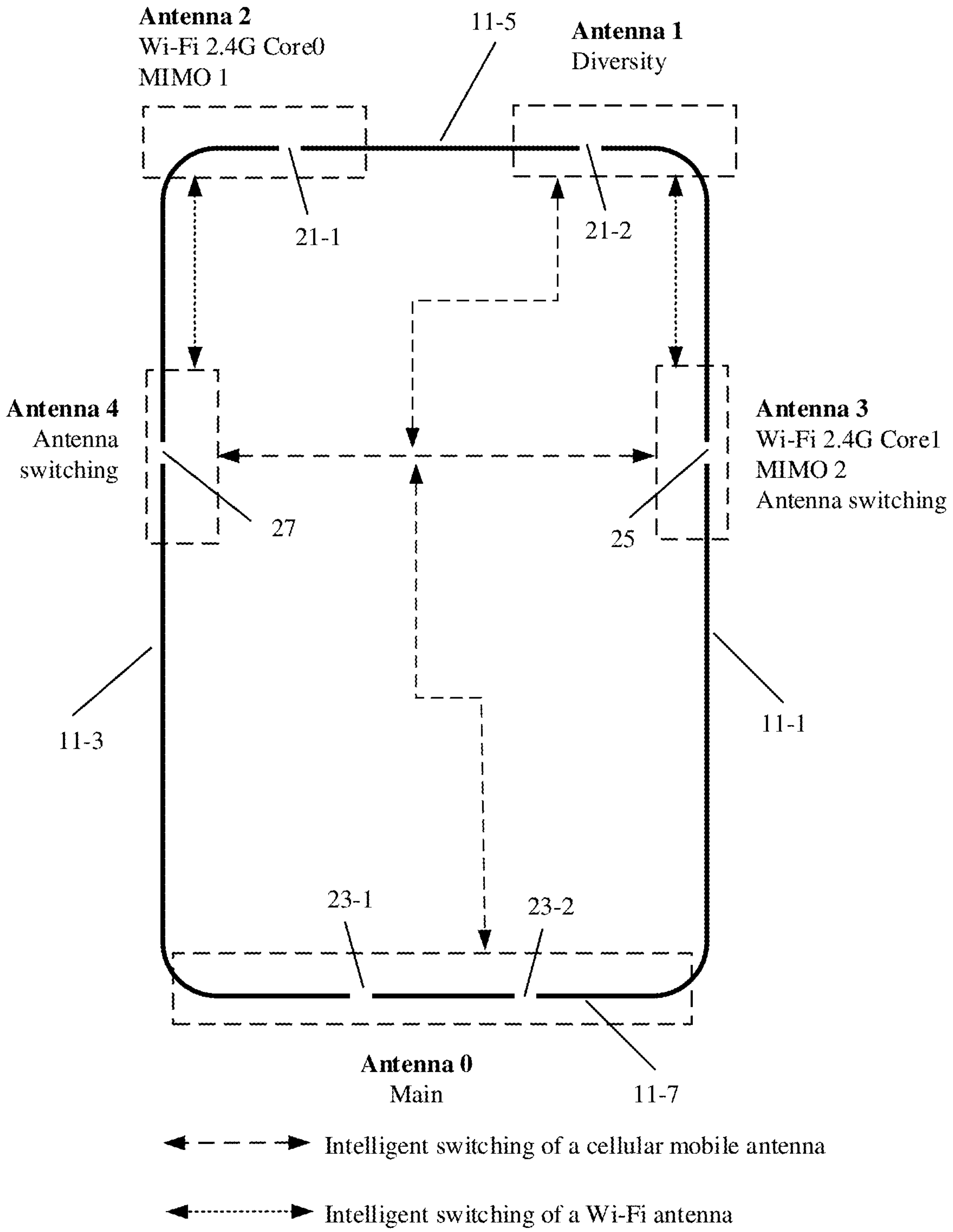

As shown in FIG. 8C, the antenna 0 may be used as the main antenna, and the antenna 1 may be used as the diversity antenna. The antenna 2 and the antenna 3 may be used as the Wi-Fi antenna. The main antenna and the diversity antenna for cellular mobile communication may be switched among the antenna 0, the antenna 1, the antenna 3, and the antenna 4. The Wi-Fi 2.4G Core0 antenna may be switched between the antenna 2 and the antenna 4. The Wi-Fi 2.4G Core1 antenna may be switched between the antenna 3 and the antenna 1. In addition to the antenna 0 used as the main antenna and the antenna 1 used as the diversity antenna, the antenna 2 and the antenna 3 may be further used for cellular mobile communication, to form four receive antennas and support a 4×4 MIMO architecture.

Figure 8D:
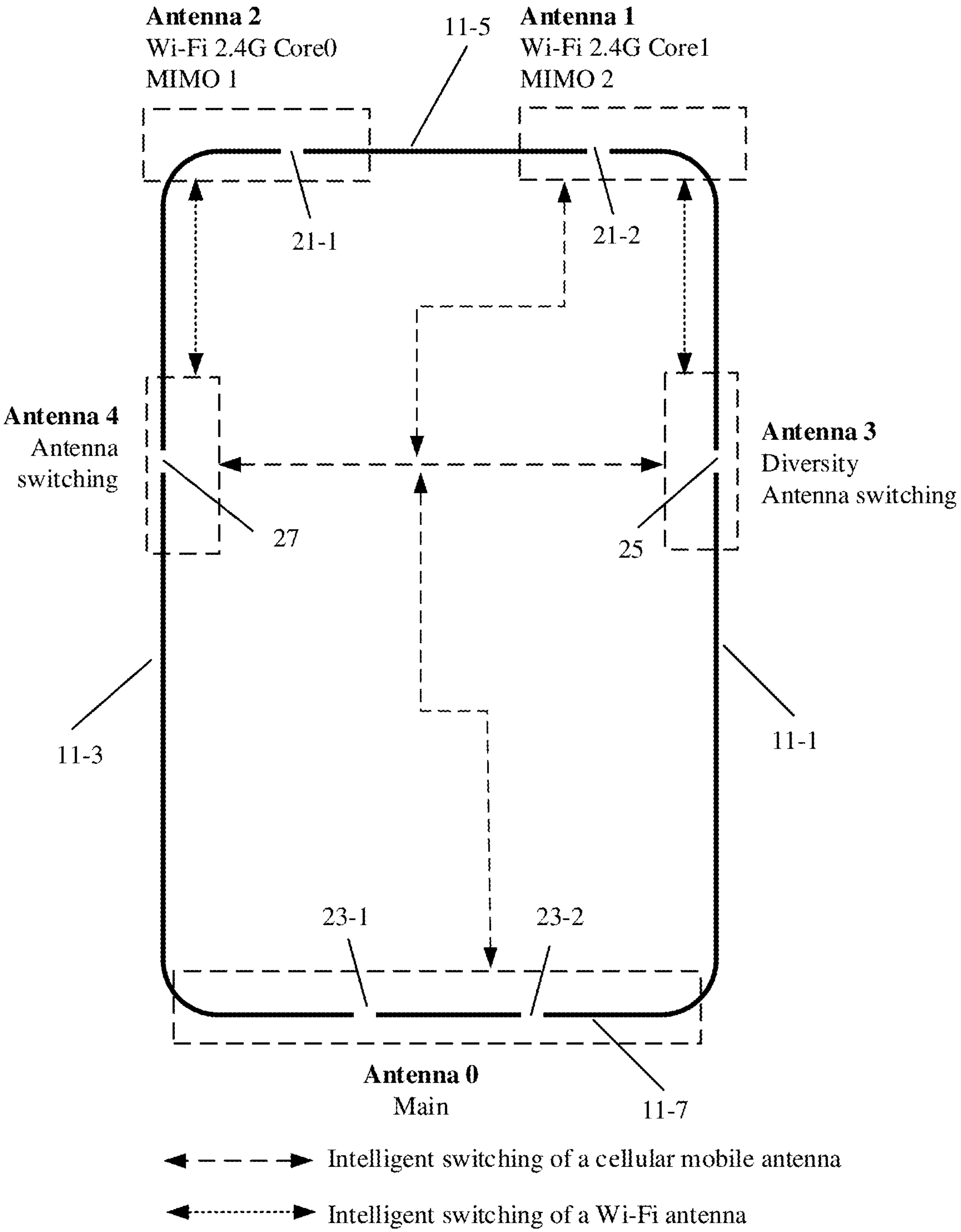

As shown in FIG. 8D, the antenna 0 may be used as the main antenna, and the antenna 3 may be used as the diversity antenna. The antenna 2 and the antenna 1 may be used as the Wi-Fi antenna. The main antenna and the diversity antenna for cellular mobile communication may be switched among the antenna 0, the antenna 1, the antenna 3, and the antenna 4. The Wi-Fi 2.4G Core0 antenna may be switched between the antenna 2 and the antenna 4. The Wi-Fi 2.4G Core1 antenna may be switched between the antenna 3 and the antenna 1. In addition to the antenna 0 used as the main antenna and the antenna 3 used as the diversity antenna, the antenna 1 and the antenna 2 may be further used for cellular mobile communication, to form four receive antennas and support a 4×4 MIMO architecture.

It may be learned from FIG. 8A to FIG. 8D that the four receive antennas used to receive a signal are distributed at three positions including the top, the middle, and the bottom of the electronic device. This can adapt to various scenarios in which the user holds the electronic device and ensure signal receiving performance of the electronic device. For example, when the user holds the bottom of the electronic device by using one hand in the portrait mode, performance of a bottom receive antenna is significantly deteriorated. However, performance of a top receive antenna and a middle receive antenna is good, and a signal may be normally received. For another example, when the user holds the top of the electronic device by using one hand in the portrait mode, performance of a top receive antenna is significantly deteriorated. However, performance of a bottom receive antenna and a middle receive antenna is good, and a signal may be normally received. For another example, when the user holds the top and the bottom of the electronic device by using two hands in the landscape mode, performance of a top receive antenna and a bottom receive antenna is significantly deteriorated. However, performance of a middle receive antenna is good, and a signal may be normally received.

The multi-antenna system provided in Embodiment 1 may operate on an intermediate/high-frequency band (1670 MHz to 2.5 GHz), and the multi-antenna system can present good radiation efficiency in a plurality of scenarios such as a free-space scenario, a portrait-mode holding scenario, and a landscape-mode holding scenario.

The multi-antenna system provided in Embodiment 1 may further support a 5G sub6G/5G sub3G frequency band, that is, a 5G sub6G/5G sub3G antenna and an intermediate/high-frequency antenna of the electronic device 10 may share a radiator. This may be implemented by changing a feed position, designing feed impedance matching, or disposing a tuning switch on two sides of a gap.

Embodiment 2

Figure 9A:
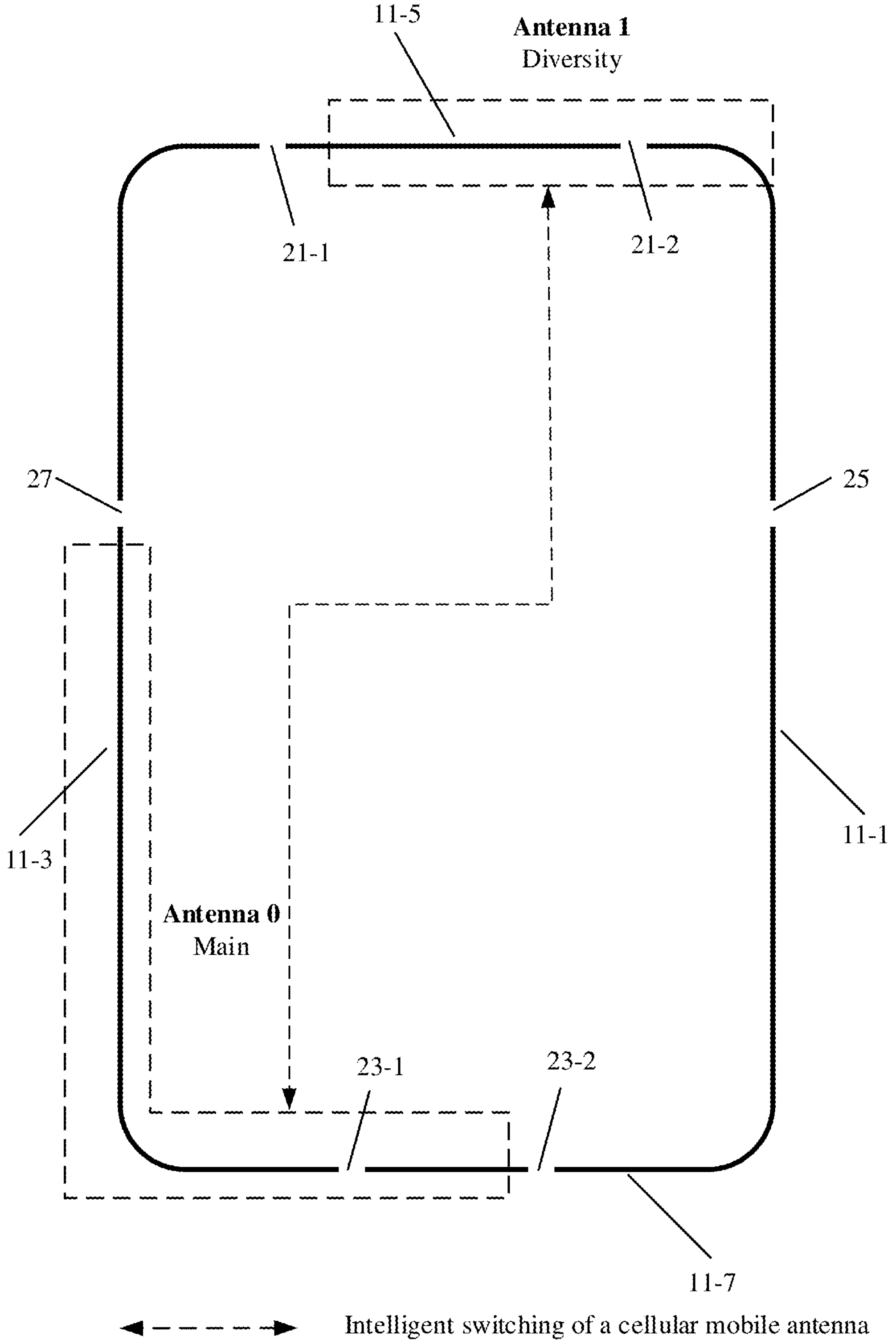
FIG. 9A is a schematic diagram of a structure of a low-frequency multi-antenna system.
Figure 9B:
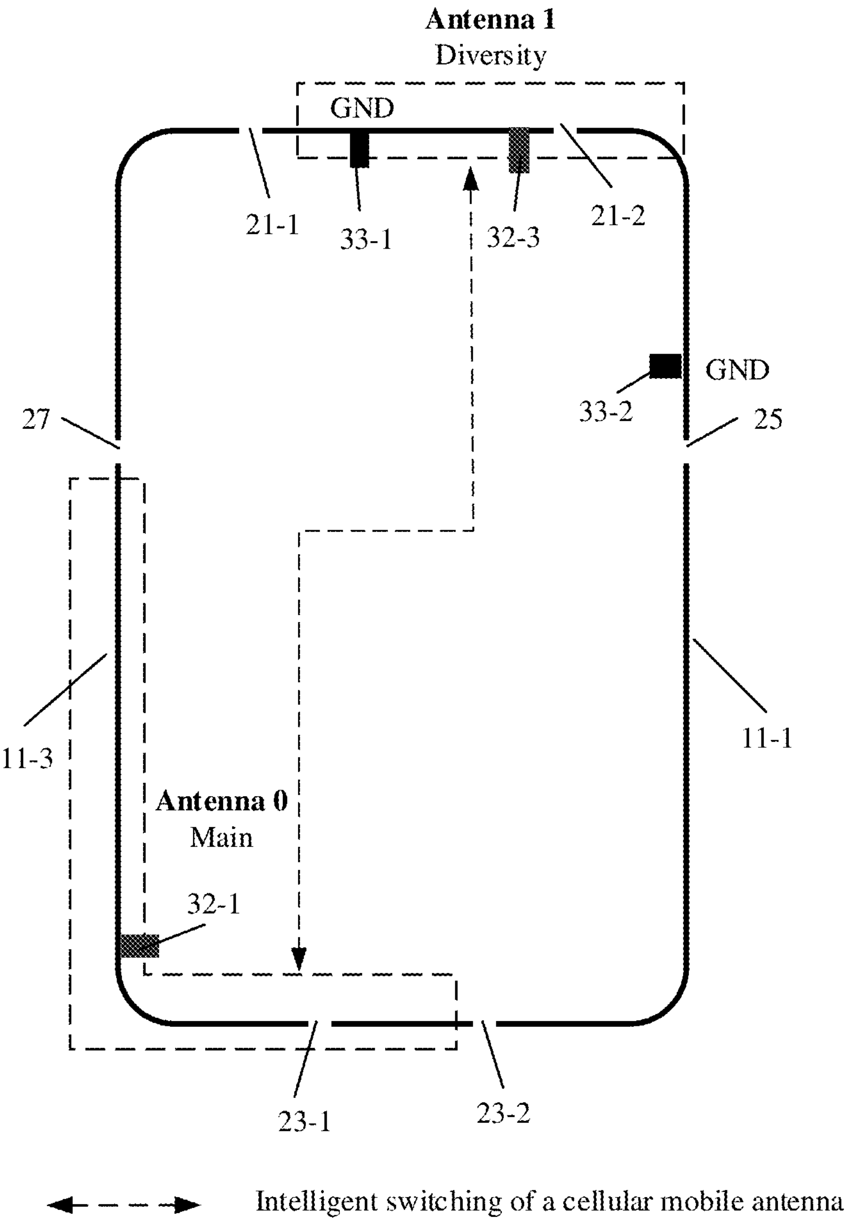
FIG. 9B is a schematic diagram of feeding and grounding of the multi-antenna system in FIG. 9A.

As shown in FIG. 9A and FIG. 9B, a multi-antenna system provided in Embodiment 2 may include an antenna 0 and an antenna 1. The two antennas may be formed by a peripheral conductive structure 11 (briefly referred to as the structure 11 below) having a plurality of gaps. An upper frame 11-5 of the structure 11 may have two top gaps 21-1 and 21-2. The top gaps 21-1 and 21-2 may be respectively disposed on left and right sides of the upper frame 11-5. A lower frame 11-7 of the structure 11 may have two bottom gaps 23-1 and 23-2. The bottom gaps 23-1 and 23-2 may be respectively disposed on left and right sides of the lower frame 11-7. A left side frame 11-3 and a right side frame 11-1 of the structure 11 may respectively have one side gap 27 and one side gap 25. The side gaps 27 and 25 may be respectively disposed on upper sides of the side frames 11-3 and 11-1. The plurality of gaps divide the structure 11 into a plurality of peripheral conductive segments.

The following describes the multi-antenna system in Embodiment 2 in terms of an antenna structure, antenna isolation, antenna tuning, and antenna switching.

1. Antenna Structure

The antenna 0 may include the lower frame 11-7 of the structure 11, the bottom gaps 23-1 and 23-2, a feed point 32-1, the left side frame 11-3 of the structure 11, and the side gap 27. The feed point 32-1 may be disposed on a peripheral conductive segment between the bottom gap 23-1 and the side gap 27. The feed point 32-1 may be connected to feeding of the antenna 0 to excite the antenna 0 to generate radiation. Different from the antenna 0 in Embodiment 1, the antenna 0 in Embodiment 2 extends from the lower frame 11-7 at the bottom to the side frame 11-3 and may radiate an electromagnetic wave by using the bottom gap 23-1 and the side gap 27.

The antenna 1 may include the upper frame 11-5, the top gap 21-2, and a top feed point 32-3. The feed point 32-3 may be disposed on the upper frame 11-5. The feed point 32-3 may be connected to feeding of the antenna 1 to excite the antenna 1 to generate radiation. Because the antenna 1 is disposed at the top of the structure 11, the antenna 1 may also be referred to as a top antenna and may radiate an electromagnetic wave by using the top gap 21-2. As shown in FIG. 9B, the feed point 32-3 may be disposed on a right side of the top gap 21-2. This imposes no limitation. The feed point 32-3 may be disposed on a peripheral conductive segment on a left side of the top gap 21-2.

2. Antenna Isolation

To improve isolation between adjacent antennas such as the antenna 0 and the antenna 1, a ground point may be disposed between the adjacent antennas in the multi-antenna system. As shown in FIG. 9B, ground points 33-1 and 33-2 may be disposed on a structure 11 between the feed point 32-1 of the antenna 0 and the feed point 32-3 of the antenna 1. Grounding of these ground points may be implemented by connecting a conductor such as a metal spring to the ground, or by connecting a component to the ground through frequency selection. These ground points may also be used to ground the antennas.

3. Antenna Tuning Switch

Figure 9C:
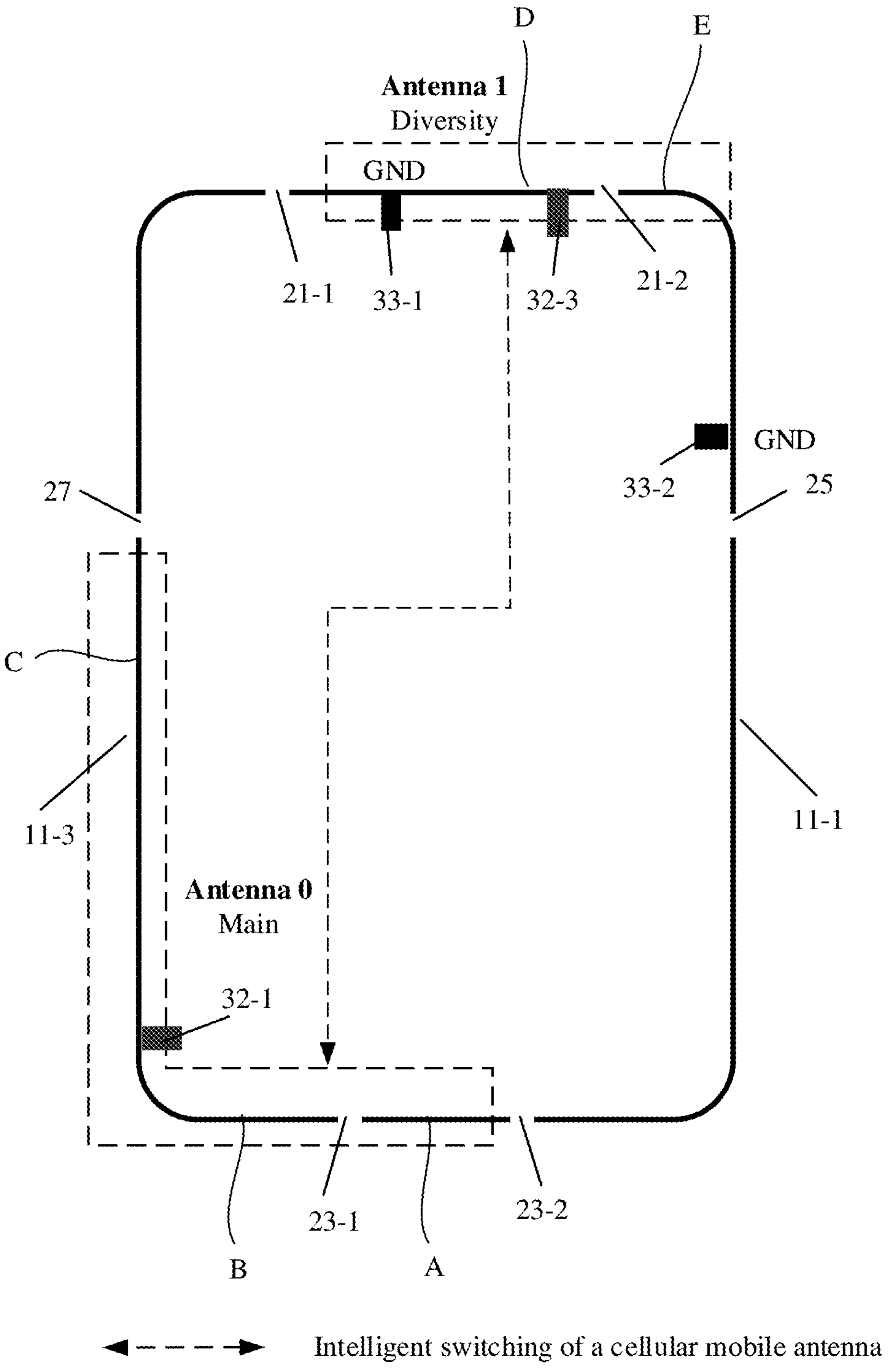
FIG. 9C is a schematic diagram of a position at which a tuning switch may be disposed in the multi-antenna system in FIG. 9A.

FIG. 9C shows an example of a position at which a tuning switch may be disposed in the multi-antenna system in Embodiment 2. As shown in FIG. 9C, at one or more positions in positions A to E, namely, on one or two sides of a gap, the structure 11 may be connected to a tuning switch to perform the following operations on peripheral conductive segments on the two sides of the gap:

(1) Tune a Frequency Band

For example, a tuning switch at the position D (namely, on the left side of the gap 21-2) may be configured to adjust an operating frequency band of a peripheral conductive segment on the left side of the gap 21-2. For another example, a tuning switch at the position E (namely, on the right side of the gap 21-2) may be configured to adjust an operating frequency band of a peripheral conductive segment on the right side of the gap 21-2. For another example, a tuning switch at the position B (namely, on a left side of the gap 23-1) may be configured to adjust an operating frequency band of a peripheral conductive segment on the left side of the gap 23-1.

(2) Implement Virtual Antenna Switching by Using a Combined State of Tuning Switches Virtual antenna switching is described in detail in subsequent content, and details are not described herein.

4. Antenna Switching (1) Entity Antenna Switching

In a free-space scenario, the antenna 0 and the antenna 1 may be respectively used as a main antenna and a diversity antenna for cellular mobile communication.

Both the antenna 0 and the antenna 1 may be connected to an antenna switching switch (not shown). In Embodiment 2, the antenna switching switch may be referred to as a first antenna switching switch. The first antenna switching switch may be configured to select an antenna with optimal signal quality from the antenna 0 and the antenna 1. The selected antenna with optimal signal quality may be used as the main antenna.

(2) Virtual Antenna Switching

Different from the antenna 0 in Embodiment 1, the antenna 0 in Embodiment 2 extends from the lower frame 11-7 at the bottom to the side frame 11-3, may radiate an electromagnetic wave by using the bottom gap 23-1 and the side gap 27, and may form two radiation modes at the bottom and on the side: a horizontal mode and a vertical mode. Herein, the horizontal mode may be a radiation mode in which the horizontal lower frame 11-7 is used as a primary radiator to generate radiation. Herein, the vertical mode may be a radiation mode in which the vertical side frame 11-3 is used as a primary radiator to generate radiation. When the radiation mode of the antenna 0 is the horizontal mode, the antenna 0 may be used as a bottom antenna and may be similar to the antenna 0 in Embodiment 1. When the radiation mode of the antenna 0 is the vertical mode, the antenna 0 may be used as a middle antenna and may be similar to the antenna 3 or the antenna 4 in Embodiment 1.

In Embodiment 2, whether the radiation mode of the antenna 0 is the horizontal mode or the vertical mode may be adjusted by changing states (for example, an open state or a close state) of tuning switches connected to the lower frame 11-7 and the side frame 11-3.

The tuning switch connected to the lower frame 11-7 may be referred to as a first tuning switch. The first tuning switch may be connected to the lower frame 11-7 on one side or two sides of the bottom gap 23-1, for example, at the position B shown in FIG. 9C. The first tuning switch may be disposed on the left side of the bottom gap 23-1. The tuning switch connected to the side frame 11-3 may be referred to as a second tuning switch. The second tuning switch may be connected to the side frame 11-3 on one side or two sides of the side gap 27, for example, at the position C shown in FIG. 9C. The second tuning switch may be disposed on a lower side of the side gap 27.

When the first tuning switch is in an open state and the second tuning switch is in a close state, the lower frame 11-7 is fully excited, and may be used as a radiator to generate radiation. In this case, the radiation mode of the antenna 0 is the horizontal mode, the antenna 0 would not be affected by hold of the side gap 27, and holding radiation efficiency is good. The first tuning switch may be further configured to switch a radiation frequency band of the lower frame 11-7 in the horizontal mode, for example, perform switching between low-frequency bands such as LTE B5, LTE B8, and LTE B28.

When the second tuning switch is in an open state and the first tuning switch is in a close state, the side frame 11-3 is fully excited, and may be used as a radiator to generate radiation. In this case, the radiation mode of the antenna 0 is the vertical mode, and free-space radiation efficiency is good. The second tuning switch may be further configured to switch a radiation frequency band of the side frame 11-3 in the vertical mode, for example, perform switching between low-frequency bands such as LTE B5, LTE B8, and LTE B28.

It may be learned that the radiation mode of the antenna 0 may be switched and adjusted by adjusting a combined state of the first tuning switch and the second tuning switch, so that antenna performance is improved by using the combined state of the switches, and a frequency band can be further tuned.

(3) Antenna Switching Supports all Scenarios

Based on entity antenna switching in the foregoing aspect (1) and virtual antenna switching in the foregoing aspect (2), the main antenna and the diversity antenna for cellular mobile communication can be switched among the top, the middle, and the bottom of the electronic device, to adapt to various scenarios and ensure good antenna performance during cellular mobile communication.

For example, in the scenarios shown in FIG. 5(A) and FIG. 6(A), the bottom of the electronic device may be held by the user. In the scenario, horizontal-mode performance of the antenna 0 is poor, but performance of the antenna 1 at the top is good, and vertical-mode performance of the antenna 0 is good. The main antenna may be switched to the antenna 1 at the top, and the diversity antenna may be switched to the vertical mode of the antenna 0. In this way, antenna performance of the main antenna and the diversity antenna can be ensured, and the following problem can also be avoided: Performance of the diversity antenna is deteriorated because the main antenna is switched upward and the diversity antenna is switched downward in the conventional "top-bottom antenna layout".

For example, in a scenario in which the top of the electronic device is held by the user, for example, in the scenarios shown in FIG. 5(C) and FIG. 6(B), performance of the antenna 1 is deteriorated, but performance of the antenna 0 is good, especially horizontal-mode performance of the antenna 0 is good. The main antenna may be switched to the horizontal mode of the antenna 0. This can ensure good antenna performance of the main antenna.

For example, in a scenario in which both the top and the bottom of the electronic device are held by the user, for example, in the scenario shown in FIG. 6(C), performance of the antenna 1 is deteriorated, and horizontal-mode performance of the antenna 0 is poor, but vertical-mode performance of the antenna 0 is good. The main antenna may be switched to the vertical mode of the antenna 0. This can ensure good antenna performance of the main antenna.

For example, in a scenario in which the middle of the electronic device is held by the user, for example, in the scenarios shown in FIG. 5(D) and FIG. 6(D), vertical-mode performance of the antenna 0 is poor, but horizontal-mode performance of the antenna 1 and the antenna 0 is good. The main antenna may be switched to the horizontal mode of the antenna 0, and the antenna 1 may be used as the diversity antenna. In this way, good antenna performance of the main antenna and the diversity antenna can be ensured.

The foregoing several examples impose no limitation. The multi-antenna system provided in Embodiment 2 is applicable to another holding scenario, to present good antenna performance and improve cellular mobile communication quality.

The multi-antenna system provided in Embodiment 2 may operate on a low-frequency band (960 MHz), and the multi-antenna system can present good radiation efficiency in a plurality of scenarios such as a free-space scenario, a portrait-mode holding scenario, and a landscape-mode holding scenario.

The multi-antenna system provided in Embodiment 2 and the multi-antenna system provided in Embodiment 1 may be implemented in combination, to adapt to a plurality of scenarios on both the low-frequency band and the intermediate/high-frequency band, and present good radiation efficiency.

Extension of Embodiment 2

Extension 1

(1) The antenna 1 at the top of the electronic device may also have an antenna design similar to the antenna 0, that is, the antenna 1 may extend from the upper frame 11-5 at the top to the side frame 11-1 and may radiate an electromagnetic wave by using the top gap 21-2 and the side gap 25, so that more landscape-mode and portrait-mode holding scenarios can be supported.

Figure 10A:
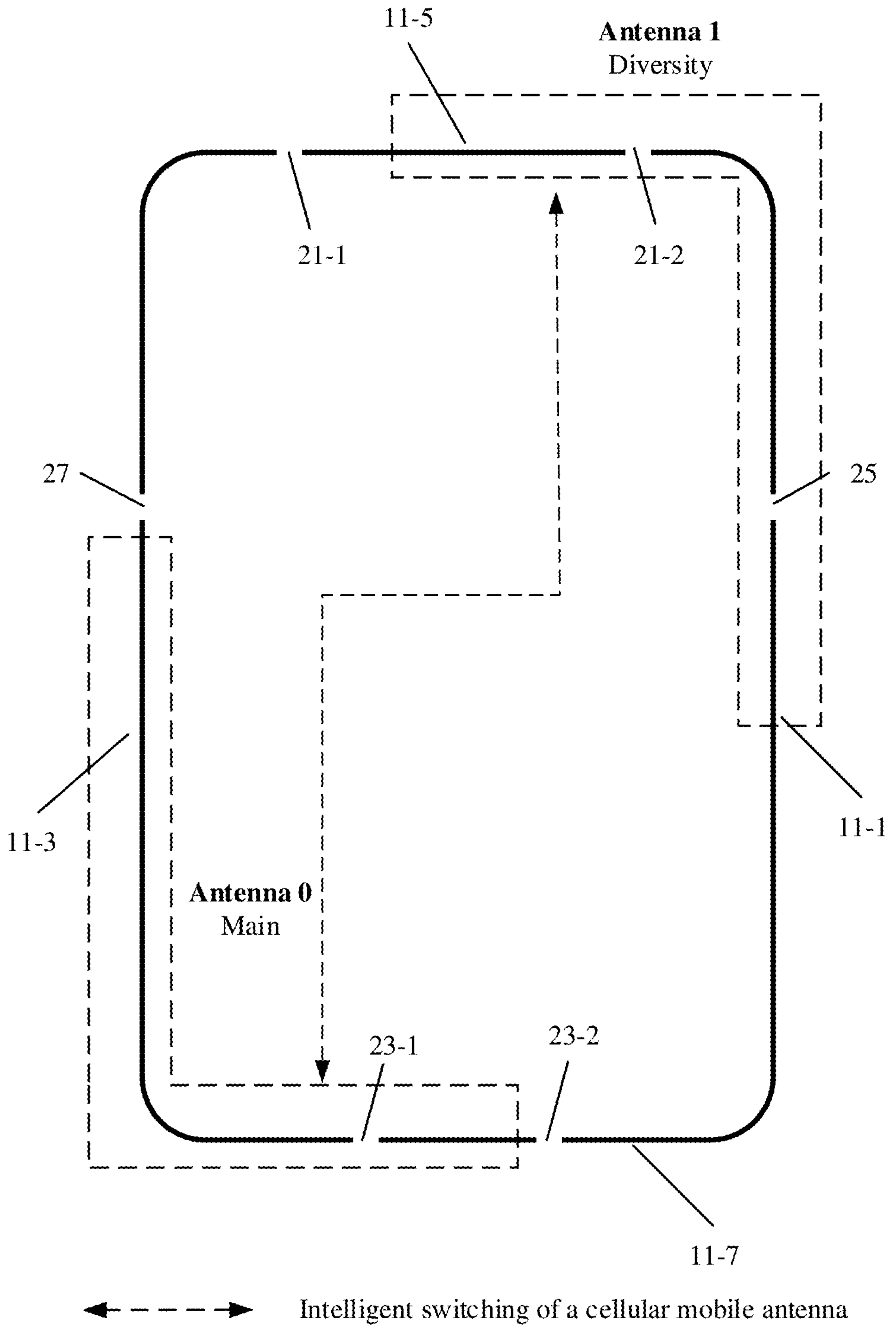
FIG. 10A is a schematic diagram of a structure of another low-frequency multi-antenna system.
Figure 10B:
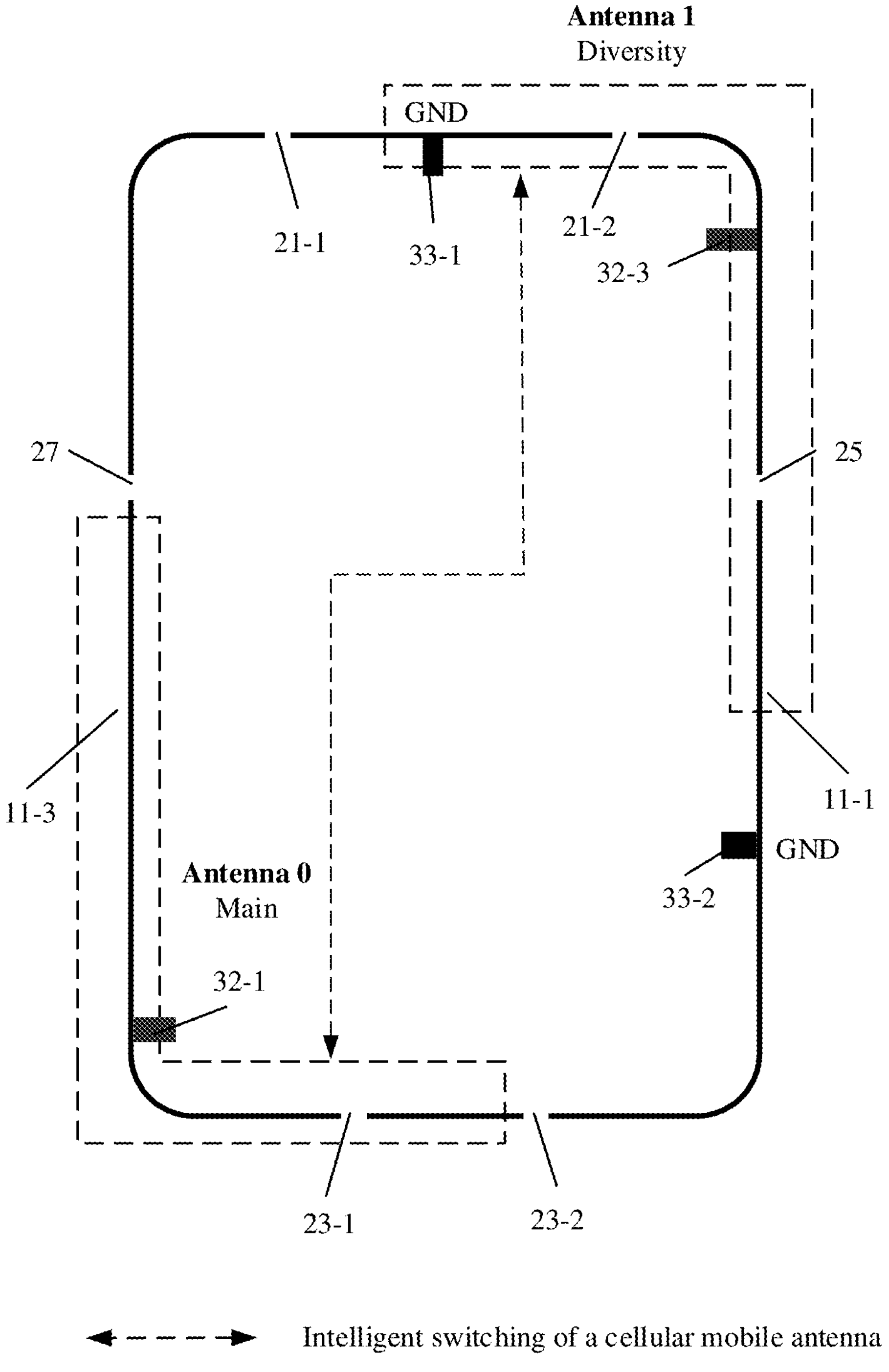
FIG. 10B is a schematic diagram of feeding and grounding of the multi-antenna system in FIG. 10A.
Figure 10C:
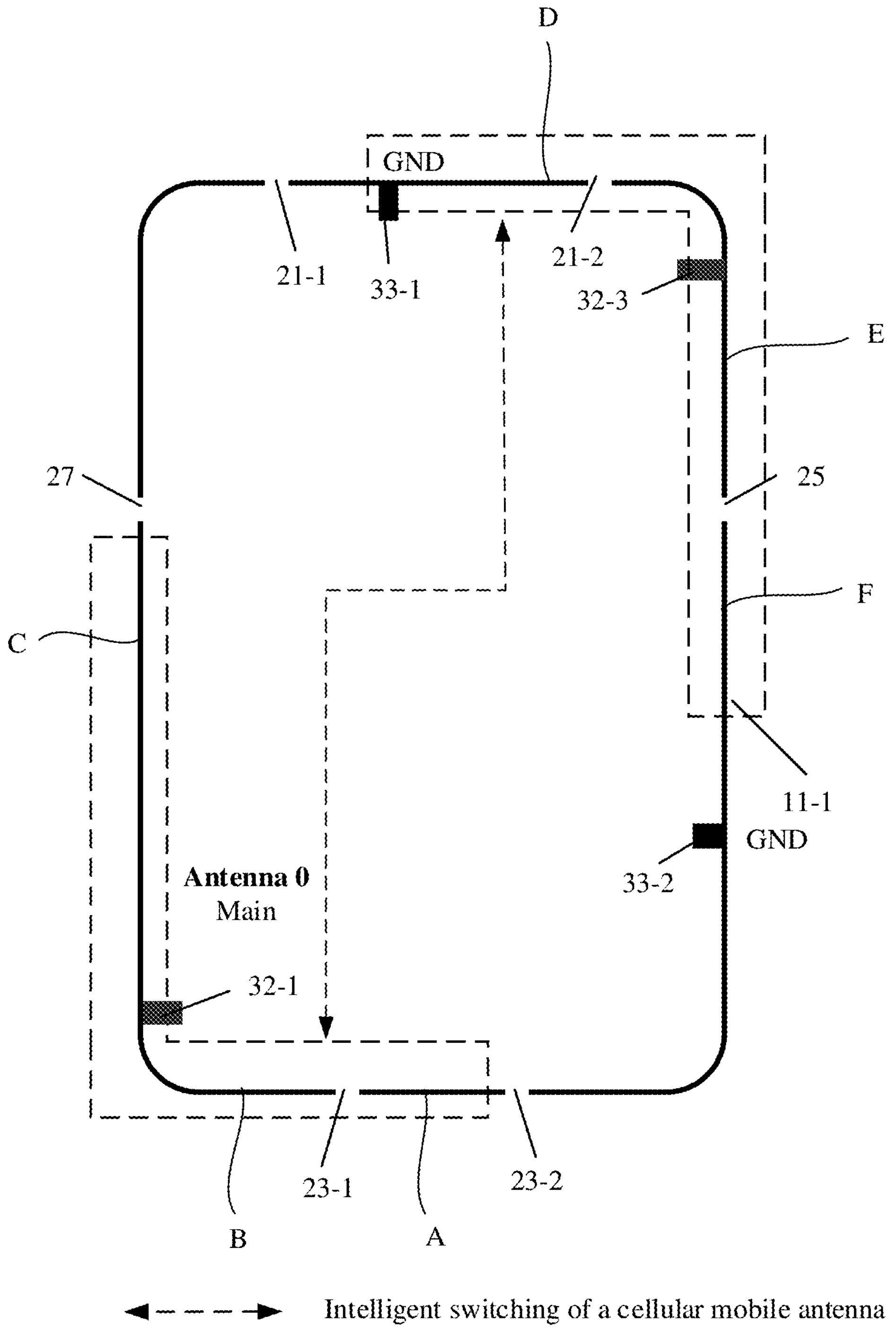
FIG. 10C is a schematic diagram of a position at which a tuning switch may be disposed in the multi-antenna system in FIG. 10A.

As shown in FIG. 10A and FIG. 10B, the antenna 1 may include the upper frame 11-5 of the structure 11, the top gaps 21-1 and 21-2, a feed point 32-3, the right side frame 11-1 of the structure 11, and the side gap 25. The feed point 32-3 may be disposed on a peripheral conductive segment between the top gap 21-2 and the side gap 25. The feed point 32-3 may be connected to feeding of the antenna 1 to excite the antenna 1 to generate radiation. Different from the antenna 1 in FIG. 9A to FIG. 9C, the antenna 1 in FIG. 10A to FIG. 10C extends from the upper frame 11-5 at the top to the side frame 11-1 and may radiate an electromagnetic wave by using the top gap 21-2 and the side gap 25.

Similar to the antenna 0, the antenna 1 may form two radiation modes at the top and on the side: a horizontal mode and a vertical mode. Herein, the horizontal mode may be a radiation mode in which the horizontal upper frame 11-5 is used as a primary radiator to generate radiation. Herein, the vertical mode may be a radiation mode in which the vertical side frame 11-1 is used as a primary radiator to generate radiation. When the radiation mode of the antenna 1 is the horizontal mode, the antenna 1 may be used as a top antenna. When the radiation mode of the antenna 1 is the vertical mode, the antenna 1 may be used as a middle antenna and is similar to the antenna 3 or the antenna 4 in Embodiment 1.

Whether the radiation mode of the antenna 1 is the horizontal mode or the vertical mode may be adjusted by changing states (for example, an open state or a close state) of tuning switches connected to the upper frame 11-5 and the side frame 11-1.

The tuning switch connected to the upper frame 11-5 may be referred to as a third tuning switch. The third tuning switch may be connected to the upper frame 11-5 on one side or two sides of the top gap 21-2, for example, at a position D shown in FIG. 10C. The tuning switch connected to the side frame 11-1 may be referred to as a fourth tuning switch. The fourth tuning switch may be connected to the side frame 11-1 on one side or two sides of the side gap 25, for example, at a position E or F shown in FIG. 10C.

When the third tuning switch is in an open state and the fourth tuning switch is in a close state, the upper frame 11-5 is fully excited, and may be used as a radiator to generate radiation. In this case, the radiation mode of the antenna 1 is the horizontal mode, the antenna 1 is not affected because the side gap 25 is held and holding radiation efficiency is good. The third tuning switch may be further configured to switch a radiation frequency band of the upper frame 11-5 in the horizontal mode, for example, perform switching between low-frequency bands such as LTE B5, LTE B8, and LTE B28.

When the fourth tuning switch is in an open state and the third tuning switch is in a close state, the side frame 11-1 is fully excited, and may be used as a radiator to generate radiation. In this case, the radiation mode of the antenna 1 is the vertical mode, and free-space radiation efficiency is good. The fourth tuning switch may be further configured to switch a radiation frequency band of the side frame 11-1 in the vertical mode, for example, perform switching between low-frequency bands such as LTE B5, LTE B8, and LTE B28.

It may be learned that the radiation mode of the antenna 1 may be switched and adjusted by adjusting a combined state of the third tuning switch and the fourth tuning switch, so that antenna performance is improved by using the combined state of the switches, and a frequency band can be further tuned.

(2) Support More Holding Scenarios

Based on entity antenna switching between the antenna 1 and the antenna 0 and virtual antenna switching between the antenna 0 and the antenna 1, the main antenna and the diversity antenna for cellular mobile communication can be switched among the top, the middle, and the bottom of the electronic device, to adapt to various scenarios, and ensure good antenna performance during cellular mobile communication.

For example, in a scenario in which the top of the electronic device is held by the user, for example, in the scenarios shown in FIG. 5(C) and FIG. 6(B), horizontal-mode performance of the antenna 1 is poor, but vertical-mode performance of the antenna 1 is good, and performance of the antenna 0 is good, especially horizontal-mode performance of the antenna 0 is good. The main antenna may be switched to the horizontal mode of the antenna 0, and the diversity antenna may be switched to the vertical mode of the antenna 1. This can ensure good antenna performance of the main antenna and the diversity antenna.

For example, in a scenario in which both the top and the bottom of the electronic device are held by the user, for example, in the scenario shown in FIG. 6(C), horizontal-mode performance of the antenna 1 is poor, and horizontal-mode performance of the antenna 0 is poor, but vertical-mode performance of both the antenna 0 and the antenna 1 is good. The main antenna may be switched to the vertical mode of the antenna 0, and the diversity antenna may be switched to the vertical mode of the antenna 1. This can ensure good antenna performance of the main antenna and the diversity antenna.

Extension 2

(1) Add a Side Antenna 2

Figure 11A:
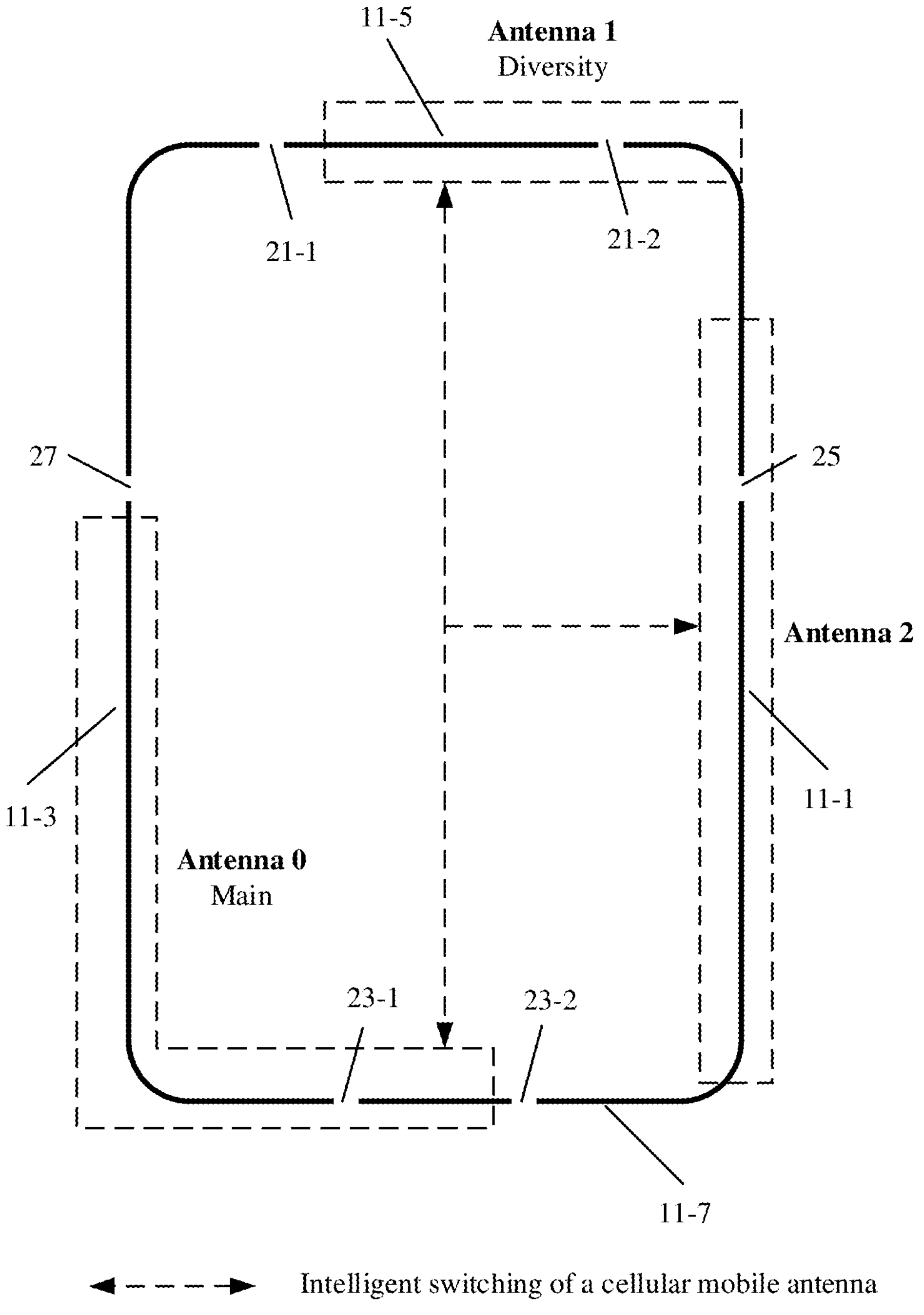
FIG. 11A is a schematic diagram of a structure of still another low-frequency multi-antenna system.
Figure 11B:
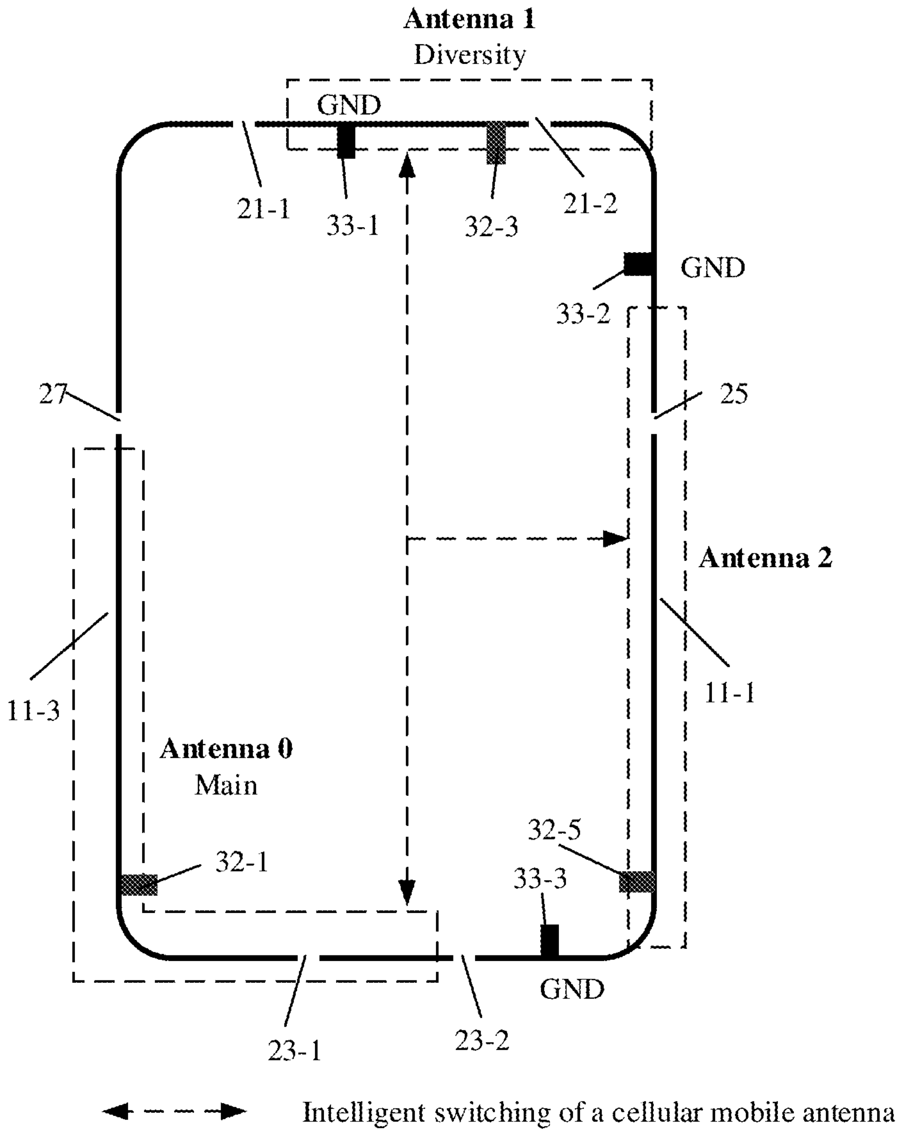
FIG. 11B is a schematic diagram of feeding and grounding of the multi-antenna system in FIG. 11A.

In addition to the antenna 0 and the antenna 1 in FIG. 9A to FIG. 9C, as shown in FIG. 11A and FIG. 11B, the multi-antenna system provided in Embodiment 2 may further include the antenna 2. The antenna 2 may include the side frame 11-1, the side gap 25, and a feed point 32-5. The feed point 32-5 may be disposed on the side frame 11-1. The feed point 32-5 may be connected to feeding of the antenna 2 to excite the antenna 2 to generate radiation. As shown in FIG. 11B, the feed point 32-5 may be disposed on a lower side of the side gap 25.

In addition, as shown in FIG. 11B, a ground point 33-2 disposed between the feed point 32-5 and a feed point 32-3 may improve isolation between the antenna 2 and the antenna 1, and a ground point 33-3 disposed between the feed point 32-5 and a feed point 32-1 may improve isolation between the antenna 2 and the antenna 0.

(2) Tune a Frequency Band of the Antenna 2

Figure 11C:
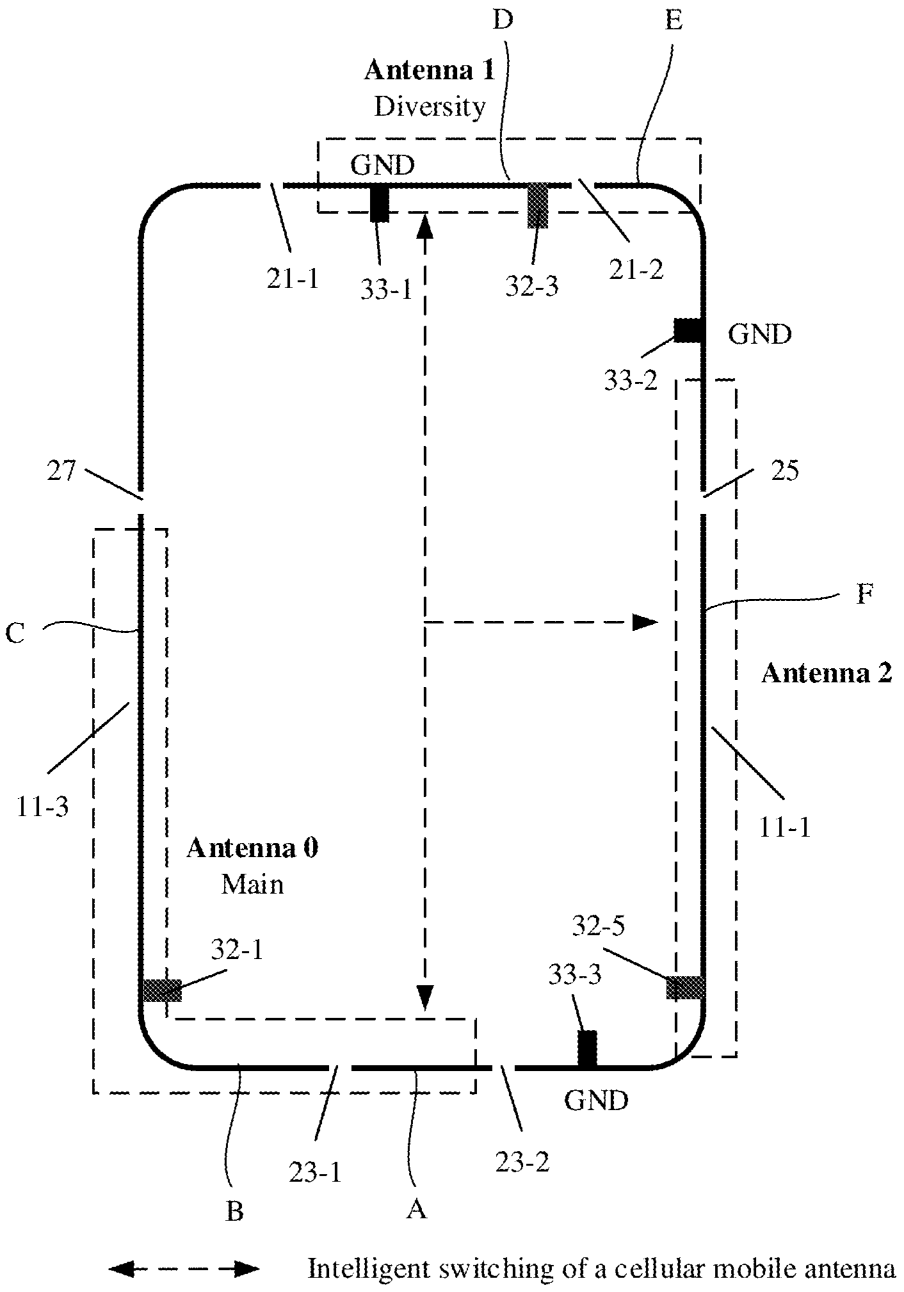
FIG. 11C is a schematic diagram of a position at which a tuning switch may be disposed in the multi-antenna system in FIG. 11A.

As shown in FIG. 11C, a tuning switch connected to the side frame 11-1 may tune the frequency band of the antenna 2. For example, the tuning switch may be disposed on one side or two sides of the side gap 25, for example, at a position F.

(3) Entity Antenna Switching

In the free-space scenario, the antenna 0 in the horizontal mode may be used as the main antenna for cellular mobile communication, and the antenna 1 may be used as the diversity antenna for cellular mobile communication.

Similar to the antenna 0 and the antenna 1, the antenna 2 may also be connected to the first antenna switching switch. The first antenna switching switch may be configured to select an antenna with optimal signal quality from the antenna 0, the antenna 1, and the antenna 2. The selected antenna with optimal signal quality may be used as the main antenna. The first antenna switching switch may be further configured to select an antenna with suboptimal signal quality from the antenna 0, the antenna 1, and the antenna 2 as the diversity antenna. In other words, the main antenna and the diversity antenna for cellular mobile communication may be switched among the top antenna, the middle antenna, and the bottom antenna, to adapt to various scenarios and ensure antenna performance during cellular mobile communication.

For example, in a scenario in which the bottom of the electronic device is held by the user, for example, in the scenarios shown in FIG. 5(A) and FIG. 6(A), horizontal-mode performance of the antenna 0 is poor, but vertical-mode signal quality of the antenna 0 and signal quality of the antenna 1 and the antenna 2 are good. The main antenna may be switched to the antenna 1, and the diversity antenna may be switched to the vertical mode of the antenna 0 or the antenna 2. In this way, antenna performance of the main antenna can be ensured, and antenna performance of the diversity antenna can also be ensured, to avoid the following problem: Performance of the diversity antenna is deteriorated because the main antenna is switched upward and the diversity antenna is switched downward in the conventional "top-bottom antenna layout".

For example, in a scenario in which the top of the electronic device is held by the user, for example, in the scenarios shown in FIG. 5(C) and FIG. 6(B), signal quality of the antenna 1 is deteriorated due to the hold of the user, but signal quality of the antenna 0 and the antenna 2 is good. The horizontal mode of the antenna 0 may be used as the main antenna, so that the main antenna can present good antenna performance. The diversity antenna may be switched to the antenna 2. This can ensure antenna performance of the diversity antenna.

For example, in a scenario in which both the top and the bottom of the electronic device are held by the user, for example, in the scenario shown in FIG. 6(C), horizontal-mode performance of the antenna 0 and performance of the antenna 1 are poor, but vertical-mode performance of the antenna 0 and performance of the antenna 2 are good. The main antenna may be switched to the antenna 2, and the diversity antenna may be switched to the vertical mode of the antenna 0. Alternatively, the diversity antenna may be switched to the antenna 2, and the main antenna may be switched to the vertical mode of the antenna 0. In this way, the main antenna and the diversity antenna can present good antenna performance.

For example, in a scenario in which the middle of the electronic device is held by the user, for example, in the scenarios shown in FIG. 5(D) and FIG. 6(D), vertical-mode performance of the antenna 0 and performance of the antenna 2 are poor, but horizontal-mode performance of the antenna 0 and performance of the antenna 1 are good. The horizontal mode of the antenna 0 may be used as the main antenna, and the antenna 1 may be used as the diversity antenna.

The foregoing several examples impose no limitation. The multi-antenna system shown in FIG. 11A and FIG. 11B is applicable to another holding scenario, to present good antenna performance and improve cellular mobile communication quality.

In Embodiment 2, the left side frame 11-3 and the right side frame 11-1 may be respectively referred to as a first side frame and a second side frame. The antenna 0 may be referred to as a first antenna, the antenna 1 may be referred to as a second antenna, and the antenna 2 may be referred to as a third antenna. The feed point 32-1 may be referred to as a first feed point. The feed point 32-3 may be referred to as a second feed point. The feed point 32-5 may be referred to as a third feed point. The side gap 27 and the side gap 25 may be respectively referred to as a first side gap and a second side gap.

Embodiment 3

This embodiment is designed for a foldable electronic device (for example, a foldable mobile phone).

Figure 12A:
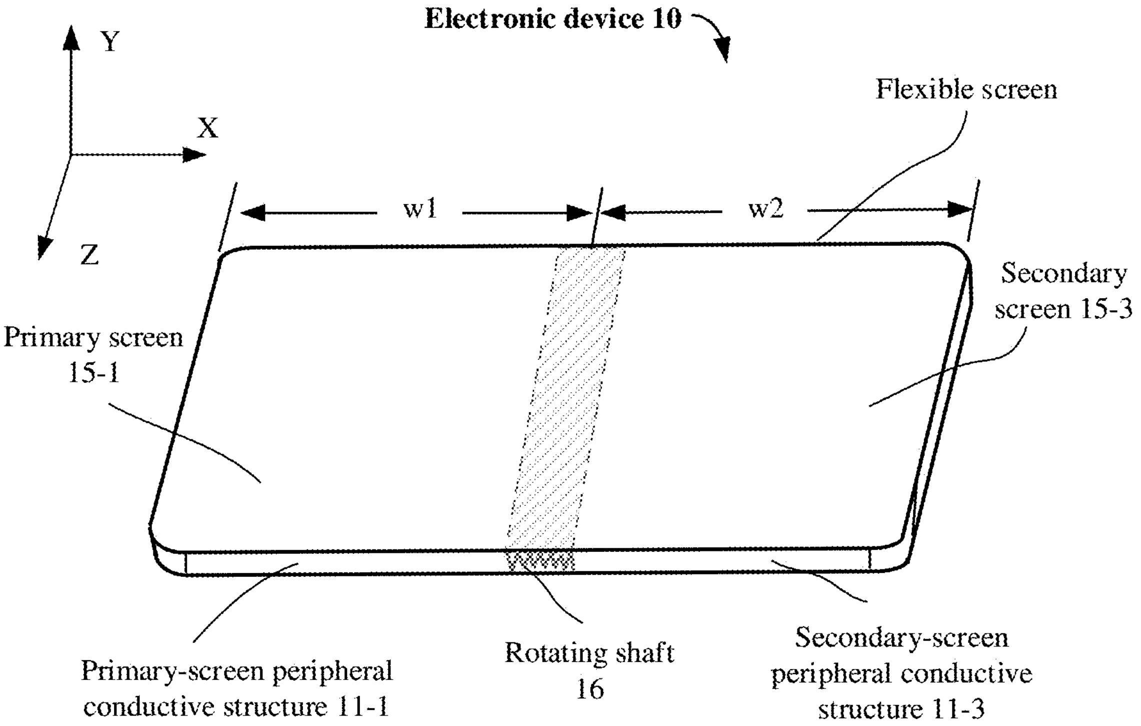
FIG. 12A and FIG. 12B are schematic diagrams of a structure of a foldable electronic device.
Figure 12B:
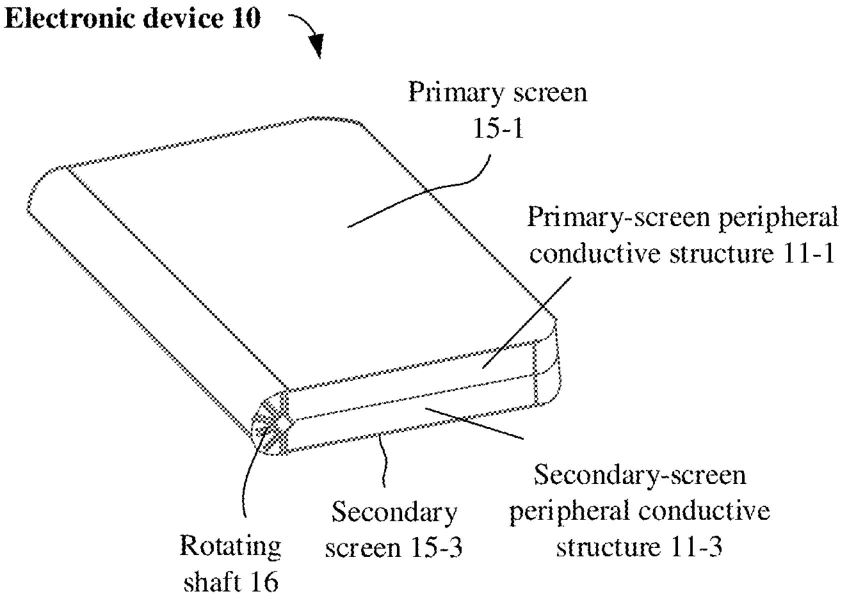

As shown in FIG. 12A and FIG. 12B, a display screen 15 of the foldable electronic device is a flexible screen. The flexible screen may include a primary screen 15-1 and a secondary screen 15-3. The foldable electronic device may further include a rotating shaft 16, and the rotating shaft 16 connects the primary screen 15-1 and the secondary screen 15-3. A width (w1) of the primary screen 15-1 and a width (w2) of the secondary screen 15-3 may be equal or unequal. The primary screen may be referred to as a first screen, and the secondary screen may be referred to as a second screen. A peripheral conductive structure 11 may include a primary-screen peripheral conductive structure 11-1 and a secondary-screen peripheral conductive structure 11-3.

The flexible screen 15 may be bent at the rotating shaft 16. Herein, "the flexible screen 15 is bent" may include the following: The flexible screen 15 is bent outward and the flexible screen 15 is bent inward. "The flexible screen 15 is bent outward" means that the flexible screen 15 is presented outside after being bent, a rear cover of the electronic device is presented inside, and display content on the flexible screen 15 is visible to a user. "The flexible screen 15 is bent inward" means that the flexible screen 15 is hidden inside after being bent, the rear cover of the electronic device is presented outside, and the display content on the flexible screen 15 is invisible to the user. The flexible screen 15 has two modes: an open state and a folded state. The open state may be a state in which an included angle α between the primary screen and the secondary screen exceeds a first angle (for example, 120°). The folded state may be a state in which the included angle α between the primary screen and the secondary screen is less than a second angle (for example, 15°). When the flexible screen 15 is in an open state, the electronic device may be shown in FIG. 12A as an example. When the flexible screen 15 is in a folded state, the electronic device may be shown in FIG. 12B as an example.

Figure 13A:
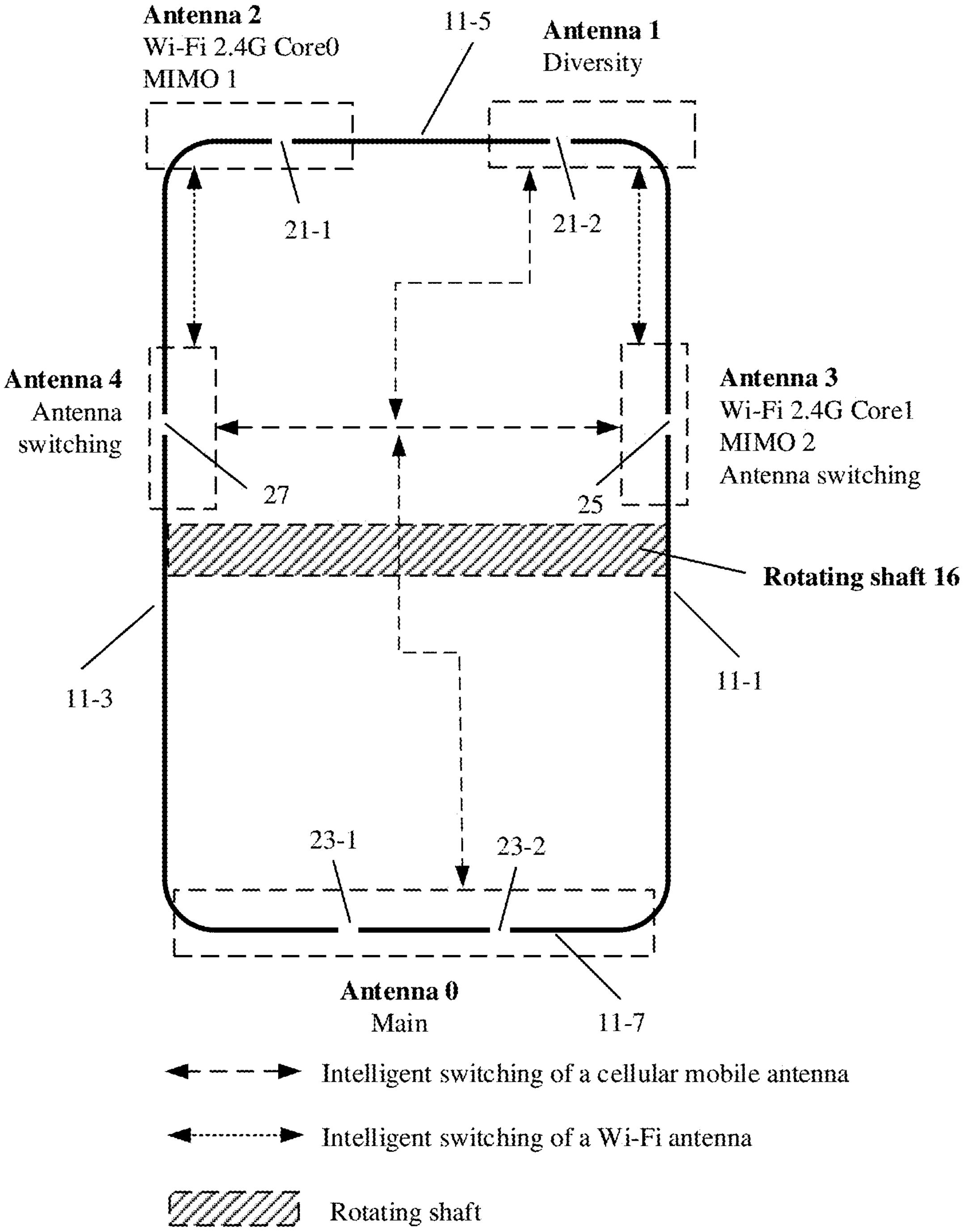
FIG. 13A shows an antenna switching solution for a foldable electronic device in an open state.

The foldable electronic device may have the multi-antenna system described in Embodiment 1. However, a multi-antenna switching solution of the foldable electronic device needs to be selected based on a specific mode (an open state or a folded state) in which the flexible screen is located. Details are as follows:

As shown in FIG. 13A, when the display screen of the foldable electronic device is in an open state, the antenna switching solution of the foldable electronic device is the same as the antenna switching solution in Embodiment 1. In other words, a main antenna and a diversity antenna for cellular mobile communication may be switched among a top antenna, a middle antenna, and a bottom antenna, to adapt to various scenarios and ensure antenna performance during cellular mobile communication. For how to switch the main antenna and the diversity antenna, refer to the related content in Embodiment 1. Details are not described herein again. In addition, in a Wi-Fi scenario, when signal quality of the top antenna is poor, a Wi-Fi antenna may be further switched from the top antenna to the middle antenna. For how to switch the Wi-Fi antenna, refer to the related content in Embodiment 1. Details are not described herein again.

Figure 13B:
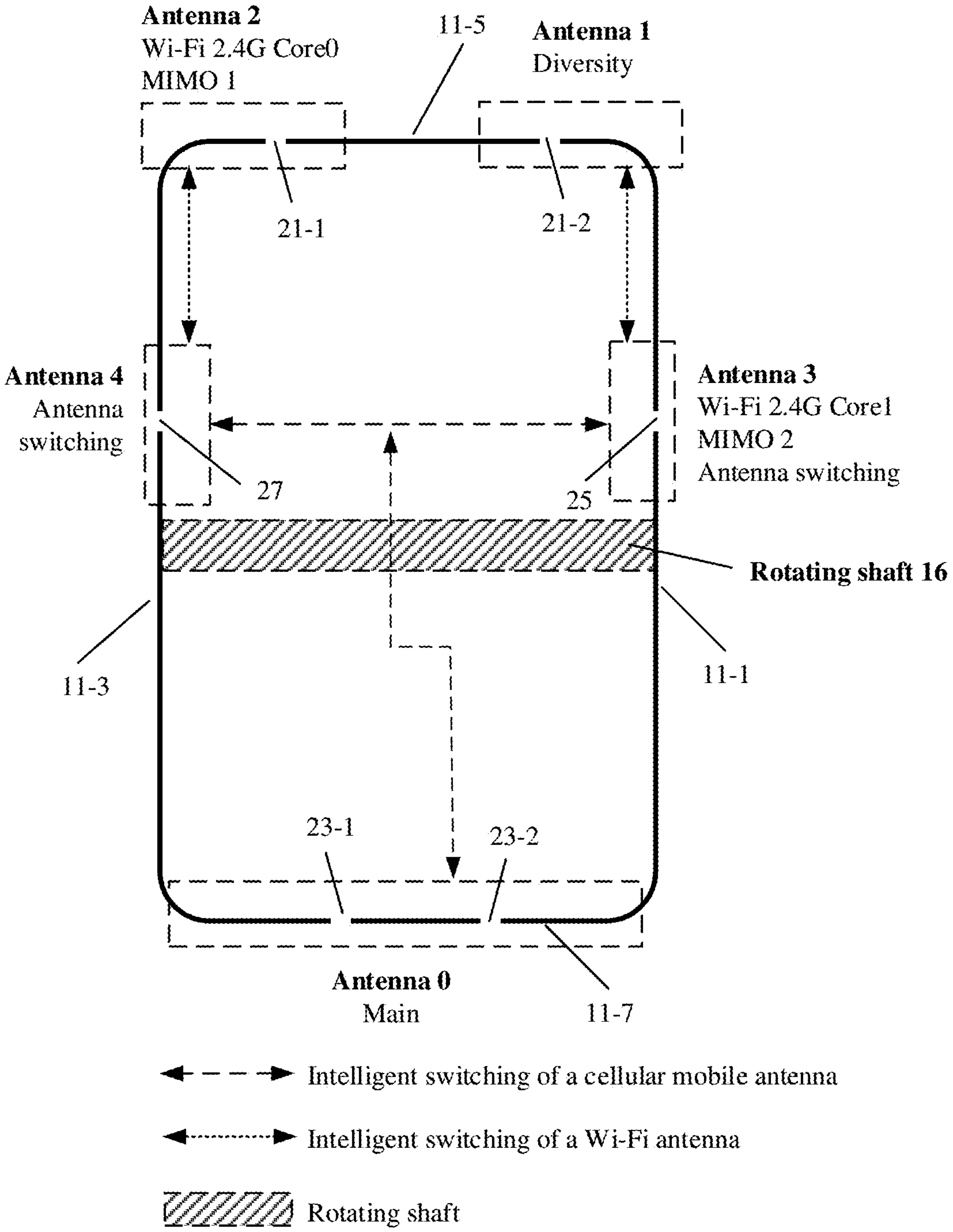
FIG. 13B shows an antenna switching solution for a foldable electronic device in a folded state.

As shown in FIG. 13B, when the display screen of the foldable electronic device is in a folded state, considering isolation existing between a top antenna and a bottom antenna when the foldable electronic device is in a folded state, the antenna switching solution of the foldable electronic device is different from the antenna switching solution in Embodiment 1. Details are as follows: The antenna switching solution for a main antenna and a diversity antenna for cellular mobile communication may be a three-antenna switching solution. For example, the main antenna and the diversity antenna may be switched between a middle antenna (the antenna 3 and the antenna 4) and the bottom antenna (the antenna 0). In a Wi-Fi scenario, a Wi-Fi antenna is switched to the middle antenna: the antenna 3 and the antenna 4.

Based on the multi-antenna system described in the foregoing embodiments an antenna selection solution may be provided. Several scenarios shown in FIG. 5(A) to FIG. 6(D) are identified by using a specific absorption rate (SAR) sensor and a motion sensor in the electronic device, an optimal antenna group is selected based on an application scenario, and then antenna selection is performed in the optimal antenna group by using a TAS/MAS antenna switching technology. In this way, antenna group switching and intra-antenna group switching can be implemented, and signal coverage of an antenna in each scenario can be increased. In the several typical application scenarios shown in FIG. 5(A) to FIG. 6(D), antenna performance is greatly improved (8 dB to 15 dB), power consumption of the electronic device is also reduced, and a standby time is prolonged.

The antenna selection solution may include the following several stages:

Stage 1: Screen-on/Off Identification

The electronic device may determine whether the display screen is in a screen-on state or a screen-off state. If the display screen is in a screen-off state, the electronic device may select a bottom antenna group of the electronic device as the optimal antenna group by default. As shown in FIG. 7A, if the bottom antenna group includes only the antenna 0, the antenna 0 is an optimal antenna. If the bottom antenna group includes a plurality of antennas, the electronic device may select an optimal antenna from the plurality of antennas by using the TAS/MAS antenna switching technology. If the display screen is in a screen-on state, the electronic device may perform antenna selection by using a method described at a subsequent stage.

Stage 2: Scenario Identification

The electronic device may identify an scenario based on the SAR sensor and the motion sensor in the electronic device, for example, the several portrait-mode holding scenarios shown in FIG. 5(A) and FIG. 5(B) and the several landscape-mode holding scenarios shown in FIG. 6(A) to FIG. 6(D). The motion sensor may include an accelerometer, a gyroscope, a magnetic sensor, and the like.

Figure 14:
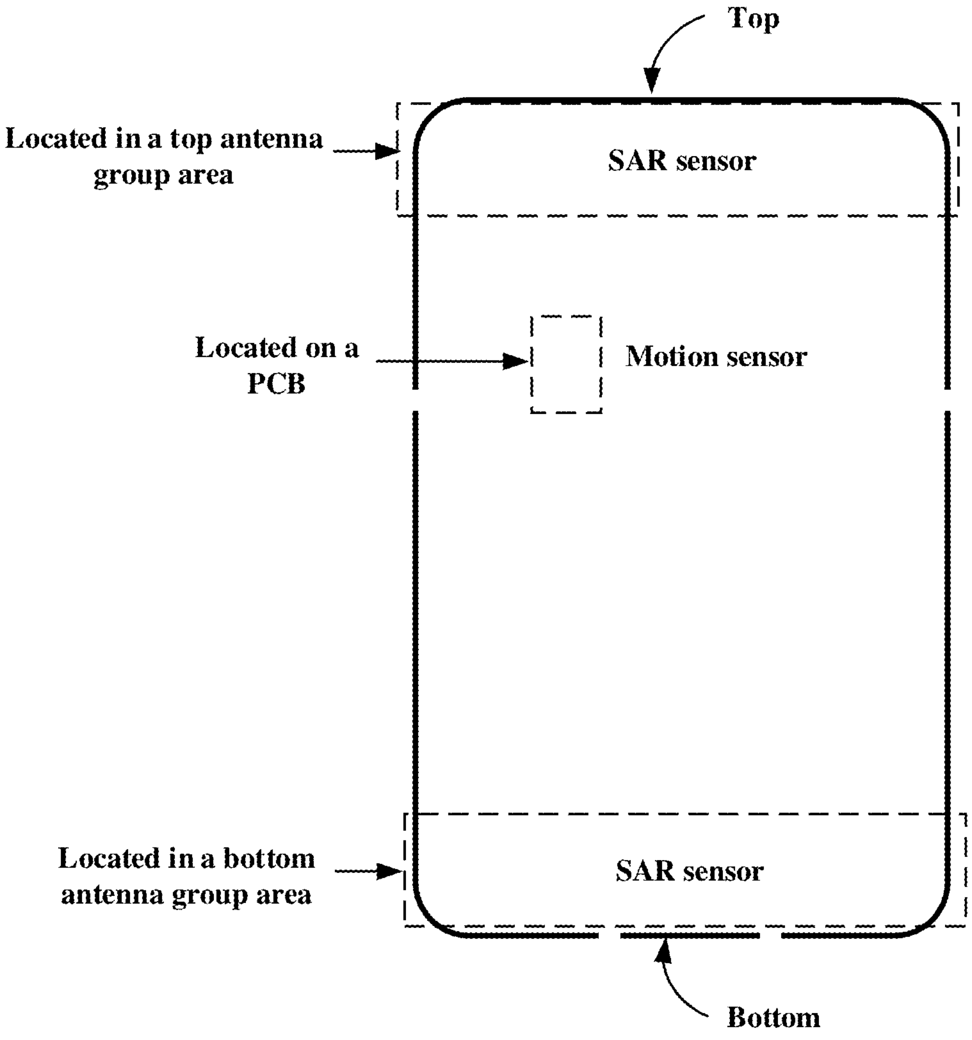
FIG. 14 is a schematic diagram of layout of an SAR sensor and a motion sensor in an electronic device.

As shown in FIG. 14, the SAR sensor may be disposed at the top and the bottom of the electronic device and may be configured to detect proximity between a human body and each of the top and the bottom of the electronic device. In other words, the electronic device may determine, by using the SAR sensors distributed at the top and the bottom, whether the user holds the top and the bottom. Further, the electronic device may determine a posture of the electronic device based on the motion sensor disposed in the electronic device. The posture of the electronic device may include the following: The electronic device is rested on a horizontal plane, the electronic device is held by the user in the portrait mode, the electronic device is held by the user in the landscape mode, and the like.

FIG. 15A to FIG. 15C and FIG. 16A to FIG. 16C show several manners of disposing a sensing stub of the SAR sensor. The sensing stub may be implemented by using an existing component in the electronic device, such as a support antenna on the back of the electronic device or the peripheral conductive structure 11 of the housing 19. The sensing stub may be a sensing stub specially disposed for the SAR sensor.

Figure 15A:
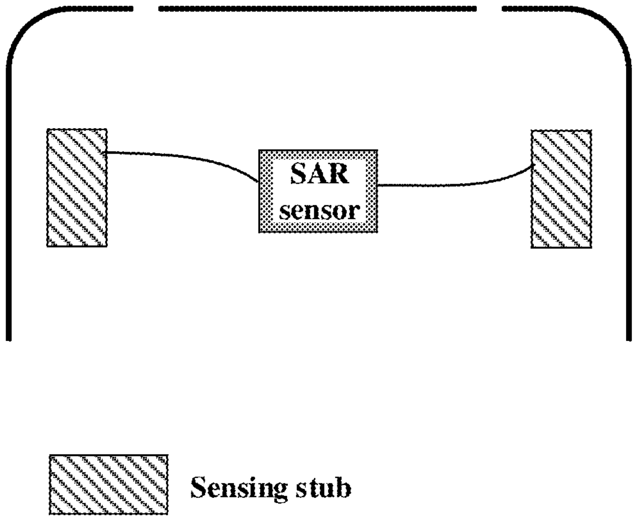
FIG. 15A to FIG. 15C are schematic diagrams of disposing a sensing stub of an SAR sensor.
Figure 15B:
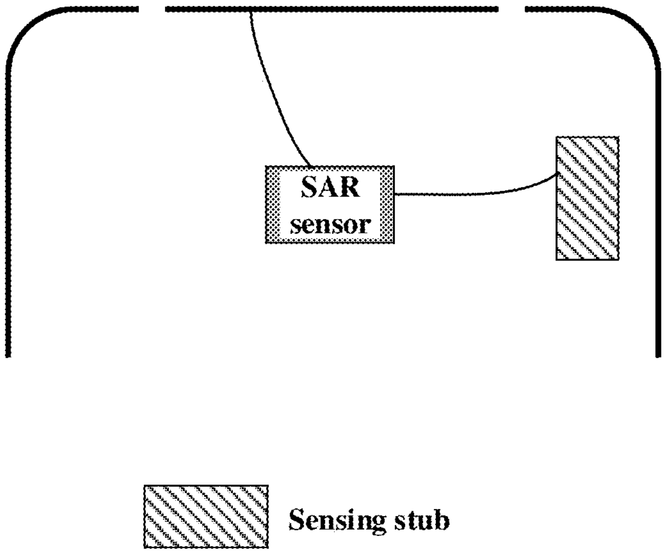
Figure 15C:
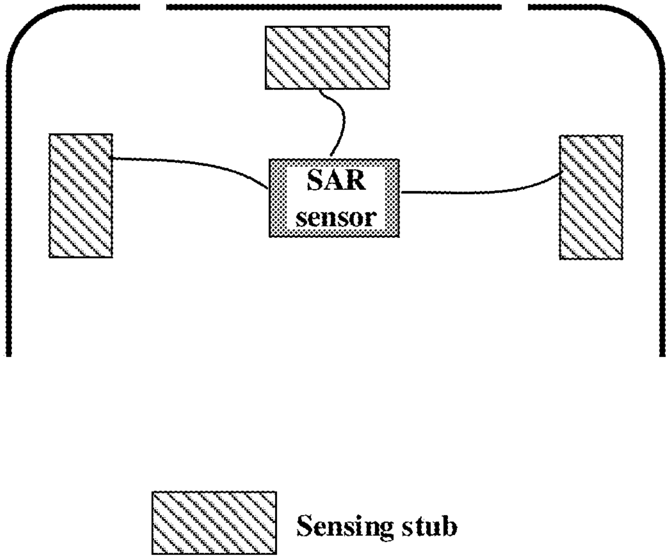

As shown in FIG. 15A to FIG. 15C, the SAR sensor may be connected to several ungrounded floating sensing stubs. FIG. 15A shows that the SAR sensor is connected to two vertical floating sensing stubs. FIG. 15B shows that the SAR sensor is connected to one vertical floating sensing stub and one horizontal floating sensing stub, the horizontal floating sensing stub is a floating peripheral conductive segment, and the peripheral conductive segment is formed by segmenting the structure 11 by using two gaps. FIG. 15C shows that the SAR sensor is connected to two vertical floating sense stubs and one horizontal floating stub.

Figure 16A:
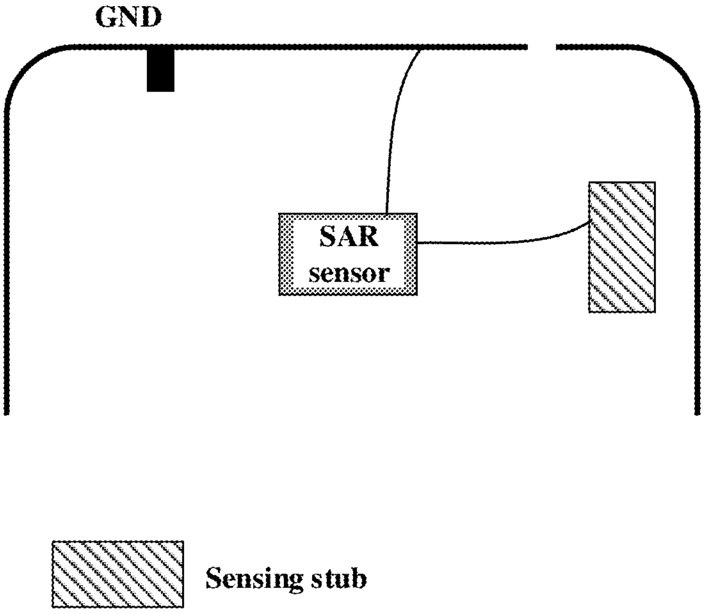
FIG. 16A to FIG. 16C are other schematic diagrams of disposing a sensing stub of an SAR sensor.
Figure 16B:
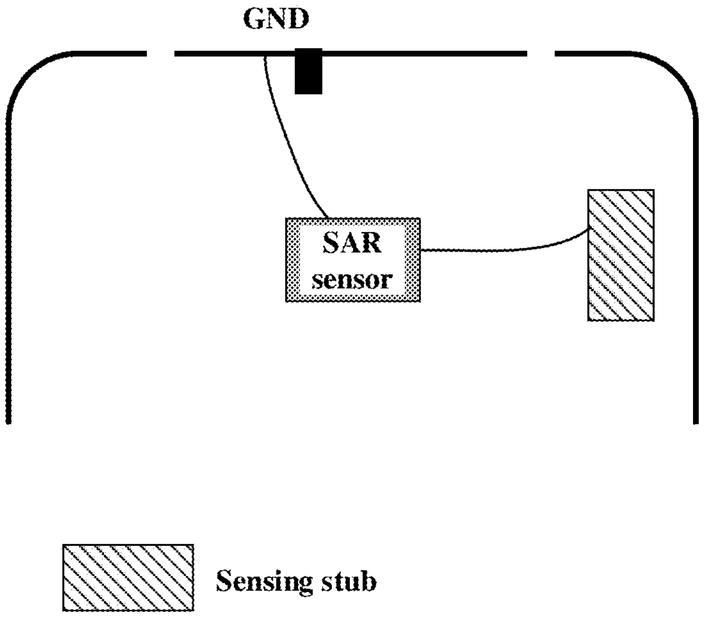
Figure 16C:
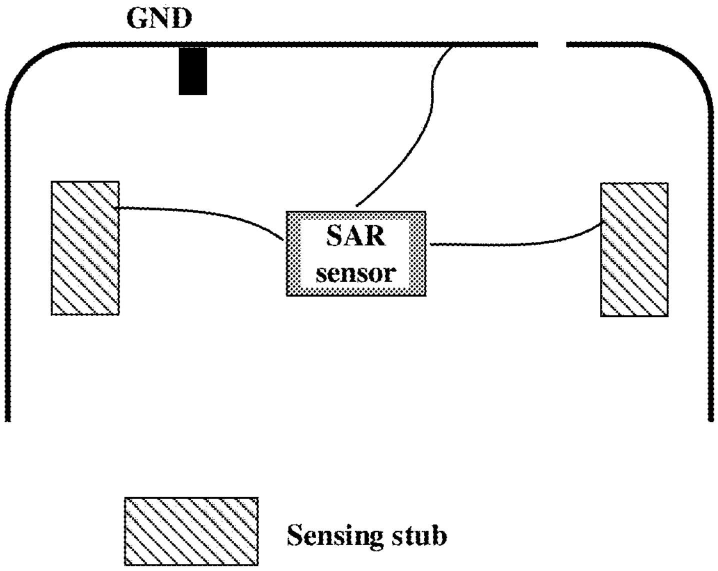

As shown in FIG. 16A to FIG. 16C, the SAR sensor may be connected to several ungrounded floating sensing stubs and one grounded sensing stub. In both FIG. 16A and FIG. 16B, the SAR sensor is connected to one floating sensing stub and one grounded sensing stub. However, the grounded sensing stubs in FIG. 16A and FIG. 16B are different. In FIG. 16C, the SAR sensor is connected to two vertical floating sensing stub and one grounded sensing stub.

The manners, of disposing the sensing stub of the SAR sensor, shown in FIG. 15A to FIG. 15C and FIG. 16A to FIG. 16C are applicable to the top antenna group of the electronic device, and are also applicable to the bottom antenna group of the electronic device.

Stage 3: Antenna Group Switching

The electronic device may perform antenna group switching based on the scenario identified in Stage 2, to select an antenna group that has good performance and that is applicable to the scenario. The selected antenna group may be referred to as a first antenna group.

Figure 17:
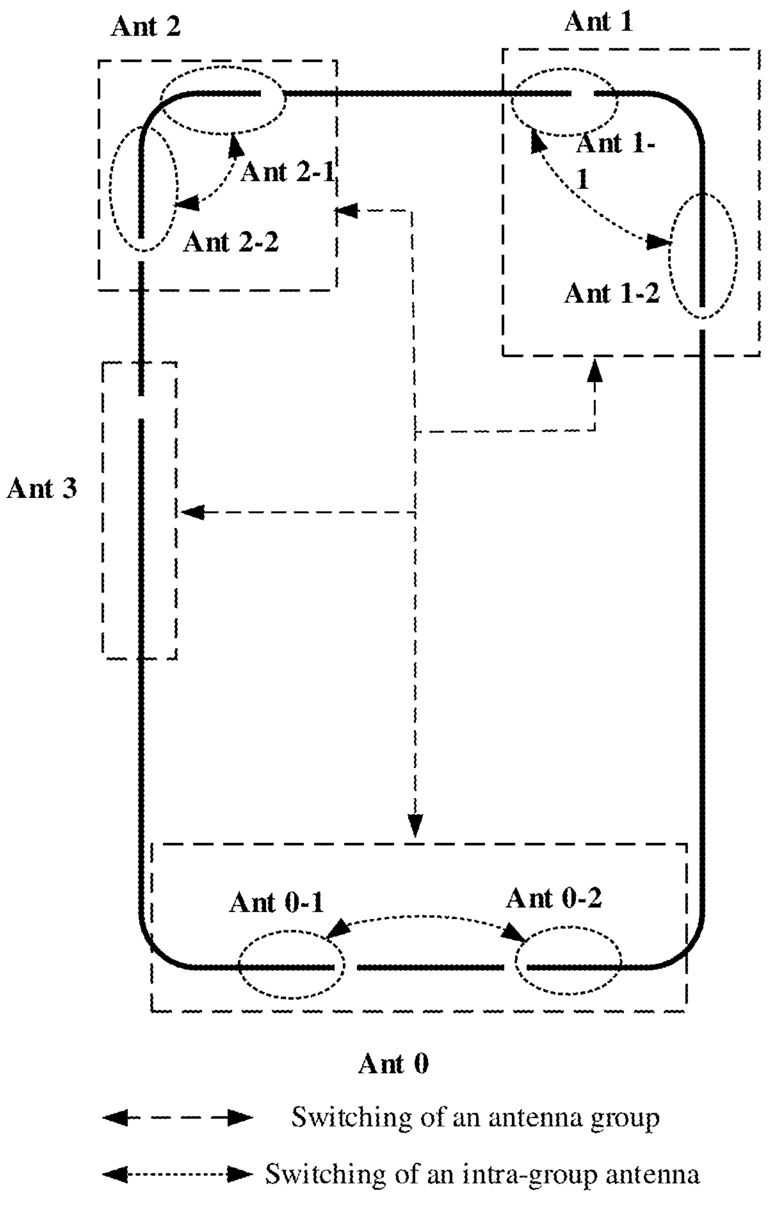
FIG. 17 is a schematic diagram of a multi-antenna switching solution for a 1T4R antenna architecture.
Figure 18:
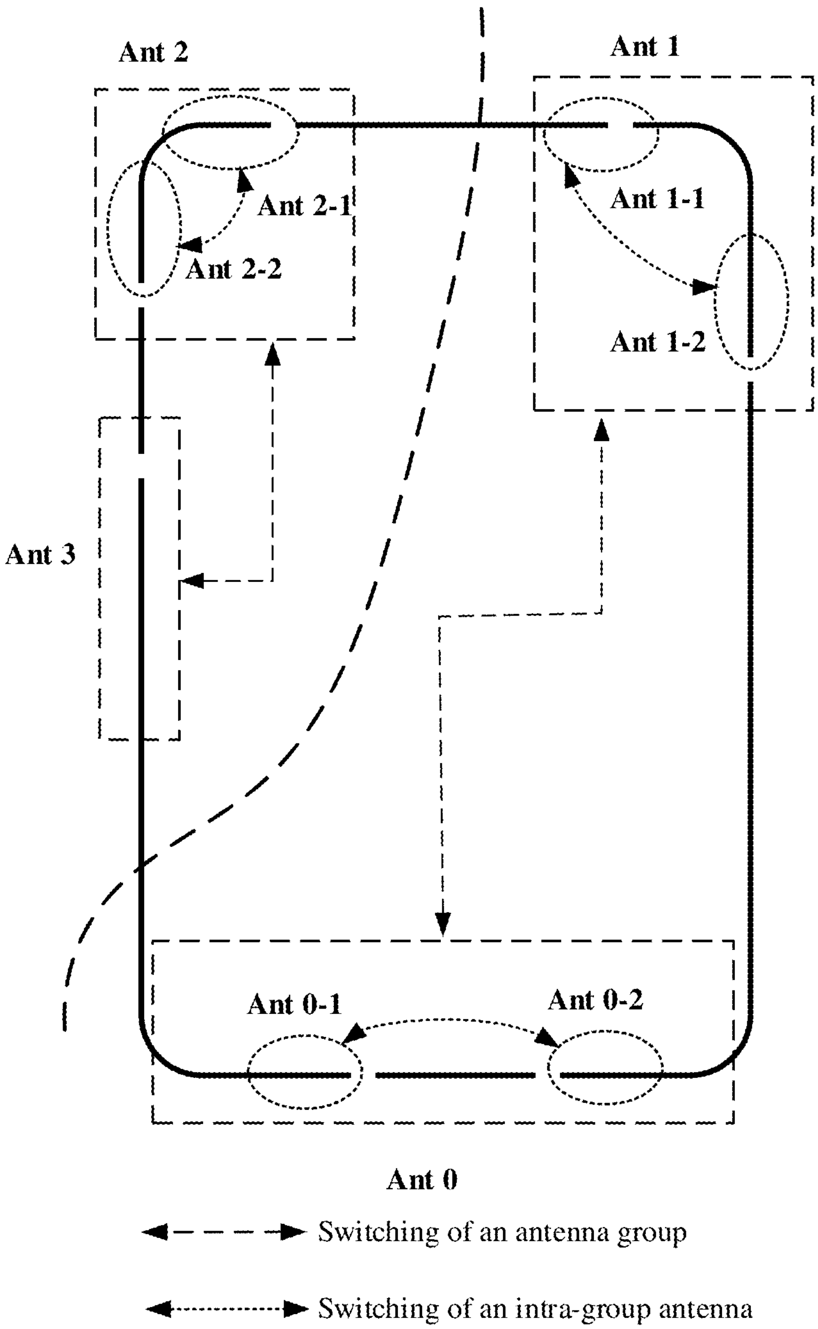
FIG. 18 is a schematic diagram of a multi-antenna switching solution for a 2T4R antenna architecture.

FIG. 17 and FIG. 18 show an example of one-transmit and four-receive (1T4R) and two-transmit and four-receive (2T4R) antenna architectures. In the one-transmit and four-receive (1T4R) architecture, antenna groups Ant 0, Ant 1, Ant 2, and Ant 3 may be connected to a same antenna switching switch, and the antenna switching switch may be configured to select the main antenna and the diversity antenna from the antenna groups Ant 0, Ant 1, Ant 2, and Ant 3. In the two-transmit and four-receive (2T4R) architecture, antenna groups Ant 0 and Ant 1 may be connected to a same antenna switching switch, antenna groups Ant 2 and Ant 3 may be connected to another antenna switching switch, the antenna switching switch may be configured to select the main antenna and the diversity antenna from the antenna groups Ant 0 and Ant 1, and the another antenna switching switch may be further configured to select, from the antenna groups Ant 2 and Ant 3, another antenna group for transmitting a signal.

Table 1 shows antenna group switching solutions applicable to several portrait-mode holding scenarios in the one-transmit and four-receive (1T4R) and two-transmit and four-receive (2T4R) antenna architectures shown in FIG. 17 and FIG. 18 as an example. Table 2 shows antenna group switching solutions applicable to several landscape-mode holding scenarios in the one-transmit and four-receive (1T4R) and two-transmit and four-receive (2T4R) antenna architectures shown in FIG. 17 and FIG. 18 as an example. FIG. 17 and FIG. 18 show antenna architectures formed by dividing the structure 11 by using seven gaps, and the antenna architectures each have the bottom antenna group Ant 0, the top antenna group Ant 1, the top antenna group Ant 2, and the middle antenna group Ant 3. The antenna group Ant 0 includes two antennas: Ant 0-1 and Ant 0-2, the antenna group Ant 1 includes two antennas: Ant 1-1 and Ant 1-2, the antenna group Ant 2 includes two antennas: Ant 2-1 and Ant 2-2, and the antenna group Ant 3 has only one antenna Ant 3.

TABLE 1

| Portrait mode | Standby mode | Holding 1 | Holding 2 | Holding 3 |
|---|---|---|---|---|
| Top SAR sensor | 0 | 1 | 0 | 0 |
| Bottom SAR sensor | 0 | 0 | 1 | 0 |
| Motion sensor | 0 | 0 | 0 | 0 |
| Optimal antenna group | Ant 0 | Ant 1 | Ant 0 | Ant 0 |
| Gain (dB) | 0 | 8 to 12 | 0 | 0 |

TABLE 2

| Landscape mode | Standby mode | Holding 1 | Holding 2 | Holding 3 | Holding 4 |
|---|---|---|---|---|---|
| Top SAR sensor | 0 | 1 | 0 | 1 | 0 |
| Bottom SAR sensor | 0 | 0 | 1 | 1 | 0 |
| Motion sensor | 1 | 1 | 1 | 1 | 1 |
| Optimal antenna group | Ant 0 | Ant 1 | Ant 0 | Ant 3 | Ant 0 |
| Gain | 0 | 8 to 12 | 0 | 5 to 8 | 0 |

In Table 1 and Table 2, if a detection result of the top SAR sensor is “1”, it indicates that the top of the electronic device is held by the user. If a detection result of the top SAR sensor is “0”, it indicates that the top of the electronic device is not held by the user. If a detection result of the bottom SAR sensor is “1”, it indicates that the bottom of the electronic device is held by the user. If a detection result of the bottom SAR sensor is “0”, it indicates that the bottom of the electronic device is not held by the user. If a detection result of the motion sensor is “1”, it indicates that the electronic device is held by the user in the landscape mode. If a detection result of the motion sensor is “0”, it indicates that the electronic device is held by the user in the portrait mode. Herein, “1” and “0” in the table are used to distinguish between two states detected by the sensor, for example, “held” and “not held”, and are not used to limit a detection value of the sensor. It should be understood that a plurality of detection results “1” may actually correspond to different detection values, for example, different detection values of the SAR sensor indicate different proximity between the human body and the electronic device.

In Table 1, portrait-mode scenarios may include a standby mode, a portrait-mode holding scenario 1 (as shown in FIG. 5(A) and FIG. 5(B)), a portrait-mode holding scenario 2 (as shown in FIG. 5(C)), and a portrait-mode holding scenario 3 (as shown in FIG. 5(D)). These portrait-mode scenarios may be determined by using detection results of the top SAR sensor, the bottom SAR sensor, and the motion sensor.

It may be learned that the electronic device may select the top antenna group (such as Ant 1) as the optimal antenna group if a current scenario is determined to be a scenario (for example, the portrait-mode holding scenario 1) in which the bottom of the electronic device is held by the user in the portrait mode. The electronic device may select the bottom antenna group (such as Ant 0) as the optimal antenna group if a current scenario is determined to be a scenario (for example, the portrait-mode holding scenario 2) in which the top of the electronic device is held by the user in the portrait mode. The electronic device may select the bottom antenna group (such as Ant 0) as the optimal antenna group if a current scenario is determined to be a scenario (for example, the portrait-mode holding scenario 3) in which the middle of the electronic device is held by the user in the portrait mode. In the portrait-mode holding scenario 1, the antenna group Ant 1 is selected as the optimal antenna group. Compared with a manner of selecting the bottom antenna group by default, the gain may be increased by about 8 dB to 12 dB.

In Table 2, landscape-mode scenarios may include a standby mode, a landscape-mode holding scenario 1 (as shown in FIG. 6(A)), a landscape-mode holding scenario 2 (as shown in FIG. 6(B)), a landscape-mode holding scenario 3 (as shown in FIG. 6(C)), and a landscape-mode holding scenario 4 (as shown in FIG. 6(D)). These landscape-mode scenarios may be determined by using detection results of the top SAR sensor, the bottom SAR sensor, and the motion sensor.

It may be learned that the electronic device may select the top antenna group (such as Ant 1) as the optimal antenna group if a current scenario is determined to be a scenario (for example, the landscape-mode holding scenario 1) in which the bottom of the electronic device is held by the user in the landscape mode. The electronic device may select the bottom antenna group (such as Ant 0) as the optimal antenna group if a current scenario is determined to be a scenario (for example, the landscape-mode holding scenario 2) in which the top of the electronic device is held by the user in the landscape mode. The electronic device may select the middle antenna group (such as Ant 3) as the optimal antenna group if a current scenario is determined to be a scenario (for example, the landscape-mode holding scenario 3) in which both the top and the bottom of the electronic device are held by the user in the landscape mode. The electronic device may select the bottom antenna group (such as Ant 0) as the optimal antenna group if a current scenario is determined to be a scenario (for example, the landscape-mode holding scenario 4) in which the middle of the electronic device is held by the user in the landscape mode. In the landscape-mode holding scenario 1, the antenna group Ant 1 is selected as the optimal antenna group. Compared with a manner of selecting the bottom antenna group by default, the gain may be increased by about 8 dB to 12 dB. In the landscape-mode holding scenario 3, the antenna group Ant 3 is selected as the optimal antenna group. Compared with the manner of selecting the bottom antenna group by default, the gain may be increased by about 5 dB to 8 dB.

For example, the current scenario may include any one of the following: the scenario in which the user holds the bottom of the electronic device in the portrait mode, the scenario in which the user holds the top of the electronic device in the portrait mode, the scenario in which the user holds the middle of the electronic device in the portrait mode, the scenario in which the user holds the bottom of the electronic device in the landscape mode, the scenario in which the user holds the top of the electronic device in the landscape mode, the scenario in which the user holds the top and the bottom of the electronic device in the landscape mode, and the scenario in which the user holds the middle of the electronic device in the landscape mode.

In addition to scenario identification, antenna group switching may be further performed according to a TAS/MAS algorithm, that is, antenna group selection is performed based on actual signal receiving/sending quality of each antenna group. This can adapt to a more complex holding scenario and can further increase the gain brought by antenna switching.

Stage 4: Antenna Switching in the Optimal Antenna Group

In the selected optimal antenna group, the electronic device may perform antenna switching according to the TAS/MAS algorithm, that is, perform antenna switching based on signal receiving/sending quality of each antenna in the optimal antenna group. For example, the electronic device may select an antenna with optimal signal quality from the first antenna group according to the TAS/MAS algorithm. For example, if the optimal antenna group is Ant 0, antenna switching may be performed between the antennas Ant 0-1 and Ant 0-2 according to the TAS/MAS algorithm. For another example, if the optimal antenna group is Ant 1, antenna switching may be performed between the antennas Ant 1-1 and Ant 1-2 according to the TAS/MAS algorithm.

Figure 19:
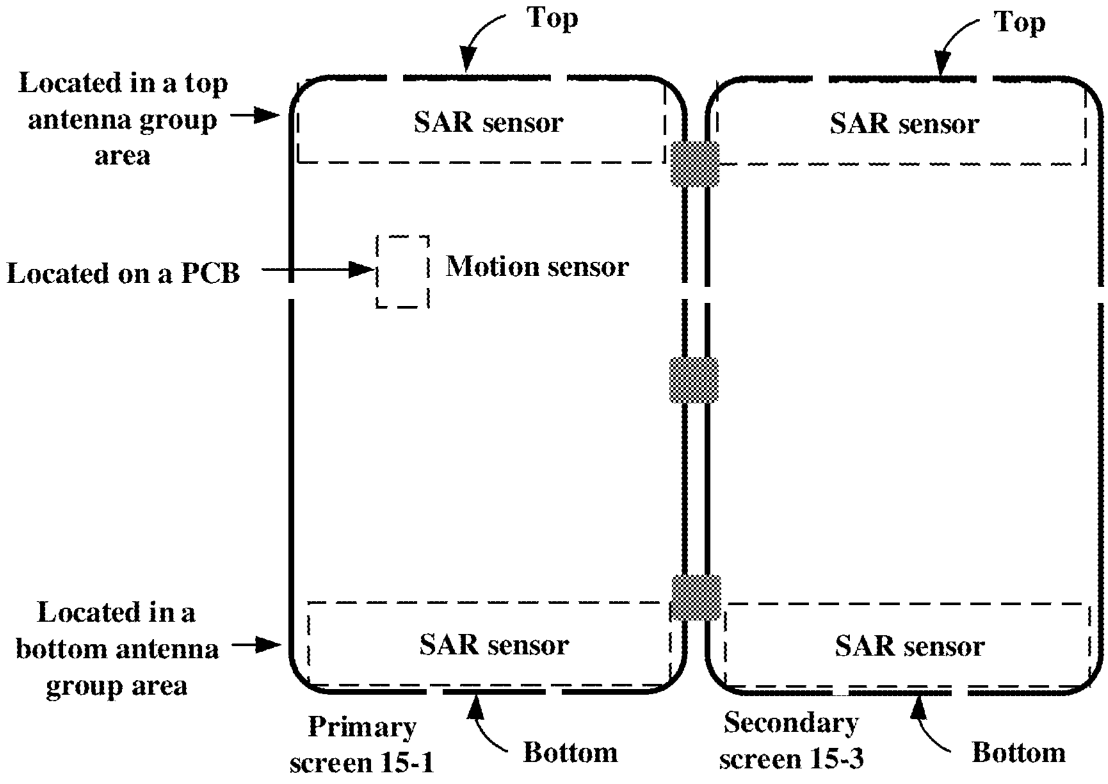
FIG. 19 is a schematic diagram of sensor layout for a foldable electronic device.

The antenna switching solution described in the foregoing Stages 1 to 4 may also be applicable to a foldable electronic device. As shown in FIG. 19, on a primary screen 15-1 of the foldable electronic device, for a manner of disposing a SAR sensor and a motion sensor, refer to the antenna switching solution described in the foregoing Stages 1 to 4, and for a manner of disposing a sensing stub of the SAR sensor, refer to the antenna switching solution described in the foregoing Stages 1 to 4. On a secondary screen 15-3 of the foldable electronic device, for a manner of disposing a SAR sensor in a top antenna group area and a bottom antenna group area, refer to FIG. 14. For a manner of disposing a sensing stub of the SAR sensor, refer to the two manners shown in FIG. 15A to FIG. 15C and FIG. 16A to FIG. 16C.

Figure 20:
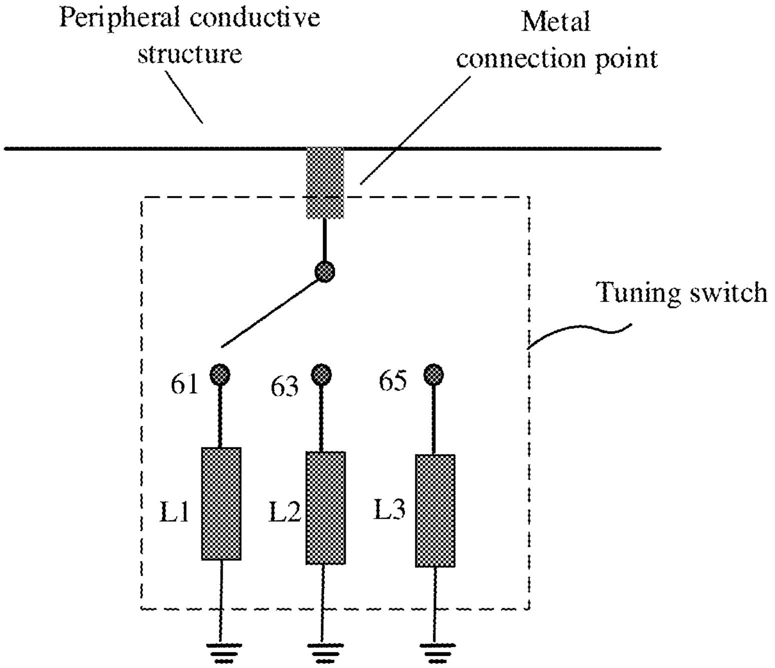
FIG. 20 is a schematic diagram of a structure of a tuning switch.

As shown in FIG. 20, the tuning switch mentioned in the foregoing embodiments may have a plurality of ground points, for example, a ground point 61, a ground point 63, and a ground point 65. Each ground point may be connected in series with an RLC lumped component. For example, the ground point 61 is connected in series with a lumped component L1, the ground point 63 is connected in series with a lumped component L2, and the ground point 65 is connected in series with a lumped component L3. Lumped parameter values of L1, L2, and L3 are different. The tuning switch may selectively connect ground points connected in series with different lumped components, to implement frequency adjustment.

"The tuning switch mentioned in the foregoing embodiments is in a close state" may also mean that the tuning switch is switched to an on state. "The tuning switch mentioned in the foregoing embodiments is in an open state" may also mean that the tuning switch is switched to an off state. That the tuning switch is in a close state may mean that the tuning switch connects a lumped component, for example, the tuning switch connects a 0-ohm lumped component to be grounded in a close state.

The foregoing descriptions are merely implementations, but are not intended to limit the protection scope. Any variation or replacement readily figured out by a person skilled in the art within the scope shall fall within the protection scope of the embodiments.

What is claimed is:

1. An electronic device, comprising:

a multi-antenna system, a housing, a display screen, a first specific absorption rate (SAR) sensor disposed at a top of the electronic device, a second SAR sensor disposed at a bottom of the electronic device, and a motion sensor;

a top antenna group distributed at the top of the electronic device, a bottom antenna group distributed at the bottom of the electronic device, a middle antenna group distributed in a middle of the electronic device, and a first antenna switch, wherein the housing of the electronic device has a peripheral conductive structure that comprises:

an upper frame that has at least one top gap, a lower frame that has at least one bottom gap, and a side frame that has at least one side gap, wherein the top antenna group comprises the upper frame, the at least one top gap, and a top feed point, and the top feed point is disposed on the upper frame;

wherein the bottom antenna group comprises the lower frame, the at least one bottom gap, and a bottom feed point, wherein the bottom feed point is disposed on the lower frame; and wherein the middle antenna group comprises the side frame, the at least one side gap, and a side feed point, and wherein the side feed point is disposed on the side frame; and wherein the top antenna group, the bottom antenna group, and the middle antenna group are connected to the first antenna switch, and the first antenna switch is configured to select one of the top antenna group, the bottom antenna group, and the middle antenna group as a main antenna group by using the first SAR sensor, the second SAR sensor, and the motion sensor.

2. The electronic device according to claim 1, wherein the first antenna switch is configured to select an antenna with optimal signal quality from the top antenna group, the bottom antenna group, and the middle antenna group as the main antenna group.

3. The electronic device according to claim 1, wherein the first antenna switch is further configured to select one of the top antenna group, the bottom antenna group, and the middle antenna group as a diversity antenna for cellular mobile communication.

4. The electronic device according to claim 3, wherein the first antenna switch is further configured to select an antenna with second-optimal signal quality from the top antenna group, the bottom antenna group, and the middle antenna group as the diversity antenna for cellular mobile communication.

5. The electronic device according to claim 1, wherein the at least one top gap comprises a first top gap and a second top gap, the first top gap is disposed on a first side of the upper frame, and the second top gap is disposed on a second side of the upper frame; the top feed point comprises a first top feed point and a second top feed point, the first top feed point is disposed on the first side of the upper frame, and the second top feed point is disposed on the second side of the upper frame; and the top antenna group comprises a first top antenna and a second top antenna, the first top antenna comprises a first part of the upper frame, the first top feed point, and the first top gap, the second top antenna comprises a second part of the upper frame, the first top feed point, and the second top gap, the first part is located on the first side, and the second part is located on the second side.

6. The electronic device according to claim 1, wherein the side frame comprises a first side frame and a second side frame, the first side frame is located on a first side of the electronic device, and the second side frame is located on a second side of the electronic device; the at least one side gap comprises a first side gap disposed on the first side frame and a second side gap disposed on the second side frame; the side feed point comprises a first side feed point disposed on the first side frame and a second side feed point disposed on the second side frame; and the middle antenna group comprises a first side antenna and a second side antenna, the first side antenna comprises the first side frame, the first side feed point, and the first side gap, and the second side antenna comprises the second side frame, the second side feed point, and the second side gap.

7. The electronic device according to claim 5, further comprising:

a second antenna switch; and a third antenna switch, wherein the second antenna switch is connected to the second side antenna and the second top antenna, and the second antenna switch is configured to select an antenna with better signal quality from the second side antenna and the second top antenna as a wireless fidelity (Wi-Fi) antenna; and the third antenna switch is connected to the first side antenna and the first top antenna, and the third antenna switch is configured to select an antenna with better signal quality from the first side antenna and the first top antenna as the Wi-Fi antenna.

8. An antenna switching method for an electronic device, wherein the electronic device comprises:

a housing, a display screen, a first specific absorption rate (SARA sensor, a second SAR sensor, and a motion sensor, the housing has a peripheral conductive structure, the peripheral conductive structure comprises:

an upper frame that has a top gap, a lower frame that has a bottom gap, and a side frame that has a side gap, the first SAR sensor is disposed at a top of the electronic device, the second SAR sensor is disposed at a bottom of the electronic device, and the electronic device further comprises:

a top antenna group distributed at the top of the electronic device, a bottom antenna group distributed at the bottom of the electronic device, and a middle antenna group distributed in a middle of the electronic device; and the method comprises:

after the display screen is in a screen-off state, selecting, by the electronic device, the bottom antenna group as a first antenna group;

after the display screen is in a screen-on state, determining, by the electronic device, a current scenario by using the first SAR sensor, the second SAR sensor, and the motion sensor, and selecting the first antenna group from the top antenna group, the bottom antenna group, and the middle antenna group based on the current scenario; and performing, by the electronic device, antenna switching in the first antenna group based on signal quality, wherein the current scenario comprises any one of the following:

a scenario in which a user holds the bottom of the electronic device in a portrait mode, a scenario in which the user holds the top of the electronic device in the portrait mode, a scenario in which the user holds the middle of the electronic device in the portrait mode, a scenario in which the user holds the bottom of the electronic device in a landscape mode, a scenario in which the user holds the top of the electronic device in the landscape mode, a scenario in which the user holds the top and the bottom of the electronic device in the landscape mode, and a scenario in which the user holds the middle of the electronic device in the landscape mode.

9. The method according to claim 8, wherein the performing, by the electronic device, antenna switching in the first antenna group based on signal quality comprises:

selecting, by the electronic device, an antenna with optimal signal quality from the first antenna group.

10. The method according to claim 8, wherein the selecting the first antenna group from the top antenna group, the bottom antenna group, and the middle antenna group based on the current scenario comprises:

selecting, by the electronic device, the top antenna group as the first antenna group after the current scenario is the scenario in which the user holds the bottom of the electronic device in the portrait mode or the scenario in which the user holds the bottom of the electronic device in the landscape mode; or selecting, by the electronic device, the bottom antenna group as the first antenna group after the current scenario is the scenario in which the user holds the top of the electronic device in the portrait mode or the scenario in which the user holds the top of the electronic device in the landscape mode; or selecting, by the electronic device, the middle antenna group as the first antenna group after the current scenario is the scenario in which the user holds the top and the bottom of the electronic device in the landscape mode.

* * * * *